United States Patent
Busaba et al.

(10) Patent No.: US 9,086,974 B2
(45) Date of Patent: Jul. 21, 2015

(54) CENTRALIZED MANAGEMENT OF HIGH-CONTENTION CACHE LINES IN MULTI-PROCESSOR COMPUTING ENVIRONMENTS

(71) Applicant: International Business Machines Corporation, Armonk, NY (US)

(72) Inventors: Fadi Y. Busaba, Poughkeepsie, NY (US); Harold W. Cain, III, Katonah, NY (US); Michael K. Gschwind, Chappaqua, NY (US); Maged M. Michael, Danbury, CT (US); Valentina Salapura, Chappaqua, NY (US); Eric M. Schwarz, Gardiner, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/037,958

(22) Filed: Sep. 26, 2013

(65) Prior Publication Data

US 2015/0089155 A1    Mar. 26, 2015

(51) Int. Cl.
*G06F 13/38*    (2006.01)
*G06F 12/00*    (2006.01)
*G06F 12/08*    (2006.01)

(52) U.S. Cl.
CPC .................................. *G06F 12/0815* (2013.01)

(58) Field of Classification Search
None
See application file for complete search history.

(56) References Cited

U.S. PATENT DOCUMENTS

| | | |
|---|---|---|
| 5,586,297 A | 12/1996 | Bryg et al. |
| 5,802,572 A | 9/1998 | Patel et al. |
| 6,108,764 A * | 8/2000 | Baumgartner et al. ......... 712/28 |
| 6,349,361 B1 | 2/2002 | Altman et al. |
| 6,502,168 B1 | 12/2002 | Arimilli et al. |

(Continued)

FOREIGN PATENT DOCUMENTS

| | | |
|---|---|---|
| CN | 101625664 B | 6/2013 |
| CN | 101814018 B | 11/2013 |
| WO | 2011081719 A2 | 7/2011 |

OTHER PUBLICATIONS

Tabba, Fuad et al., "Transactional Value Prediction," transact 2009, transact09.cs.washington.edu/4_paper.pdf.

(Continued)

*Primary Examiner* — Michael Sun
(74) *Attorney, Agent, or Firm* — Penny L. Lowry; William Kinnaman, Jr.

(57) ABSTRACT

Cache lines in a multi-processor computing environment are configurable with a coherency mode. Cache lines in full-line coherency mode are operated or managed with full-line granularity. Cache lines in sub-line coherency mode are operated or managed as sub-cache line portions of a full cache line. Communications detected on a coherence interconnect may indicate that a cache line is associated with performance-reducing events. A high-contention cache line may be placed in sub-line coherency mode. Caches accessing the cache line are notified that the cache line is in sub-line coherency mode. The cache line may be associated with a counter in a centralized detection table that is incremented based on detecting the communications. The cache line may be a high-contention cache line when the counter satisfies a high-contention criterion, such as reaching a threshold value. The cache line may be returned to full-line coherency mode when a reset criterion is satisfied.

20 Claims, 19 Drawing Sheets

(56) References Cited

U.S. PATENT DOCUMENTS

| | | | |
|---|---|---|---|
| 6,636,949 | B2 | 10/2003 | Barroso et al. |
| 6,925,537 | B2 | 8/2005 | Barroso et al. |
| 7,032,078 | B2* | 4/2006 | Cypher et al. ............... 711/141 |
| 7,363,432 | B2 | 4/2008 | Gschwind et al. |
| 7,475,193 | B2 | 1/2009 | Hutton et al. |
| 7,774,551 | B2 | 8/2010 | Gaither et al. |
| 7,925,838 | B2 | 4/2011 | Dombrowski et al. |
| 8,015,362 | B2* | 9/2011 | Alexander et al. ............ 711/141 |
| 8,046,539 | B2 | 10/2011 | George et al. |
| 8,108,619 | B2* | 1/2012 | Arimilli et al. ............... 711/141 |
| 8,140,771 | B2* | 3/2012 | Arimilli et al. ............... 711/141 |
| 8,527,708 | B2 | 9/2013 | Martin |
| 2004/0044850 | A1 | 3/2004 | George et al. |
| 2006/0230237 | A1 | 10/2006 | Sakamoto |
| 2006/0288173 | A1 | 12/2006 | Shen |
| 2006/0294312 | A1 | 12/2006 | Walmsley |
| 2007/0043531 | A1 | 2/2007 | Kosche et al. |
| 2007/0186057 | A1* | 8/2007 | Moll et al. .................... 711/146 |
| 2007/0198781 | A1 | 8/2007 | Dice et al. |
| 2008/0010417 | A1 | 1/2008 | Zeffer et al. |
| 2008/0147988 | A1* | 6/2008 | Heller et al. ................. 711/141 |
| 2008/0244195 | A1 | 10/2008 | Sistla et al. |
| 2009/0006767 | A1 | 1/2009 | Saha et al. |
| 2009/0172299 | A1 | 7/2009 | Goodman et al. |
| 2009/0198912 | A1 | 8/2009 | Arimilli et al. |
| 2010/0169581 | A1* | 7/2010 | Sheaffer et al. ............... 711/141 |
| 2011/0016277 | A1* | 1/2011 | Miller et al. .................. 711/141 |
| 2011/0099335 | A1 | 4/2011 | Scott et al. |
| 2011/0219188 | A1 | 9/2011 | Blumrich et al. |
| 2011/0320659 | A1* | 12/2011 | Ambroladze et al. ........ 710/111 |
| 2012/0317362 | A1* | 12/2012 | Hendry et al. ................ 711/130 |

OTHER PUBLICATIONS

Tabba, Fuad et al. "Transactional Conflict Decoupling and Value Prediction," ICS '11, Proceedings of the International Conference on Supercomputing, pp. 33-42, ACM, New York, NY, USA © 2011, ISBN: 978-1-4503-0102-2, DOI: 10.1145/1995896.1995904, May 2011.

Negi, A. et al., "Pi-TM: Pessimistic Invalidation for Scalable Lazy Hardware Transactional Memory," PACT '11: Proceedings of the 2011 International Conference on Parallel Architectures and Compilation Techniques, IEEE Computer Society, pp. 203-204, Oct. 2011, IEEE, 2011, Digital Object Identifier: 10.1109/PACT.2011.41.

Saha, B. et al.; "Architectural Support for Software Transactional Memory"; 2006, 39th Annual IEEE/ACM International Symposium on Microarchitecture, pp. 185-196, IEEE Conference Publications, Digital Object Identifier: 10.1109/MICRO.2006.9.

IBM, "z/Architecture Principles of Operation," SA22-7832-09, Tenth Edition, Sep. 2012, http://www.ibm.com/servers/eserver/zseries/zos/webqs.html, © Copyright International Business Machines Corporation 1990-2012.

Jacobi et al, "Transactional Memory Architecture and Implementation for IBM System z," IEEE Computer Society, Proceedings 2012 IEEE/ACM 45th International Symposium on Microarchitecture MICRO-45, Dec. 1-5, 2012, Vancouver, British Columbia, Canada, pp. 25-36, © 2012 by the Institute of Electrical and Electronics Engineers, Inc., Conference Publishing Services, http://www.computer.org/cps, IEEE Computer Society Order No. E4924, ISBN 978-0-7695-4924-8.

Intel, "Intel® Architecture Instruction Set Extensions Programming Reference," Ref. #319433-012A, Feb. 2012, http://www.intel.com/design/literature.htm, Copyright © 1997-2012 Intel Corporation.

Mak, P. et al., "IBM System z10 Processor Cache Subsystem Microarchitecture," IBM Journal of Research and Development, Jan. 2009, vol. 53, Issue 1, pp. 2:1-2:12, DOI: 10.1147/JRD.2009.5388579.

McDonald, A., "Architectures for Transactional Memory," a dissertation submitted to the Department of Computer Science and the Committee on Graduate Studies of Stanford University in Partial Fulfillment of the Requirements for the Degree of Doctor of Philosophy, Jun. 2009, pp. 1-145, © Copyright by Austen McDonald 2009.

Busaba et al., "Managing High-Conflict Cache Lines in Transactional Memory Computing Environments," filed Sep. 26, 2013, U.S. Appl. No. 14/037,879.

Busaba et al., "Identifying High-Conflict Cache Lines in Transactional Memory Computing Environments," filed Sep. 26, 2013, U.S. Appl. No. 14/037,901.

Busaba et al., "Managing High-Coherence-Miss Cache Lines in Multi-Processor Computing Environments," filed Sep. 26, 2013, U.S. Appl. No. 14/037,925.

Busaba et al., "Multi-Granular Cache Management in Multi-Processor Computing Environments," filed Sep. 26, 2013, U.S. Appl. No. 14/037,940.

Inoue, K. et al., "Dynamically Variable Line-Size Cache Architecture for Merged DRAM/Logic LSIs," IEICE Trans. Information and Systems, vol. E82-D, No. 0 2000.

Nai et al., "Reducing False Transactional Conflicts with Speculative Sub-Blocking State—an Empirical Study for ASF Transactional Memory System," Parallel and Distributed Processing Symposium Workshops & PhD Forum (IPDPSW), 2013 IEEE 27th International , vol., No., pp. 1879,1888, May 20-24, 2013 doi: 10.1109/IPDPSW.2013.113.

International Search Report dated Nov. 21, 2014 for International Application No. EP2014/069428, 4 pages.

PCT, Written Opinion of the International Searching Authority, for International Application No. EP2014/069428, 6 pages.

International Search Report dated Nov. 29, 2014 for International Application No. CN2014/086521, 4 pages.

PCT, Written Opinion of the International Searching Authority, for International Application No. CN2014/086521, 5 pages.

* cited by examiner

CENTRALIZED MANAGEMENT OF HIGH-CONTENTION CACHE LINES IN MULTI-PROCESSOR COMPUTING ENVIRONMENTS

BACKGROUND

This disclosure relates generally to cache management in a multi-processor computing environment, and more specifically to dynamic coherency protocol granularity modification for individual cache lines in a multi-processor computing environment with transactional memory.

The number of central processing unit (CPU) cores on a chip and the number of CPU cores connected to a shared memory continues to grow significantly to support growing workload capacity demand. The increasing number of CPUs cooperating to process the same workloads puts a significant burden on software scalability; for example, shared queues or data-structures protected by traditional semaphores become hot spots and lead to sub-linear n-way scaling curves. Traditionally this has been countered by implementing finer-grained locking in software, and with lower latency/higher bandwidth interconnects in hardware. Implementing fine-grained locking to improve software scalability can be very complicated and error-prone, and at today's CPU frequencies, the latencies of hardware interconnects are limited by the physical dimension of the chips and systems, and by the speed of light.

Implementations of hardware Transactional Memory (TM) have been introduced, wherein a group of instructions, called a transaction, operate atomically and in isolation (sometimes called "serializability") on a data structure in memory. The transaction executes optimistically without obtaining a lock, but may need to abort and retry the transaction execution if an operation, of the executing transaction, on a memory location conflicts with another operation on the same memory location. Previously, software transactional memory implementations have been proposed to support software Transactional Memory (TM). However, hardware TM can provide improved performance aspects and ease of use over software TM.

U.S. Patent Application Publication No 2004/0044850 titled "Method and Apparatus for the Synchronization of Distributed Caches" filed 2002 Aug. 28, incorporated herein by reference in its entirety, teaches a hierarchical caching protocol suitable for use with distributed caches, including use within a caching input/output hub.

U.S. Pat. No. 5,586,297 titled "Partial Cache Line Write Transactions in a Computing System with a Write Back Cache" filed 1994 Mar. 24, incorporated herein by reference in its entirety, teaches a computing system which includes a memory, an input/output adapter and a processor. The processor includes a write back cache in which dirty data may be stored. When performing a coherent write from the input/output adapter to the memory, a block of data is written from the input/output adapter to a memory location within the memory. The block of data contains less data than a full cache line in the write back cache. The write back cache is searched to determine whether the write back cache contains data for the memory location. When the search determines that the write back cache contains data for the memory location, a full cache line which contains the data for the memory location is purged.

SUMMARY

Disclosed herein are embodiments of a method for cache management in a multi-processor computing environment. The computing environment includes a plurality of caches configured to hold a plurality of cache lines. Each cache line is configurable with a coherency mode. The plurality of caches are associated with a coherence interconnect.

Communications on the coherence interconnect are monitored with a centralized detector. A first communication associated with a first cache line in full-line coherency mode is detected in the monitored communications. The first communication indicates an access of the first cache line resulting in a performance-reducing event. Cache control logic associated with the first cache is configured to operate or manage the first cache line in full-line coherency mode with full-line granularity.

The first cache line is determined to be a high-contention cache line based on detecting the first communication. Based on determining that the first cache line is a high-contention cache line, the first cache line is placed in sub-line coherency mode. The cache control logic is configured to operate or manage a plurality of sub-cache line portions of the first cache line in sub-line coherency mode. Caches accessing the first cache line are notified that the first cache line is in sub-line coherency mode. The first cache line may be returned to full-line coherency mode when a criterion is satisfied.

In some embodiments, a counter in an entry in a detection table is incremented when the first communication is detected. The entry associates the counter with the first cache line. Determining that the first cache line is a high-contention cache line may be based on determining that that the incremented counter satisfies a high-contention criterion. Satisfying the high-contention criterion may occur when the incremented counter reaches a threshold value.

Also disclosed herein are embodiments of a computer system with a memory and a processor in communication with the memory. The computer system is configured to perform the method described above. Also disclosed herein are embodiments of a computer program product with a computer readable storage medium readable by a processing circuit and storing instructions for execution by the processing circuit. The instructions are for performing the method described above.

BRIEF DESCRIPTION OF THE DRAWINGS

In the figures and description, like numbers generally refer to like components, parts, steps, functional blocks, and processes.

DETAILED DESCRIPTION

Transaction Execution in Intel® Based Embodiments

Figure 1:
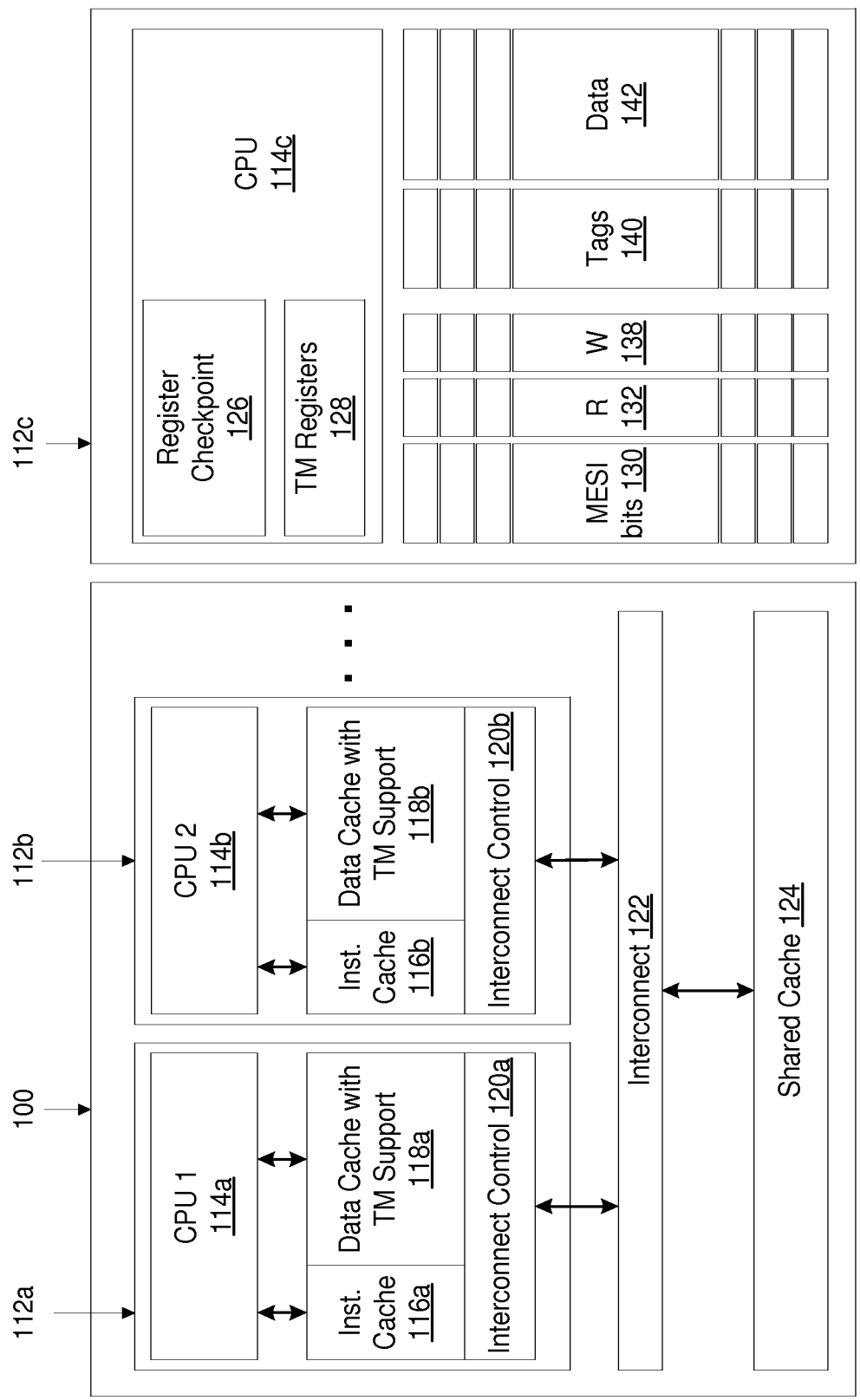
FIG. 1 depicts an example multicore Transactional Memory environment.

In "Intel® Architecture Instruction Set Extensions Programming Reference" 319433-012A, February 2012, incorporated herein by reference in its entirety, Chapter 8 teaches, in part, that multithreaded applications may take advantage of increasing numbers of CPU cores to achieve higher performance. However, the writing of multi-threaded applications requires programmers to understand and take into account data sharing among the multiple threads. Access to shared data typically requires synchronization mechanisms. These synchronization mechanisms are used to ensure that multiple threads update shared data by serializing operations that are applied to the shared data, often through the use of a critical section that is protected by a lock. Since serialization limits concurrency, programmers try to limit the overhead due to synchronization.

Intel® Transactional Synchronization Extensions (Intel® TSX) allow a processor to dynamically determine whether threads need to be serialized through lock-protected critical sections, and to perform that serialization only when required. This allows the processor to expose and exploit concurrency that is hidden in an application because of dynamically unnecessary synchronization.

With Intel TSX, programmer-specified code regions (also referred to as "transactional regions" or just "transactions") are executed transactionally. If the transactional execution completes successfully, then all memory operations performed within the transactional region will appear to have occurred instantaneously when viewed from other processors. A processor makes the memory operations of the executed transaction, performed within the transactional region, visible to other processors only when a successful commit occurs, i.e., when the transaction successfully completes execution. This process is often referred to as an atomic commit.

Intel TSX provides two software interfaces to specify regions of code for transactional execution. Hardware Lock Elision (HLE) is a legacy compatible instruction set extension (comprising the XACQUIRE and XRELEASE prefixes) to specify transactional regions. Restricted Transactional Memory (RTM) is a new instruction set interface (comprising the XBEGIN, XEND, and XABORT instructions) for programmers to define transactional regions in a more flexible manner than that possible with HLE. HLE is for programmers who prefer the backward compatibility of the conventional mutual exclusion programming model and would like to run HLE-enabled software on legacy hardware but would also like to take advantage of the new lock elision capabilities on hardware with HLE support. RTM is for programmers who prefer a flexible interface to the transactional execution hardware. In addition, Intel TSX also provides an XTEST instruction. This instruction allows software to query whether the logical processor is transactionally executing in a transactional region identified by either HLE or RTM.

Since a successful transactional execution ensures an atomic commit, the processor executes the code region optimistically without explicit synchronization. If synchronization was unnecessary for that specific execution, execution can commit without any cross-thread serialization. If the processor cannot commit atomically, then the optimistic execution fails. When this happens, the processor will roll back the execution, a process referred to as a transactional abort. On a transactional abort, the processor will discard all updates performed in the memory region used by the transaction, restore architectural state to appear as if the optimistic execution never occurred, and resume execution non-transactionally.

A processor can perform a transactional abort for numerous reasons. A primary reason to abort a transaction is due to conflicting memory accesses between the transactionally executing logical processor and another logical processor. Such conflicting memory accesses may prevent a successful transactional execution. Memory addresses read from within a transactional region constitute the read-set of the transactional region and addresses written to within the transactional region constitute the write-set of the transactional region. Intel TSX maintains the read- and write-sets at the granularity of a cache line. A conflicting memory access occurs if another logical processor either reads a location that is part of the transactional region's write-set or writes a location that is a part of either the read- or write-set of the transactional region. A conflicting access typically means that serialization is required for this code region. Since Intel TSX detects data conflicts at the granularity of a cache line, unrelated data locations placed in the same cache line will be detected as conflicts that result in transactional aborts. Transactional aborts may also occur due to limited transactional resources. For example, the amount of data accessed in the region may exceed an implementation-specific capacity. Additionally, some instructions and system events may cause transactional aborts. Frequent transactional aborts result in wasted cycles and increased inefficiency.

Hardware Lock Elision

Hardware Lock Elision (HLE) provides a legacy compatible instruction set interface for programmers to use transactional execution. HLE provides two new instruction prefix hints: XACQUIRE and XRELEASE.

With HLE, a programmer adds the XACQUIRE prefix to the front of the instruction that is used to acquire the lock that is protecting the critical section. The processor treats the prefix as a hint to elide the write associated with the lock acquire operation. Even though the lock acquire has an associated write operation to the lock, the processor does not add the address of the lock to the transactional region's write-set nor does it issue any write requests to the lock. Instead, the address of the lock is added to the read-set. The logical processor enters transactional execution. If the lock was available before the XACQUIRE prefixed instruction, then all other processors will continue to see the lock as available afterwards. Since the transactionally executing logical processor neither added the address of the lock to its write-set nor performed externally visible write operations to the lock, other logical processors can read the lock without causing a data conflict. This allows other logical processors to also enter and concurrently execute the critical section protected by the lock. The processor automatically detects any data conflicts that occur during the transactional execution and will perform a transactional abort if necessary.

Even though the eliding processor did not perform any external write operations to the lock, the hardware ensures program order of operations on the lock. If the eliding processor itself reads the value of the lock in the critical section, it will appear as if the processor had acquired the lock, i.e. the read will return the non-elided value. This behavior allows an HLE execution to be functionally equivalent to an execution without the HLE prefixes.

An XRELEASE prefix can be added in front of an instruction that is used to release the lock protecting a critical section. Releasing the lock involves a write to the lock. If the instruction is to restore the value of the lock to the value the lock had prior to the XACQUIRE prefixed lock acquire operation on the same lock, then the processor elides the external write request associated with the release of the lock and does not add the address of the lock to the write-set. The processor then attempts to commit the transactional execution.

With HLE, if multiple threads execute critical sections protected by the same lock but they do not perform any conflicting operations on each other's data, then the threads can execute concurrently and without serialization. Even though the software uses lock acquisition operations on a common lock, the hardware recognizes this, elides the lock, and executes the critical sections on the two threads without requiring any communication through the lock—if such communication was dynamically unnecessary.

If the processor is unable to execute the region transactionally, then the processor will execute the region non-transactionally and without elision. HLE enabled software has the same forward progress guarantees as the underlying non-HLE lock-based execution. For successful HLE execution, the lock and the critical section code must follow certain guidelines. These guidelines only affect performance; and failure to follow these guidelines will not result in a functional failure. Hardware without HLE support will ignore the XACQUIRE and XRELEASE prefix hints and will not perform any elision since these prefixes correspond to the REPNE/REPE IA-32 prefixes which are ignored on the instructions where XACQUIRE and XRELEASE are valid. Importantly, HLE is compatible with the existing lock-based programming model. Improper use of hints will not cause functional bugs though it may expose latent bugs already in the code.

Restricted Transactional Memory (RTM) provides a flexible software interface for transactional execution. RTM provides three new instructions—XBEGIN, XEND, and XABORT—for programmers to start, commit, and abort a transactional execution.

The programmer uses the XBEGIN instruction to specify the start of a transactional code region and the XEND instruction to specify the end of the transactional code region. If the RTM region could not be successfully executed transactionally, then the XBEGIN instruction takes an operand that provides a relative offset to the fallback instruction address.

A processor may abort RTM transactional execution for many reasons. In many instances, the hardware automatically detects transactional abort conditions and restarts execution from the fallback instruction address with the architectural state corresponding to that present at the start of the XBEGIN instruction and the EAX register updated to describe the abort status.

The XABORT instruction allows programmers to abort the execution of an RTM region explicitly. The XABORT instruction takes an 8-bit immediate argument that is loaded into the EAX register and will thus be available to software following an RTM abort. RTM instructions do not have any data memory location associated with them. While the hardware provides no guarantees as to whether an RTM region will ever successfully commit transactionally, most transactions that follow the recommended guidelines are expected to successfully commit transactionally. However, programmers must always provide an alternative code sequence in the fallback path to guarantee forward progress. This may be as simple as acquiring a lock and executing the specified code region non-transactionally. Further, a transaction that always aborts on a given implementation may complete transactionally on a future implementation. Therefore, programmers must ensure the code paths for the transactional region and the alternative code sequence are functionally tested.

Detection of HLE Support

A processor supports HLE execution if CPUID.07H.EBX.HLE [bit 4]=1. However, an application can use the HLE prefixes (XACQUIRE and XRELEASE) without checking whether the processor supports HLE. Processors without HLE support ignore these prefixes and will execute the code without entering transactional execution.

Detection of RTM Support

A processor supports RTM execution if CPUID.07H.EBX.RTM [bit 11]=1. An application must check if the processor supports RTM before it uses the RTM instructions (XBEGIN, XEND, XABORT). These instructions will generate a #UD exception when used on a processor that does not support RTM.

Detection of XTEST Instruction

A processor supports the XTEST instruction if it supports either HLE or RTM. An application must check either of these feature flags before using the XTEST instruction. This instruction will generate a #UD exception when used on a processor that does not support either HLE or RTM.

Querying Transactional Execution Status

The XTEST instruction can be used to determine the transactional status of a transactional region specified by HLE or RTM. Note, while the HLE prefixes are ignored on processors that do not support HLE, the XTEST instruction will generate a #UD exception when used on processors that do not support either HLE or RTM.

Requirements for HLE Locks

For HLE execution to successfully commit transactionally, the lock must satisfy certain properties and access to the lock must follow certain guidelines.

An XRELEASE prefixed instruction must restore the value of the elided lock to the value it had before the lock acquisition. This allows hardware to safely elide locks by not adding them to the write-set. The data size and data address of the lock release (XRELEASE prefixed) instruction must match that of the lock acquire (XACQUIRE prefixed) and the lock must not cross a cache line boundary.

Software should not write to the elided lock inside a transactional HLE region with any instruction other than an XRELEASE prefixed instruction, otherwise such a write may cause a transactional abort. In addition, recursive locks (where a thread acquires the same lock multiple times without first releasing the lock) may also cause a transactional abort. Note that software can observe the result of the elided lock acquire inside the critical section. Such a read operation will return the value of the write to the lock.

The processor automatically detects violations to these guidelines, and safely transitions to a non-transactional execution without elision. Since Intel TSX detects conflicts at the granularity of a cache line, writes to data collocated on the same cache line as the elided lock may be detected as data conflicts by other logical processors eliding the same lock.

Transactional Nesting

Both HLE and RTM support nested transactional regions. However, a transactional abort restores state to the operation that started transactional execution: either the outermost) XACQUIRE prefixed HLE eligible instruction or the outermost XBEGIN instruction. The processor treats all nested transactions as one transaction.

HLE Nesting and Elision

Programmers can nest HLE regions up to an implementation specific depth of MAX_HLE_NEST_COUNT. Each logical processor tracks the nesting count internally but this count is not available to software. An XACQUIRE prefixed HLE-eligible instruction increments the nesting count, and an XRELEASE prefixed HLE-eligible instruction decrements it. The logical processor enters transactional execution when the nesting count goes from zero to one. The logical processor attempts to commit only when the nesting count becomes zero. A transactional abort may occur if the nesting count exceeds MAX_HLE_NEST_COUNT.

In addition to supporting nested HLE regions, the processor can also elide multiple nested locks. The processor tracks a lock for elision beginning with the XACQUIRE prefixed HLE eligible instruction for that lock and ending with the XRELEASE prefixed HLE eligible instruction for that same lock. The processor can, at any one time, track up to a MAX_HLE_ELIDED_LOCKS number of locks. For example, if the implementation supports a MAX_HLE_ELIDED_LOCKS value of two and if the programmer nests three HLE identified critical sections (by performing XACQUIRE prefixed HLE eligible instructions on three distinct locks without performing an intervening XRELEASE prefixed HLE eligible instruction on any one of the locks), then the first two locks will be elided, but the third won't be elided (but will be added to the transaction's write-set). However, the execution will still continue transactionally. Once an XRELEASE for one of the two elided locks is encountered, a subsequent lock acquired through the XACQUIRE prefixed HLE eligible instruction will be elided.

The processor attempts to commit the HLE execution when all elided XACQUIRE and XRELEASE pairs have been matched, the nesting count goes to zero, and the locks have satisfied requirements. If execution cannot commit atomically, then execution transitions to a non-transactional execution without elision as if the first instruction did not have an XACQUIRE prefix.

RTM Nesting

Programmers can nest RTM regions up to an implementation specific MAX_RTM_NEST_COUNT. The logical processor tracks the nesting count internally but this count is not available to software. An XBEGIN instruction increments the nesting count, and an XEND instruction decrements the nesting count. The logical processor attempts to commit only if the nesting count becomes zero. A transactional abort occurs if the nesting count exceeds MAX_RTM_NEST_COUNT.

Nesting HLE and RTM

HLE and RTM provide two alternative software interfaces to a common transactional execution capability. Transactional processing behavior is implementation specific when HLE and RTM are nested together, e.g., HLE is inside RTM or RTM is inside HLE. However, in all cases, the implementation will maintain HLE and RTM semantics. An implementation may choose to ignore HLE hints when used inside RTM regions, and may cause a transactional abort when RTM instructions are used inside HLE regions. In the latter case, the transition from transactional to non-transactional execution occurs seamlessly since the processor will re-execute the HLE region without actually doing elision, and then execute the RTM instructions.

Abort Status Definition

RTM uses the EAX register to communicate abort status to software. Following an RTM abort the EAX register has the following definition.

TABLE 1

RTM Abort Status Definition

| EAX Register Bit Position | Meaning |
|---|---|
| 0 | Set if abort caused by XABORT instruction |
| 1 | If set, the transaction may succeed on retry, this bit is always clear if bit 0 is set |
| 2 | Set if another logical processor conflicted with a memory address that was part of the transaction that aborted |
| 3 | Set if an internal buffer overflowed |
| 4 | Set if a debug breakpoint was hit |
| 5 | Set if an abort occurred during execution of a nested transaction |
| 23:6 | Reserved |
| 31-24 | XABORT argument (only valid if bit 0 set, otherwise reserved) |

The EAX abort status for RTM only provides causes for aborts. It does not by itself encode whether an abort or commit occurred for the RTM region. The value of EAX can be 0 following an RTM abort. For example, a CPUID instruction when used inside an RTM region causes a transactional abort and may not satisfy the requirements for setting any of the EAX bits. This may result in an EAX value of 0.

RTM Memory Ordering

A successful RTM commit causes all memory operations in the RTM region to appear to execute atomically. A successfully committed RTM region consisting of an XBEGIN followed by an XEND, even with no memory operations in the RTM region, has the same ordering semantics as a LOCK prefixed instruction.

The XBEGIN instruction does not have fencing semantics. However, if an RTM execution aborts, then all memory updates from within the RTM region are discarded and are not made visible to any other logical processor.

RTM-Enabled Debugger Support

By default, any debug exception inside an RTM region will cause a transactional abort and will redirect control flow to the fallback instruction address with architectural state recovered and bit 4 in EAX set. However, to allow software debuggers to intercept execution on debug exceptions, the RTM architecture provides additional capability.

If bit 11 of DR7 and bit 15 of the IA32_DEBUGCTL_MSR are both 1, any RTM abort due to a debug exception (#DB) or breakpoint exception (#BP) causes execution to roll back and restart from the XBEGIN instruction instead of the fallback address. In this scenario, the EAX register will also be restored back to the point of the XBEGIN instruction.

Programming Considerations

Typical programmer-identified regions are expected to transactionally execute and commit successfully. However, Intel TSX does not provide any such guarantee. A transactional execution may abort for many reasons. To take full advantage of the transactional capabilities, programmers should follow certain guidelines to increase the probability of their transactional execution committing successfully.

This section discusses various events that may cause transactional aborts. The architecture ensures that updates performed within a transaction that subsequently aborts execution will never become visible. Only committed transactional executions initiate an update to the architectural state. Transactional aborts never cause functional failures and only affect performance.

Instruction Based Considerations

Programmers can use any instruction safely inside a transaction (HLE or RTM) and can use transactions at any privilege level. However, some instructions will always abort the transactional execution and cause execution to seamlessly and safely transition to a non-transactional path.

Intel TSX allows for most common instructions to be used inside transactions without causing aborts. The following operations inside a transaction do not typically cause an abort:

Operations on the instruction pointer register, general purpose registers (GPRs) and the status flags (CF, OF, SF, PF, AF, and ZF); and Operations on XMM and YMM registers and the MXCSR register.

However, programmers must be careful when intermixing SSE and AVX operations inside a transactional region. Intermixing SSE instructions accessing XMM registers and AVX instructions accessing YMM registers may cause transactions to abort. Programmers may use REP/REPNE prefixed string operations inside transactions. However, long strings may cause aborts. Further, the use of CLD and STD instructions may cause aborts if they change the value of the DF flag. However, if DF is 1, the STD instruction will not cause an abort. Similarly, if DF is 0, then the CLD instruction will not cause an abort.

Instructions not enumerated here as causing abort when used inside a transaction will typically not cause a transaction to abort (examples include but are not limited to MFENCE, LFENCE, SFENCE, RDTSC, RDTSCP, etc.).

The following instructions will abort transactional execution on any implementation:
XABORT
CPUID
PAUSE In addition, in some implementations, the following instructions may always cause transactional aborts. These instructions are not expected to be commonly used inside typical transactional regions. However, programmers must not rely on these instructions to force a transactional abort, since whether they cause transactional aborts is implementation dependent.

Operations on X87 and MMX architecture state. This includes all MMX and X87 instructions, including the FXRSTOR and FXSAVE instructions.

Update to non-status portion of EFLAGS: CLI, STI, POPFD, POPFQ, CLTS.

Instructions that update segment registers, debug registers and/or control registers: MOV to DS/ES/FS/GS/SS, POP DS/ES/FS/GS/SS, LDS, LES, LFS, LGS, LSS, SWAPGS, WRFSBASE, WRGSBASE, LGDT, SGDT, LIDT, SIDT, LLDT, SLDT, LTR, STR, Far CALL, Far JMP, Far RET, IRET, MOV to DRx, MOV to CR0/CR2/CR3/CR4/CR8 and LMSW.

Ring transitions: SYSENTER, SYSCALL, SYSEXIT, and SYSRET.

TLB and Cacheability control: CLFLUSH, INVD, WBINVD, INVLPG, INVPCID, and memory instructions with a non-temporal hint (MOVNTDQA, MOVNTDQ, MOVNTI, MOVNTPD, MOVNTPS, and MOVNTQ).

Processor state save: XSAVE, XSAVEOPT, and XRSTOR.

Interrupts: INTn, INTO.

IO: IN, INS, REP INS, OUT, OUTS, REP OUTS and their variants.

VMX: VMPTRLD, VMPTRST, VMCLEAR, VMREAD, VMWRITE, VMCALL, VMLAUNCH, VMRESUME, VMXOFF, VMXON, INVEPT, and INVVPID.

SMX: GETSEC.

UD2, RSM, RDMSR, WRMSR, HLT, MONITOR, MWAIT, XSETBV, VZEROUPPER, MASKMOVQ, and V/MASKMOVDQU.

Runtime Considerations

In addition to the instruction-based considerations, runtime events may cause transactional execution to abort. These may be due to data access patterns or micro-architectural implementation features. The following list is not a comprehensive discussion of all abort causes.

Any fault or trap in a transaction that must be exposed to software will be suppressed. Transactional execution will abort and execution will transition to a non-transactional execution, as if the fault or trap had never occurred. If an exception is not masked, then that un-masked exception will result in a transactional abort and the state will appear as if the exception had never occurred.

Synchronous exception events (#DE, #0F, #NP, #SS, #GP, #BR, #UD, #AC, #XF, #PF, #NM, #TS, #MF, #DB, #BP/INT3) that occur during transactional execution may cause an execution not to commit transactionally, and require a non-transactional execution. These events are suppressed as if they had never occurred. With HLE, since the non-transactional code path is identical to the transactional code path, these events will typically re-appear when the instruction that caused the exception is re-executed non-transactionally, causing the associated synchronous events to be delivered appropriately in the non-transactional execution. Asynchronous events (NMI, SMI, INTR, IPI, PMI, etc.) occurring during transactional execution may cause the transactional execution to abort and transition to a non-transactional execution. The asynchronous events will be pended and handled after the transactional abort is processed.

Transactions only support write-back cacheable memory type operations. A transaction may always abort if the transaction includes operations on any other memory type. This includes instruction fetches to UC memory type.

Memory accesses within a transactional region may require the processor to set the Accessed and Dirty flags of the referenced page table entry. The behavior of how the processor handles this is implementation specific. Some implementations may allow the updates to these flags to become externally visible even if the transactional region subsequently aborts. Some Intel TSX implementations may choose to abort the transactional execution if these flags need to be updated. Further, a processor's page-table walk may generate accesses to its own transactionally written but uncommitted state. Some Intel TSX implementations may choose to abort the execution of a transactional region in such situations. Regardless, the architecture ensures that, if the transactional region aborts, then the transactionally written state will not be made architecturally visible through the behavior of structures such as TLBs.

Executing self-modifying code transactionally may also cause transactional aborts. Programmers must continue to follow the Intel recommended guidelines for writing self-modifying and cross-modifying code even when employing HLE and RTM. While an implementation of RTM and HLE will typically provide sufficient resources for executing common transactional regions, implementation constraints and excessive sizes for transactional regions may cause a transactional execution to abort and transition to a non-transactional execution. The architecture provides no guarantee of the amount of resources available to do transactional execution and does not guarantee that a transactional execution will ever succeed.

Conflicting requests to a cache line accessed within a transactional region may prevent the transaction from executing successfully. For example, if logical processor P0 reads line A in a transactional region and another logical processor P1 writes line A (either inside or outside a transactional region) then logical processor P0 may abort if logical processor P1's write interferes with processor P0's ability to execute transactionally.

Similarly, if P0 writes line A in a transactional region and P1 reads or writes line A (either inside or outside a transactional region), then P0 may abort if P1's access to line A interferes with P0's ability to execute transactionally. In addition, other coherence traffic may at times appear as conflicting requests and may cause aborts. While these false conflicts may happen, they are expected to be uncommon. The conflict resolution policy to determine whether P0 or P1 aborts in the above scenarios is implementation specific.

Generic Transaction Execution Embodiments:

According to "ARCHITECTURES FOR TRANSACTIONAL MEMORY", a dissertation submitted to the Department of Computer Science and the Committee on Graduate Studies of Stanford University in partial fulfillment of the requirements for the Degree of Doctor of Philosophy, by Austen McDonald, June 2009, incorporated by reference herein in its entirety, fundamentally, there are three mechanisms needed to implement an atomic and isolated transactional region: versioning, conflict detection, and contention management.

To make a transactional code region appear atomic, all the modifications performed by that transactional code region must be stored and kept isolated from other transactions until commit time. The system does this by implementing a versioning policy. Two versioning paradigms exist: eager and lazy. An eager versioning system stores newly generated transactional values in place and stores previous memory values on the side, in what is called an undo-log. A lazy versioning system stores new values temporarily in what is called a write buffer, copying them to memory only on commit. In either system, the cache is used to optimize storage of new versions.

To ensure serializability between transactions, conflicts must be detected and resolved. The two systems, i.e., the eager and lazy versioning systems, detect conflicts by implementing a conflict detection policy, either optimistic or pessimistic. An optimistic system executes transactions in parallel, checking for conflicts only when a transaction commits. A pessimistic system checks for conflicts at each load and store. Similar to versioning, conflict detection also uses the cache, marking each line as either part of the read-set, part of the write-set, or both. The two systems resolve conflicts by implementing a contention management policy. Many contention management policies exist, some are more appropriate for optimistic conflict detection and some are more appropriate for pessimistic. Described below are some example policies.

Since each transactional memory (TM) system needs both versioning detection and conflict detection, these options give rise to four distinct TM designs: Eager-Pessimistic (EP), Eager-Optimistic (EO), Lazy-Pessimistic (LP), and Lazy-Optimistic (LO). Table 2 briefly describes all four distinct TM designs.

FIG. 1 depicts an example of a multicore TM environment. FIG. 1 shows many TM-enabled CPUs (CPU1 114a, CPU2 114b, etc.) on one die 100, connected with an interconnect 122, under management of an interconnect control 120a, 120b. Each CPU 114a, 114b (also known as a Processor) may have a split cache consisting of an Instruction Cache 116a, 166b for caching instructions from memory to be executed and a Data Cache 118a, 118b with TM support for caching data (operands) of memory locations to be operated on by the CPU 114a, 114b. Each CPU 114a, 114b, 114c and its associated caches are referenced as 112a, 112b, and 112c. In an implementation, caches of multiple dies 100 are interconnected to support cache coherency between the caches of the multiple dies 100. In an implementation, a single cache, rather than the split cache is employed holding both instructions and data. In implementations, the CPU caches are one level of caching in a hierarchical cache structure. For example each die 100 may employ a shared cache 124 to be shared amongst all the CPUs on the die 100. In another implementation, each die may have access to a shared cache 124, shared amongst all the processors of all the dies 100.

FIG. 1 also shows the details of an example transactional CPU 114c, including additions to support TM. The transactional CPU (processor) 114c may include hardware for supporting Register Checkpoints 126 and special TM Registers 128. The transactional CPU cache may have the MESI bits 130, Tags 140 and Data 142 of a conventional cache but also, for example, R bits 132 showing a line has been read by the CPU 114c while executing a transaction and W bits 138 showing a line has been written-to by the CPU 114c while executing a transaction.

A key detail for programmers in any TM system is how non-transactional accesses interact with transactions. By design, transactional accesses are screened from each other using the mechanisms above. However, the interaction between a regular, non-transactional load with a transaction containing a new value for that address must still be considered. In addition, the interaction between a non-transactional store with a transaction that has read that address must also be explored. These are issues of the database concept isolation.

A TM system is said to implement strong isolation, sometimes called strong atomicity, when every non-transactional load and store acts like an atomic transaction. Therefore, non-transactional loads cannot see uncommitted data and non-transactional stores cause atomicity violations in any transactions that have read that address. A system where this is not the case is said to implement weak isolation, sometimes called weak atomicity.

Strong isolation is often more desirable than weak isolation due to the relative ease of conceptualization and implementation of strong isolation. Additionally, if a programmer has forgotten to surround some shared memory references with transactions, causing bugs, then with strong isolation, the programmer will often detect that oversight using a simple debug interface because the programmer will see a non-transactional region causing atomicity violations. Also, programs written in one model may work differently on another model.

Further, strong isolation is often easier to support in hardware TM than weak isolation. With strong isolation, since the coherence protocol already manages load and store communication between processors, transactions can detect non-transactional loads and stores and act appropriately. To implement strong isolation in software Transactional Memory (TM), non-transactional code must be modified to include read- and write-barriers; potentially crippling performance. Although great effort has been expended to remove many un-needed barriers, such techniques are often complex and performance is typically far lower than that of HTMs.

Similarly, when a transaction seeks to upgrade a line from shared to modified (on a first write), the transaction issues an exclusive load request, which is also used to detect conflicts. If a receiving cache has the line non-speculatively, then the line is invalidated, and in certain cases a cache-to-cache transfer (M or E states) is issued. But, if the line is R 132 or W 138, a conflict is detected.

TABLE 2

Transactional Memory Design Space

| | | VERSIONING | |
| | | Lazy | Eager |
| --- | --- | --- | --- |
| CONFLICT DETECTION | Optimistic | Storing updates in a write buffer; detecting conflicts at commit time. | Not practical: waiting to update memory until commit time but detecting conflicts at access time guarantees wasted work and provides no advantage |
| | Pessimistic | Storing updates in a write buffer; detecting conflicts at access time. | Updating memory, keeping old values in undo log; detecting conflicts at access time. |

Table 2 illustrates the fundamental design space of transactional memory (versioning and conflict detection).

Eager-Pessimistic (EP)

This first TM design described below is known as Eager-Pessimistic. An EP system stores its write-set "in place" (hence the name "eager") and, to support rollback, stores the old values of overwritten lines in an "undo log". Processors use the W 138 and R 132 cache bits to track read and write-sets and detect conflicts when receiving snooped load requests. Perhaps the most notable examples of EP systems in known literature are LogTM and UTM.

Beginning a transaction in an EP system is much like beginning a transaction in other systems: tm_begin( ) takes a register checkpoint, and initializes any status registers. An EP system also requires initializing the undo log, the details of which are dependent on the log format, but often involve initializing a log base pointer to a region of pre-allocated, thread-private memory, and clearing a log bounds register.

Versioning: In EP, due to the way eager versioning is designed to function, the MESI 130 state transitions (cache line indicators corresponding to Modified, Exclusive, Shared, and Invalid code states) are left mostly unchanged. Outside of a transaction, the MESI 130 state transitions are left completely unchanged. When reading a line inside a transaction, the standard coherence transitions apply (S (Shared)→S, I (Invalid)→S, or I→E (Exclusive)), issuing a load miss as needed, but the R 132 bit is also set. Likewise, writing a line applies the standard transitions (S→M, E→I, I→M), issuing a miss as needed, but also sets the W 138 (Written) bit. The first time a line is written, the old version of the entire line is loaded then written to the undo log to preserve it in case the current transaction aborts. The newly written data is then stored "in-place," over the old data.

Conflict Detection: Pessimistic conflict detection uses coherence messages exchanged on misses, or upgrades, to look for conflicts between transactions. When a read miss occurs within a transaction, other processors receive a load request; but they ignore the request if they do not have the needed line. If the other processors have the needed line non-speculatively or have the line R 132 (Read), they downgrade that line to S, and in certain cases issue a cache-to-cache transfer if they have the line in MESI's 130 M or E state. However, if the cache has the line W 138, then a conflict is detected between the two transactions and additional action(s) must be taken.

Validation: Because conflict detection is performed on every load, a transaction always has exclusive access to its own write-set. Therefore, validation does not require any additional work.

Commit: Since eager versioning stores the new version of data items in place, the commit process simply clears the W 138 and R 132 bits and discards the undo log.

Abort: When a transaction rolls back, the original version of each cache line in the undo log must be restored, a process called "unrolling" or "applying" the log. This is done during tm_discard( ) and must be atomic with regard to other transactions. Specifically, the write-set must still be used to detect conflicts: this transaction has the only correct version of lines in its undo log, and requesting transactions must wait for the correct version to be restored from that log. Such a log can be applied using a hardware state machine or software abort handler.

Eager-Pessimistic has the characteristics of: Commit is simple and since it is in-place, very fast. Similarly, validation is a no-op. Pessimistic conflict detection detects conflicts early, thereby reducing the number of "doomed" transactions. For example, if two transactions are involved in a Write-After-Read dependency, then that dependency is detected immediately in pessimistic conflict detection. However, in optimistic conflict detection such conflicts are not detected until the writer commits.

Eager-Pessimistic also has the characteristics of: As described above, the first time a cache line is written, the old value must be written to the log, incurring extra cache accesses. Aborts are expensive as they require undoing the log. For each cache line in the log, a load must be issued, perhaps going as far as main memory before continuing to the next line. Pessimistic conflict detection also prevents certain serializable schedules from existing.

Additionally, because conflicts are handled as they occur, there is a potential for livelock and careful contention management mechanisms must be employed to guarantee forward progress.

Lazy-Optimistic (LO)

Another popular TM design is Lazy-Optimistic (LO), which stores its write-set in a "write buffer" or "redo log" and detects conflicts at commit time (still using the R 132 and W 138 bits).

Versioning: Just as in the EP system, the MESI protocol of the LO design is enforced outside of the transactions. Once inside a transaction, reading a line incurs the standard MESI transitions but also sets the R 132 bit. Likewise, writing a line sets the W 138 bit of the line, but handling the MESI transitions of the LO design is different from that of the EP design. First, with lazy versioning, the new versions of written data are stored in the cache hierarchy until commit while other transactions have access to old versions available in memory or other caches. To make available the old versions, dirty lines (M lines) must be evicted when first written by a transaction. Second, no upgrade misses are needed because of the optimistic conflict detection feature: if a transaction has a line in the S state, it can simply write to it and upgrade that line to an M state without communicating the changes with other transactions because conflict detection is done at commit time.

Conflict Detection and Validation: To validate a transaction and detect conflicts, LO communicates the addresses of speculatively modified lines to other transactions only when it is preparing to commit. On validation, the processor sends one, potentially large, network packet containing all the addresses in the write-set. Data is not sent, but left in the cache of the committer and marked dirty (M). To build this packet without searching the cache for lines marked W, a simple bit vector is used, called a "store buffer," with one bit per cache line to track these speculatively modified lines. Other transactions use this address packet to detect conflicts: if an address is found in the cache and the R 132 and/or W 138 bits are set, then a conflict is initiated. If the line is found but neither R 132 nor W 138 is set, then the line is simply invalidated, which is similar to processing an exclusive load.

To support transaction atomicity, these address packets must be handled atomically, i.e., no two address packets may exist at once with the same addresses. In an LO system, this can be achieved by simply acquiring a global commit token before sending the address packet. However, a two-phase commit scheme could be employed by first sending out the address packet, collecting responses, enforcing an ordering protocol (perhaps oldest transaction first), and committing once all responses are satisfactory.

Commit: Once validation has occurred, commit needs no special treatment: simply clear W 138 and R 132 bits and the store buffer. The transaction's writes are already marked dirty in the cache and other caches' copies of these lines have been invalidated via the address packet. Other processors can then access the committed data through the regular coherence protocol.

Abort: Rollback is equally easy: because the write-set is contained within the local caches, these lines can be invalidated, then clear W 138 and R 132 bits and the store buffer. The store buffer allows W lines to be found to invalidate without the need to search the cache.

Lazy-Optimistic has the characteristics of: Aborts are very fast, requiring no additional loads or stores and making only local changes. More serializable schedules can exist than found in EP, which allows an LO system to more aggressively speculate that transactions are independent, which can yield higher performance. Finally, the late detection of conflicts can increase the likelihood of forward progress.

Lazy-Optimistic also has the characteristics of: Validation takes global communication time proportional to size of write set. Doomed transactions can waste work since conflicts are detected only at commit time.

Lazy-Pessimistic (LP)

Lazy-Pessimistic (LP) represents a third TM design option, sitting somewhere between EP and LO: storing newly written lines in a write buffer but detecting conflicts on a per access basis.

Versioning: Versioning is similar but not identical to that of LO: reading a line sets its R bit 132, writing a line sets its W bit 138, and a store buffer is used to track W lines in the cache. Also, dirty (M) lines must be evicted when first written by a transaction, just as in LO. However, since conflict detection is pessimistic, load exclusives must be performed when upgrading a transactional line from I, S→M, which is unlike LO.

Conflict Detection: LP's conflict detection operates the same as EP's: using coherence messages to look for conflicts between transactions.

Validation: Like in EP, pessimistic conflict detection ensures that at any point, a running transaction has no conflicts with any other running transaction, so validation is a no-op.

Commit: Commit needs no special treatment: simply clear W 138 and R 132 bits and the store buffer, like in LO.

Abort: Rollback is also like that of LO: simply invalidate the write-set using the store buffer and clear the W and R bits and the store buffer.

Eager-Optimistic (EO)

The LP has the characteristics of: Like LO, aborts are very fast. Like EP, the use of pessimistic conflict detection reduces the number of "doomed" transactions. Like EP, some serializable schedules are not allowed and conflict detection must be performed on each cache miss.

The final combination of versioning and conflict detection is Eager-Optimistic (EO). EO may be a less than optimal choice for HTM systems: since new transactional versions are written in-place, other transactions have no choice but to notice conflicts as they occur (i.e., as cache misses occur). But since EO waits until commit time to detect conflicts, those transactions become "zombies," continuing to execute, wasting resources, yet are "doomed" to abort.

EO has proven to be useful in STMs and is implemented by Bartok-STM and McRT. A lazy versioning STM needs to check its write buffer on each read to ensure that it is reading the most recent value. Since the write buffer is not a hardware structure, this is expensive, hence the preference for write-in-place eager versioning. Additionally, since checking for conflicts is also expensive in an STM, optimistic conflict detection offers the advantage of performing this operation in bulk.

Contention Management

How a transaction rolls back once the system has decided to abort that transaction has been described above, but, since a conflict involves two transactions, the topics of which transaction should abort, how that abort should be initiated, and when should the aborted transaction be retried need to be explored. These are topics that are addressed by Contention Management (CM), a key component of transactional memory. Described below are policies regarding how the systems initiate aborts and the various established methods of managing which transactions should abort in a conflict.

Contention Management Policies

A Contention Management (CM) Policy is a mechanism that determines which transaction involved in a conflict should abort and when the aborted transaction should be retried. For example, it is often the case that retrying an aborted transaction immediately does not lead to the best performance. Conversely, employing a back-off mechanism, which delays the retrying of an aborted transaction, can yield better performance. STMs first grappled with finding the best contention management policies and many of the policies outlined below were originally developed for STMs.

CM Policies draw on a number of measures to make decisions, including ages of the transactions, size of read- and write-sets, the number of previous aborts, etc. The combinations of measures to make such decisions are endless, but certain combinations are described below, roughly in order of increasing complexity.

To establish some nomenclature, first note that in a conflict there are two sides: the attacker and the defender. The attacker is the transaction requesting access to a shared memory location. In pessimistic conflict detection, the attacker is the transaction issuing the load or load exclusive. In optimistic, the attacker is the transaction attempting to validate. The defender in both cases is the transaction receiving the attacker's request.

An Aggressive CM Policy immediately and always retries either the attacker or the defender. In LO, Aggressive means that the attacker always wins, and so Aggressive is sometimes called committer wins. Such a policy was used for the earliest LO systems. In the case of EP, Aggressive can be either defender wins or attacker wins.

Restarting a conflicting transaction that will immediately experience another conflict is bound to waste work—namely interconnect bandwidth refilling cache misses. A Polite CM Policy employs exponential backoff (but linear could also be used) before restarting conflicts. To prevent starvation, a situation where a process does not have resources allocated to it by the scheduler, the exponential backoff greatly increases the odds of transaction success after some n retries.

Another approach to conflict resolution is to randomly abort the attacker or defender (a policy called Randomized). Such a policy may be combined with a randomized backoff scheme to avoid unneeded contention.

However, making random choices, when selecting a transaction to abort, can result in aborting transactions that have completed "a lot of work", which can waste resources. To avoid such waste, the amount of work completed on the transaction can be taken into account when determining which transaction to abort. One measure of work could be a transaction's age. Other methods include Oldest, Bulk TM, Size Matters, Karma, and Polka. Oldest is a simple timestamp method that aborts the younger transaction in a conflict. Bulk TM uses this scheme. Size Matters is like Oldest but instead of transaction age, the number of read/written words is used as the priority, reverting to Oldest after a fixed number of aborts. Karma is similar, using the size of the write-set as priority. Rollback then proceeds after backing off a fixed amount of time. Aborted transactions keep their priorities after being aborted (hence the name Karma). Polka works like Karma but instead of backing off a predefined amount of time, it backs off exponentially more each time.

Since aborting wastes work, it is logical to argue that stalling an attacker until the defender has finished their transaction would lead to better performance. Unfortunately, such a simple scheme easily leads to deadlock.

Deadlock avoidance techniques can be used to solve this problem. Greedy uses two rules to avoid deadlock. The first rule is, if a first transaction, T1, has lower priority than a second transaction, T0, or if T1 is waiting for another transaction, then T1 aborts when conflicting with T0. The second rule is, if T1 has higher priority than T0 and is not waiting, then T0 waits until T1 commits, aborts, or starts waiting (in which case the first rule is applied). Greedy provides some guarantees about time bounds for executing a set of transactions. One EP design (LogTM) uses a CM policy similar to Greedy to achieve stalling with conservative deadlock avoidance.

Example MESI coherency rules provide for four possible states in which a cache line of a multiprocessor cache system may reside, M, E, S, and I, defined as follows:

Modified (M): The cache line is present only in the current cache, and is dirty; it has been modified from the value in main memory. The cache is required to write the data back to main memory at some time in the future, before permitting any other read of the (no longer valid) main memory state. The write-back changes the line to the Exclusive state.

Exclusive (E): The cache line is present only in the current cache, but is clean; it matches main memory. It may be changed to the Shared state at any time, in response to a read request. Alternatively, it may be changed to the Modified state when writing to it.

Shared (S): Indicates that this cache line may be stored in other caches of the machine and is "clean"; it matches the main memory. The line may be discarded (changed to the Invalid state) at any time.

Invalid (I): Indicates that this cache line is invalid (unused).

TM coherency status indicators (R 132, W 138) may be provided for each cache line, in addition to, or encoded in the MESI coherency bits. An R 132 indicator indicates the current transaction has read from the data of the cache line, and a W 138 indicator indicates the current transaction has written to the data of the cache line.

In another aspect of TM design, a system is designed using transactional store buffers. U.S. Pat. No. 6,349,361 titled "Methods and Apparatus for Reordering and Renaming Memory References in a Multiprocessor Computer System," filed Mar. 31, 2000 and incorporated by reference herein in its entirety, teaches a method for reordering and renaming memory references in a multiprocessor computer system having at least a first and a second processor. The first processor has a first private cache and a first buffer, and the second processor has a second private cache and a second buffer. The method includes the steps of, for each of a plurality of gated store requests received by the first processor to store a datum, exclusively acquiring a cache line that contains the datum by the first private cache, and storing the datum in the first buffer. Upon the first buffer receiving a load request from the first processor to load a particular datum, the particular datum is provided to the first processor from among the data stored in the first buffer based on an in-order sequence of load and store operations. Upon the first cache receiving a load request from the second cache for a given datum, an error condition is indicated and a current state of at least one of the processors is reset to an earlier state when the load request for the given datum corresponds to the data stored in the first buffer.

The main implementation components of one such transactional memory facility are a transaction-backup register file for holding pre-transaction GR (general register) content, a cache directory to track the cache lines accessed during the transaction, a store cache to buffer stores until the transaction ends, and firmware routines to perform various complex functions. In this section a detailed implementation is described.

IBM zEnterprise EC12 Enterprise Server Embodiment

The IBM zEnterprise EC12 enterprise server introduces transactional execution (TX) in transactional memory, and is described in part in a paper, "Transactional Memory Architecture and Implementation for IBM System z" of Proceedings Pages 25-36 presented at MICRO-45, 1-5 Dec. 2012, Vancouver, British Columbia, Canada, available from IEEE Computer Society Conference Publishing Services (CPS), which is incorporated by reference herein in its entirety.

Table 3 shows an example transaction. Transactions started with TBEGIN are not assured to ever successfully complete with TEND, since they can experience an aborting condition at every attempted execution, e.g., due to repeating conflicts with other CPUs. This requires that the program support a fallback path to perform the same operation non-transactionally, e.g., by using traditional locking schemes. This puts significant burden on the programming and software verification teams, especially where the fallback path is not automatically generated by a reliable compiler.

TABLE 3

Example Transaction Code

| | | | |
|---|---|---|---|
| loop | LHI | R0,0 | *initialize retry count=0 |
| | TBEGIN | | *begin transaction |
| | JNZ | abort | *go to abort code if CC1=0 |
| | LT | R1, lock | *load and test the fallback lock |
| | JNZ | lckbzy | *branch if lock busy |
| | ... perform operation ... | | |
| | TEND | | *end transaction |
| | ... ... ... | | |
| lckbzy | TABORT | | *abort if lock busy; this |
| | | | *resumes after TBEGIN |
| abort | JO | fallback | *no retry if CC=3 |
| | AHI | R0, 1 | *increment retry count |
| | CIJNL | R0,6, fallback | *give up after 6 attempts |
| | PPA | R0, TX | *random delay based on retry count |
| | ... potentially wait for lock to become free ... | | |
| | J | loop | *jump back to retry fallback |
| | OBTAIN | lock | *using Compare&Swap |
| | ... perform operation ... | | |
| | RELEASE | lock | |
| | ... ... ... | | |

The requirement of providing a fallback path for aborted Transaction Execution (TX) transactions can be onerous. Many transactions operating on shared data structures are expected to be short, touch only a few distinct memory locations, and use simple instructions only. For those transactions, the IBM zEnterprise EC12 introduces the concept of constrained transactions; under normal conditions, the CPU 114c assures that constrained transactions eventually end successfully, albeit without giving a strict limit on the number of necessary retries. A constrained transaction starts with a TBEGINC instruction and ends with a regular TEND. Implementing a task as a constrained or non-constrained transaction typically results in very comparable performance, but constrained transactions simplify software development by removing the need for a fallback path. IBM's Transactional Execution architecture is further described in z/Architecture, Principles of Operation, Tenth Edition, SA22-7832-09 published September 2012 from IBM, incorporated by reference herein in its entirety.

A constrained transaction starts with the TBEGINC instruction. A transaction initiated with TBEGINC must follow a list of programming constraints; otherwise the program takes a non-filterable constraint-violation interruption. Exemplary constraints may include, but not be limited to: the transaction can execute a maximum of 32 instructions, all instruction text must be within 256 consecutive bytes of memory; the transaction contains only forward-pointing relative branches (i.e., no loops or subroutine calls); the transaction can access a maximum of 4 aligned octowords (an octoword is 32 bytes) of memory; and restriction of the instruction-set to exclude complex instructions like decimal or floating-point operations. The constraints are chosen such that many common operations like doubly linked list-insert/delete operations can be performed, including the very powerful concept of atomic compare-and-swap targeting up to 4 aligned octowords. At the same time, the constraints were chosen conservatively such that future CPU implementations can assure transaction success without needing to adjust the constraints, since that would otherwise lead to software incompatibility.

TBEGINC mostly behaves like XBEGIN in TSX or TBEGIN on IBM's zEC12 servers, except that the floating-point register (FPR) control and the program interruption filtering fields do not exist and the controls are considered to be zero. On a transaction abort, the instruction address is set back directly to the TBEGINC instead of to the instruction after, reflecting the immediate retry and absence of an abort path for constrained transactions.

Nested transactions are not allowed within constrained transactions, but if a TBEGINC occurs within a non-constrained transaction it is treated as opening a new non-constrained nesting level just like TBEGIN would. This can occur, e.g., if a non-constrained transaction calls a subroutine that uses a constrained transaction internally.

Since interruption filtering is implicitly off, all exceptions during a constrained transaction lead to an interruption into the operating system (OS). Eventual successful finishing of the transaction relies on the capability of the OS to page-in the at most 4 pages touched by any constrained transaction. The OS must also ensure time-slices long enough to allow the transaction to complete.

TABLE 4

Transaction Code Example

| | | |
|---|---|---|
| TBEGINC | | *begin constrained transaction |
| | ... perform operation ... | |
| TEND | | *end transaction |

Table 4 shows the constrained-transactional implementation of the code in Table 3, assuming that the constrained transactions do not interact with other locking-based code. No lock testing is shown therefore, but could be added if constrained transactions and lock-based code were mixed.

When failure occurs repeatedly, software emulation is performed using millicode as part of system firmware. Advantageously, constrained transactions have desirable properties because of the burden removed from programmers.

Figure 2:
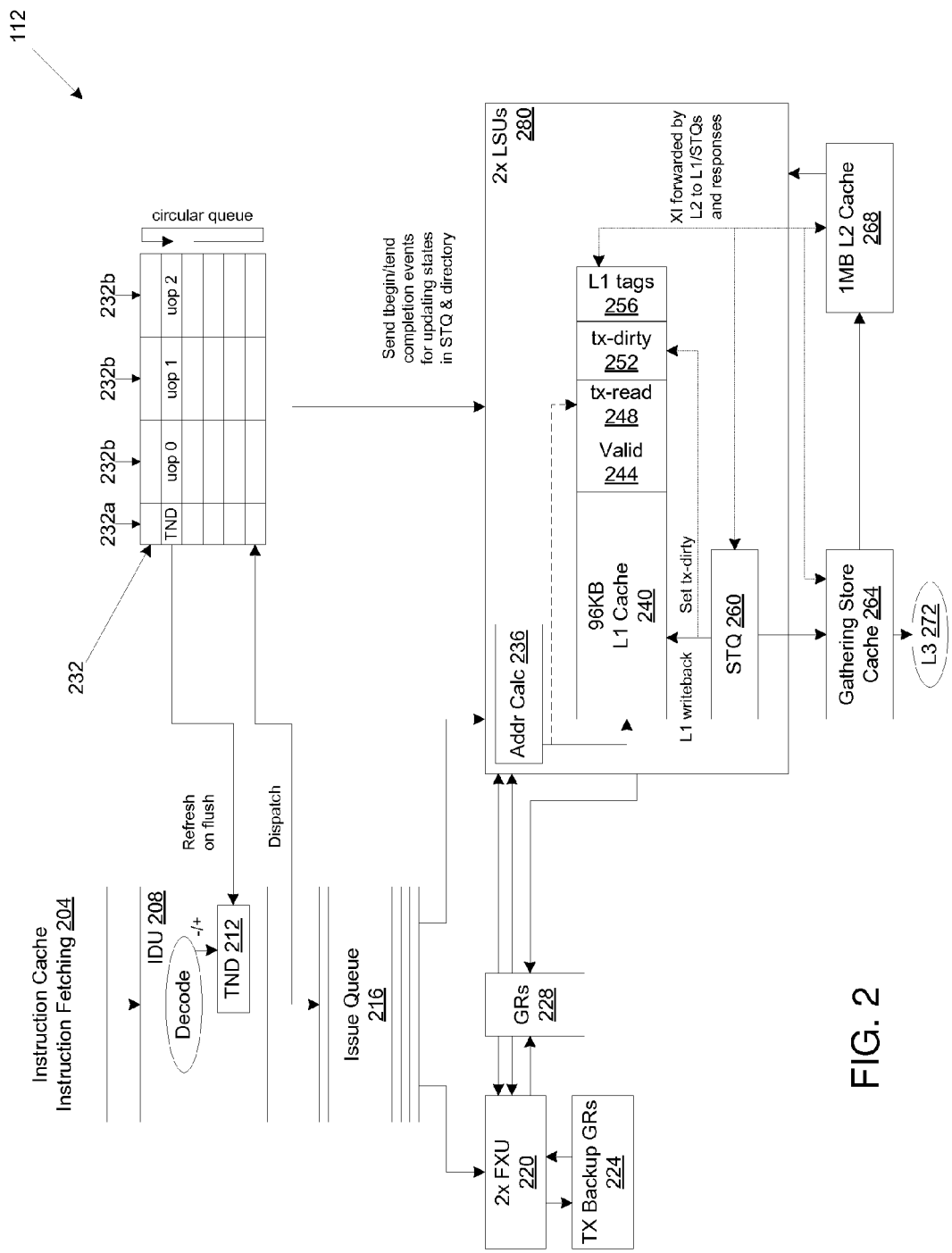
FIG. 2 depicts example components of an example CPU.

With reference to FIG. 2, the IBM zEnterprise EC12 processor introduced the transactional execution facility. The processor can decode 3 instructions per clock cycle; simple instructions are dispatched as single micro-ops, and more complex instructions are cracked into multiple micro-ops. The micro-ops (Uops 232b) are written into a unified issue queue 216, from where they can be issued out-of-order. Up to two fixed-point, one floating-point, two load/store, and two branch instructions can execute every cycle. A Global Completion Table (GCT) 232 holds every micro-op and a transaction nesting depth (TND) 232a. The GCT 232 is written in-order at decode time, tracks the execution status of each micro-op 232b, and completes instructions when all micro-ops 232b of the oldest instruction group have successfully executed.

The level 1 (L1) data cache 240 is a 96 KB (kilo-byte) 6-way associative cache with 256 byte cache-lines and 4 cycle use latency, coupled to a private 1 MB (mega-byte) 8-way associative 2nd-level (L2) data cache 268 with 7 cycles use-latency penalty for L1 240 misses. L1 240 cache is the cache closest to a processor and Ln cache is a cache at the nth level of caching. Both L1 240 and L2 268 caches are store-through.

Six cores on each central processor (CP) chip share a 48 MB 3rd-level store-in cache, and six CP chips are connected to an off-chip 384 MB 4th-level cache, packaged together on a glass ceramic multi-chip module (MCM). Up to 4 multi-chip modules (MCMs) can be connected to a coherent symmetric multi-processor (SMP) system with up to 144 cores (not all cores are available to run customer workload).

Coherency is managed with a variant of the MESI protocol. Cache-lines can be owned read-only (shared) or exclusive; the L1 240 and L2 268 are store-through and thus do not contain dirty lines. The L3 272 and L4 caches (not shown) are store-in and track dirty states. Each cache is inclusive of all its connected lower level caches.

Coherency requests are called "cross interrogates" (XI) and are sent hierarchically from higher level to lower-level caches, and between the L4s. When one core misses the L1 240 and L2 268 and requests the cache line from its local L3 272, the L3 272 checks whether it owns the line, and if necessary sends an XI to the currently owning L2 268/L1 240 under that L3 272 to ensure coherency, before it returns the cache line to the requestor. If the request also misses the L3 272, the L3 272 sends a request to the L4 (not shown), which enforces coherency by sending XIs to all necessary L3s under that L4, and to the neighboring L4s. Then the L4 responds to the requesting L3 which forwards the response to the L2 268/L1 240.

Note that due to the inclusivity rule of the cache hierarchy, sometimes cache lines are XI'ed from lower-level caches due to evictions on higher-level caches caused by associativity overflows from requests to other cache lines. These XIs can be called "LRU XIs", where LRU stands for least recently used.

Making reference to yet another type of XI requests, Demote-XIs transition cache-ownership from exclusive into read-only state, and Exclusive-XIs transition cache ownership from exclusive into invalid state. Demote-XIs and Exclusive-XIs need a response back to the XI sender. The target cache can "accept" the XI, or send a "reject" response if it first needs to evict dirty data before accepting the XI. The L1 240/L2 268 caches are store through, but may reject demote-XIs and exclusive XIs if they have stores in their store queues that need to be sent to L3 before downgrading the exclusive state. A rejected XI will be repeated by the sender. Read-only-XIs are sent to caches that own the line read-only; no response is needed for such XIs since they cannot be rejected. The details of the SMP protocol are similar to those described for the IBM z10 by P. Mak, C. Walters, and G. Strait, in "IBM System z10 processor cache subsystem microarchitecture", IBM Journal of Research and Development, Vol 53:1, 2009, which is incorporated by reference herein in its entirety.

Transactional Instruction Execution

FIG. 2 depicts example components of an example CPU environment 112, including a CPU 114*c* and caches/components with which it interacts (such as those depicted in FIG. 1). The instruction decode unit 208 (IDU) keeps track of the current transaction nesting depth 212 (TND). When the IDU 208 receives a TBEGIN instruction, the nesting depth 212 is incremented, and conversely decremented on TEND instructions. The nesting depth 212 is written into the GCT 232 for every dispatched instruction. When a TBEGIN or TEND is decoded on a speculative path that later gets flushed, the IDU's 208 nesting depth 212 is refreshed from the youngest GCT 232 entry that is not flushed. The transactional state is also written into the issue queue 216 for consumption by the execution units, mostly by the Load/Store Unit (LSU) 280, which also has an effective address calculator 236 is included in the LSU 280. The TBEGIN instruction may specify a transaction diagnostic block (TDB) for recording status information, should the transaction abort before reaching a TEND instruction.

Similar to the nesting depth, the IDU 208/GCT 232 collaboratively track the access register/floating-point register (AR/FPR) modification masks through the transaction nest; the IDU 208 can place an abort request into the GCT 232 when an AR/FPR-modifying instruction is decoded and the modification mask blocks that. When the instruction becomes next-to-complete, completion is blocked and the transaction aborts. Other restricted instructions are handled similarly, including TBEGIN if decoded while in a constrained transaction, or exceeding the maximum nesting depth.

An outermost TBEGIN is cracked into multiple micro-ops depending on the GR-Save-Mask; each micro-op 232*b* (including, for example uop 0, uop 1, and uop 2) will be executed by one of the two fixed point units (FXUs) 220 to save a pair of GRs 228 into a special transaction-backup register file 224, that is used to later restore the GR 228 content in case of a transaction abort. Also the TBEGIN spawns micro-ops 232*b* to perform an accessibility test for the TDB if one is specified; the address is saved in a special purpose register for later usage in the abort case. At the decoding of an outermost TBEGIN, the instruction address and the instruction text of the TBEGIN are also saved in special purpose registers for a potential abort processing later on.

TEND and NTSTG are single micro-op 232*b* instructions; NTSTG (non-transactional store) is handled like a normal store except that it is marked as non-transactional in the issue queue 216 so that the LSU 280 can treat it appropriately. TEND is a no-op at execution time, the ending of the transaction is performed when TEND completes.

As mentioned, instructions that are within a transaction are marked as such in the issue queue 216, but otherwise execute mostly unchanged; the LSU 280 performs isolation tracking as described in the next section.

Since decoding is in-order, and since the IDU 208 keeps track of the current transactional state and writes it into the issue queue 216 along with every instruction from the transaction, execution of TBEGIN, TEND, and instructions before, within, and after the transaction can be performed out-of order. It is even possible (though unlikely) that TEND is executed first, then the entire transaction, and lastly the TBEGIN executes. Program order is restored through the GCT 232 at completion time. The length of transactions is not limited by the size of the GCT 232, since general purpose registers (GRs) 228 can be restored from the backup register file 224.

During execution, the program event recording (PER) events are filtered based on the Event Suppression Control, and a PER TEND event is detected if enabled. Similarly, while in transactional mode, a pseudo-random generator may be causing the random aborts as enabled by the Transaction Diagnostics Control.

Tracking for Transactional Isolation

The Load/Store Unit 280 tracks cache lines that were accessed during transactional execution, and triggers an abort if an XI from another CPU (or an LRU-XI) conflicts with the footprint. If the conflicting XI is an exclusive or demote XI, the LSU 280 rejects the XI back to the L3 272 in the hope of finishing the transaction before the L3 272 repeats the XI. This "stiff-arming" is very efficient in highly contended transactions. In order to prevent hangs when two CPUs stiff-arm each other, a XI-reject counter is implemented, which triggers a transaction abort when a threshold is met.

The L1 cache directory 240 is traditionally implemented with static random access memories (SRAMs). For the transactional memory implementation, the valid bits 244 (64 rows×6 ways) of the directory have been moved into normal logic latches, and are supplemented with two more bits per cache line: the TX-read 248 and TX-dirty 252 bits.

The TX-read 248 bits are reset when a new outermost TBEGIN is decoded (which is interlocked against a prior still pending transaction). The TX-read 248 bit is set at execution time by every load instruction that is marked "transactional" in the issue queue. Note that this can lead to over-marking if speculative loads are executed, for example on a mispredicted branch path. The alternative of setting the TX-read 248 bit at load completion time was too expensive for silicon area, since multiple loads can complete at the same time, requiring many read-ports on the load-queue.

Stores execute the same way as in non-transactional mode, but a transaction mark is placed in the store queue (STQ) 260 entry of the store instruction. At write-back time, when the data from the STQ 260 is written into the L1 240, the TX-dirty bit 252 in the L1-directory 256 is set for the written cache line. Store write-back into the L1 240 occurs only after the store instruction has completed, and at most one store is written back per cycle. Before completion and write-back, loads can access the data from the STQ 260 by means of store-forwarding; after write-back, the CPU 114c (FIG. 1) can access the speculatively updated data in the L1 240. If the transaction ends successfully, the TX-dirty bits 252 of all cache-lines are cleared, and also the TX-marks of not yet written stores are cleared in the STQ 260, effectively turning the pending stores into normal stores.

On a transaction abort, all pending transactional stores are invalidated from the STQ 260, even those already completed. All cache lines that were modified by the transaction in the L1 240, that is, have the TX-dirty bit 252 on, have their valid bits turned off, effectively removing them from the L1 240 cache instantaneously.

The architecture requires that before completing a new instruction, the isolation of the transaction read- and write-set is maintained. This isolation is ensured by stalling instruction completion at appropriate times when XIs are pending; speculative out-of order execution is allowed, optimistically assuming that the pending XIs are to different addresses and not actually cause a transaction conflict. This design fits very naturally with the XI-vs-completion interlocks that are implemented on prior systems to ensure the strong memory ordering that the architecture requires.

When the L1 240 receives an XI, L1 240 accesses the directory to check validity of the XI'ed address in the L1 240, and if the TX-read bit 248 is active on the XI'ed line and the XI is not rejected, the LSU 280 triggers an abort. When a cache line with active TX-read bit 248 is LRU'ed from the L1 240, a special LRU-extension vector remembers for each of the 64 rows of the L1 240 that a TX-read line existed on that row. Since no precise address tracking exists for the LRU extensions, any non-rejected XI that hits a valid extension row the LSU 280 triggers an abort. Providing the LRU-extension effectively increases the read footprint capability from the L1-size to the L2-size and associativity, provided no conflicts with other CPUs 114c (FIG. 1) against the non-precise LRU-extension tracking causes aborts.

The store footprint is limited by the store cache size (the store cache is discussed in more detail below) and thus implicitly by the L2 268 size and associativity. No LRU-extension action needs to be performed when a TX-dirty 252 cache line is LRU'ed from the L1 240.

Store Cache

In prior systems, since the L1 240 and L2 268 are store-through caches, every store instruction causes an L3 272 store access; with now 6 cores per L3 272 and further improved performance of each core, the store rate for the L3 272 (and to a lesser extent for the L2 268) becomes problematic for certain workloads. In order to avoid store queuing delays, a gathering store cache 264 had to be added, that combines stores to neighboring addresses before sending them to the L3 272.

For transactional memory performance, it is acceptable to invalidate every TX-dirty 252 cache line from the L1 240 on transaction aborts, because the L2 268 cache is very close (7 cycles L1 240 miss penalty) to bring back the clean lines. However, it would be unacceptable for performance (and silicon area for tracking) to have transactional stores write the L2 268 before the transaction ends and then invalidate all dirty L2 268 cache lines on abort (or even worse on the shared L3 272).

The two problems of store bandwidth and transactional memory store handling can both be addressed with the gathering store cache 264. The cache 232 is a circular queue of 64 entries, each entry holding 128 bytes of data with byte-precise valid bits. In non-transactional operation, when a store is received from the LSU 280, the store cache checks whether an entry exists for the same address, and if so gathers the new store into the existing entry. If no entry exists, a new entry is written into the queue, and if the number of free entries falls under a threshold, the oldest entries are written back to the L2 268 and L3 272 caches.

When a new outermost transaction begins, all existing entries in the store cache are marked closed so that no new stores can be gathered into them, and eviction of those entries to L2 268 and L3 272 is started. From that point on, the transactional stores coming out of the LSU 280 STQ 260 allocate new entries, or gather into existing transactional entries. The write-back of those stores into L2 268 and L3 272 is blocked, until the transaction ends successfully; at that point subsequent (post-transaction) stores can continue to gather into existing entries, until the next transaction closes those entries again.

The store cache is queried on every exclusive or demote XI, and causes an XI reject if the XI compares to any active entry. If the core is not completing further instructions while continuously rejecting XIs, the transaction is aborted at a certain threshold to avoid hangs.

The LSU 280 requests a transaction abort when the store cache overflows. The LSU 280 detects this condition when it tries to send a new store that cannot merge into an existing entry, and the entire store cache is filled with stores from the current transaction. The store cache is managed as a subset of the L2 268: while transactionally dirty lines can be evicted from the L1 240, they have to stay resident in the L2 268 throughout the transaction. The maximum store footprint is thus limited to the store cache size of 64×128 bytes, and it is also limited by the associativity of the L2 268. Since the L2 268 is 8-way associative and has 512 rows, it is typically large enough to not cause transaction aborts.

If a transaction aborts, the store cache is notified and all entries holding transactional data are invalidated. The store cache also has a mark per doubleword (8 bytes) whether the entry was written by a NTSTG instruction—those doublewords stay valid across transaction aborts.

Millicode-Implemented Functions

Traditionally, IBM mainframe server processors contain a layer of firmware called millicode which performs complex functions like certain CISC instruction executions, interruption handling, system synchronization, and RAS. Millicode includes machine dependent instructions as well as instructions of the instruction set architecture (ISA) that are fetched and executed from memory similarly to instructions of application programs and the operating system (OS). Firmware resides in a restricted area of main memory that customer programs cannot access. When hardware detects a situation that needs to invoke millicode, the instruction fetching unit 204 switches into "millicode mode" and starts fetching at the appropriate location in the millicode memory area. Millicode may be fetched and executed in the same way as instructions of the instruction set architecture (ISA), and may include ISA instructions.

For transactional memory, millicode is involved in various complex situations. Every transaction abort invokes a dedicated millicode sub-routine to perform the necessary abort steps. The transaction-abort millicode starts by reading special-purpose registers (SPRs) holding the hardware internal abort reason, potential exception reasons, and the aborted instruction address, which millicode then uses to store a TDB if one is specified. The TBEGIN instruction text is loaded from an SPR to obtain the GR-save-mask, which is needed for millicode to know which GRs 238 to restore.

The CPU 114c (FIG. 1) supports a special millicode-only instruction to read out the backup-GRs 224 and copy them into the main GRs 228. The TBEGIN instruction address is also loaded from an SPR to set the new instruction address in the PSW to continue execution after the TBEGIN once the millicode abort sub-routine finishes. That PSW may later be saved as program-old PSW in case the abort is caused by a non-filtered program interruption.

The TABORT instruction may be millicode implemented; when the IDU 208 decodes TABORT, it instructs the instruction fetch unit to branch into TABORT's millicode, from which millicode branches into the common abort sub-routine.

The Extract Transaction Nesting Depth (ETND) instruction may also be millicoded, since it is not performance critical; millicode loads the current nesting depth out of a special hardware register and places it into a GR 228. The PPA instruction is millicoded; it performs the optimal delay based on the current abort count provided by software as an operand to PPA, and also based on other hardware internal state.

For constrained transactions, millicode may keep track of the number of aborts. The counter is reset to 0 on successful TEND completion, or if an interruption into the OS occurs (since it is not known if or when the OS will return to the program). Depending on the current abort count, millicode can invoke certain mechanisms to improve the chance of success for the subsequent transaction retry. The mechanisms involve, for example, successively increasing random delays between retries, and reducing the amount of speculative execution to avoid encountering aborts caused by speculative accesses to data that the transaction is not actually using. As a last resort, millicode can broadcast to other CPUs 114c (FIG. 1) to stop all conflicting work, retry the local transaction, before releasing the other CPUs 114c to continue normal processing. Multiple CPUs 114c must be coordinated to not cause deadlocks, so some serialization between millicode instances on different CPUs 114c is required.

U.S. Pat. No. 5,802,572 titled "Write-back Cache having Sub-line Size Coherency Granularity and Method for Maintaining Coherency within a Write-back Cache" filed 1996 Mar. 15, incorporated herein by reference in its entirety, teaches a write-back cache memory and method for maintaining coherency within a write-back cache memory. The write-back cache memory includes a number of cache lines for storing data associated with addresses within an associated memory. Each of the cache lines comprises multiple byte sets. The write-back cache memory also includes coherency indicia for identifying each byte set among the multiple byte sets within a cache line which contains data that differs from data stored in corresponding addresses within the associated memory. The write-back cache memory further includes cache control logic, which, upon replacement of a particular cache line within the write-back cache memory, writes only identified byte sets to the associated memory, such that memory accesses and bus utilization are minimized.

A cache is a small amount of expensive high-speed memory, which is commonly utilized within a data processing system to improve the access time to data stored within an associated memory, thereby decreasing processor latency. A cache typically comprises a number of cache lines, which each include several bytes of data. Data stored within memory is mapped into a cache utilizing an index portion of the memory addresses associated with the data, such that multiple memory addresses having the same index portion map to the same cache line. Cached data associated with a particular memory address is distinguished from data associated with other addresses having the same index portion by an address tag, typically the high order address bits, which is stored in association with the cached data. In order to minimize the conflict between data associated with addresses having identical index portions, many caches provide multiple ways or storage locations for each cache line.

When data requested by the processor does not reside within the cache, a cache miss occurs and the requested data is fetched from memory. In order to accommodate the requested data within the cache, the data resident within a way of the cache line to which the requested data maps often must be replaced or "cast-out." If the cache has multiple ways, the replaced cache location is typically selected utilizing an algorithm, such as a least recently used (LRU) algorithm, in order to avoid casting-out data that has a high probability of being requested by the processor. A cache location can be similarly replaced or "pushed-out" if a snoop of the cache location reveals that the data contained within the cache location is inconsistent with more recent data stored within the corresponding memory address.

Coherency between cached data and data stored in memory is enforced by a cache coherency protocol, typically implemented by the processor or a cache controller. If a data access is designated as a write-through, any update to the cached data is automatically written to memory, thus enforcing coherency between the cache and the memory upon the completion of the data access. Write-back caches, on the other hand, enforce data coherency only when a copy-back operation is performed in response to a cache line replacement or during periods of low bus activity. Because write-back caches entail lower bus utilization, write-back caches are generally preferable to write-through caches from a performance standpoint if the software and hardware environment permit the concomitant looser coherency.

Cache coherency and replacement operations are typically performed on a line-by-line basis. Accordingly, each way of each cache line within a conventional write-back cache has an associated bit that indicates whether any of the data bytes contained within the way have been modified since the data bytes were written into the cache. When a way that contains modified data is replaced, a copyback operation is invoked that writes each byte of the replaced way to the corresponding memory address. Because the length of a cache line is typically several times the bandwidth of the bus to which the cache is coupled, such copyback operations usually require several multi-cycle bus transactions or "beats" to complete.

Although a write-back cache provides enhanced performance compared with caches implementing a write-though architecture, a conventional write-back cache unnecessarily consumes bus bandwidth when fewer than all of the data bytes within a replaced way are modified since the unmodified data bytes are written to memory needlessly. The write-back of unmodified data bytes not only consumes bus bandwidth and therefore decreases overall system performance, but also, as is of particular importance in battery-powered (e.g., portable) computing environments, dissipates power in enabling the cache and driving the bus. Consequently, it is apparent that a write-back cache is needed that eliminates write-backs of unmodified data to memory.

Figure 3:
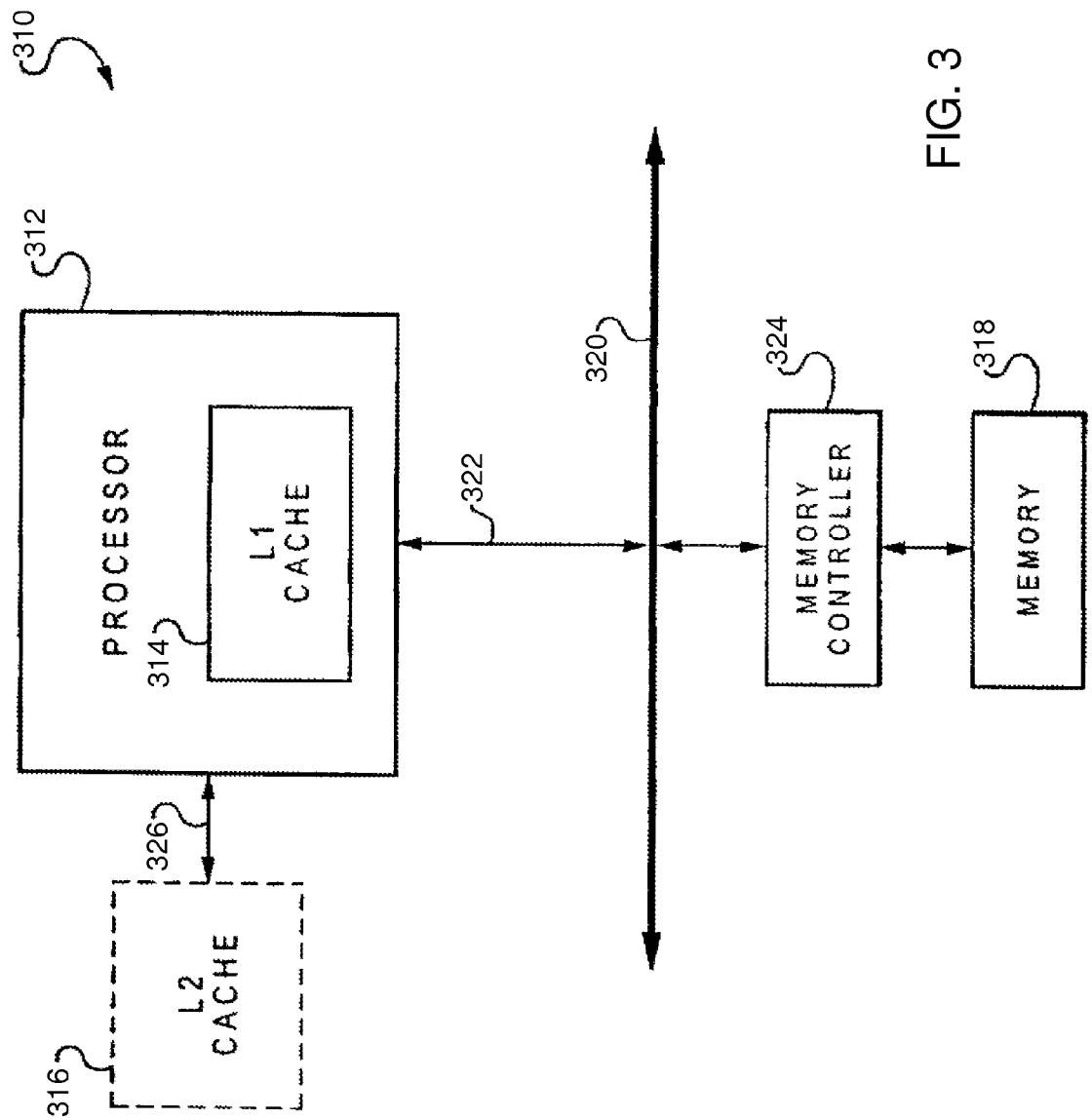
FIG. 3 depicts a pictorial representation of a data processing system, which includes an illustrative write-back cache.

FIG. 3 depicts a pictorial representation of a data processing system 310, which includes an illustrative write-back cache. As illustrated, data processing system 310 includes processor 312, on-board level one (L1) cache 314, optional level two (L2) cache 316, memory 318, system bus 320, processor bus 322, and memory controller 324.

Processor 312 executes software instructions, which are stored in memory 318 or are received by processor 312 from another device coupled to system bus 320. In order to avoid the latency incurred by repeated accesses to memory 318, instructions and data retrieved from memory 318 are stored within L1 cache 314 or L2 cache 316 (if present) due to the probability that the instructions and data will be requested again. Processor 312 preferably comprises one of the PowerPC® line of microprocessors available from IBM Microelectronics of Essex Junction Vt., which operate in accordance with reduced instruction set computing (RISC) techniques; however, those skilled in the art will recognize that processor 312 could also be implemented utilizing an 80x86, PENTIUM (a trademark of Intel Corporation), or other suitable processor.

L1 cache 314 comprises a small (e.g., 216 Kbyte) high-speed memory, which permits the registers and execution units within processor 312 rapid access to data and instructions recently retrieved from memory 318 via high-speed processor bus 322 and system bus 320. As described above, L1 cache 314 is preferably configured as a write-back cache in order to maximize the performance of data processing system 310 by reducing the bandwidth of system bus 320 utilized to write back data to memory 318. However, in one embodiment of L1 cache 314, accesses to data contained within L1 cache 314 can be configured by software as either write-through or write-back on a per cache line basis. Although illustrated as a unified cache, that is, a cache that stores both data and instructions, those skilled in the art will appreciate that L1 cache 314 can alternatively be implemented as two distinct data and instruction caches.

As indicated by dashed line illustration, processor 312 can be coupled to an optional L2 cache 316. Like L1 cache 314, L2 cache 316 comprises a high-speed memory that contains a subset of the data and instructions stored within memory 318. In order to maximize data access efficiency, L2 cache 316 is preferably larger in size than L1 cache 314 and is also configured as a write-back cache. Although illustrated as coupled to processor 312 via a dedicated bus 326, those skilled in the art will appreciate that L2 cache 316 can alternatively be implemented on-board processor 312, coupled to processor bus 322 in an in-line or look-aside configuration, or coupled to system bus 320.

In the depicted illustrative embodiment, memory 318 comprises a random access memory (RAM) having an associated memory controller 324. Memory controller 324 generates read enable and write enable signals to facilitate storage and retrieval of data and includes address translation facilities that map logical addresses utilized by processor 312 into physical addresses within memory 318. As will be appreciated by those skilled in the art, memory 318 can comprise a number of individual volatile memory modules which store data and segments of operating system and application software while power is supplied to data processing system 310. Those skilled the art will further appreciate that in addition to memory 318, numerous types of devices can be coupled to system bus 320 for interaction with processor 312, L1 cache 314, L2 cache 316, and memory 318; however, devices not necessary for an understanding of the illustrative embodiment described herein have been omitted for the sake of simplicity.

Figure 4:
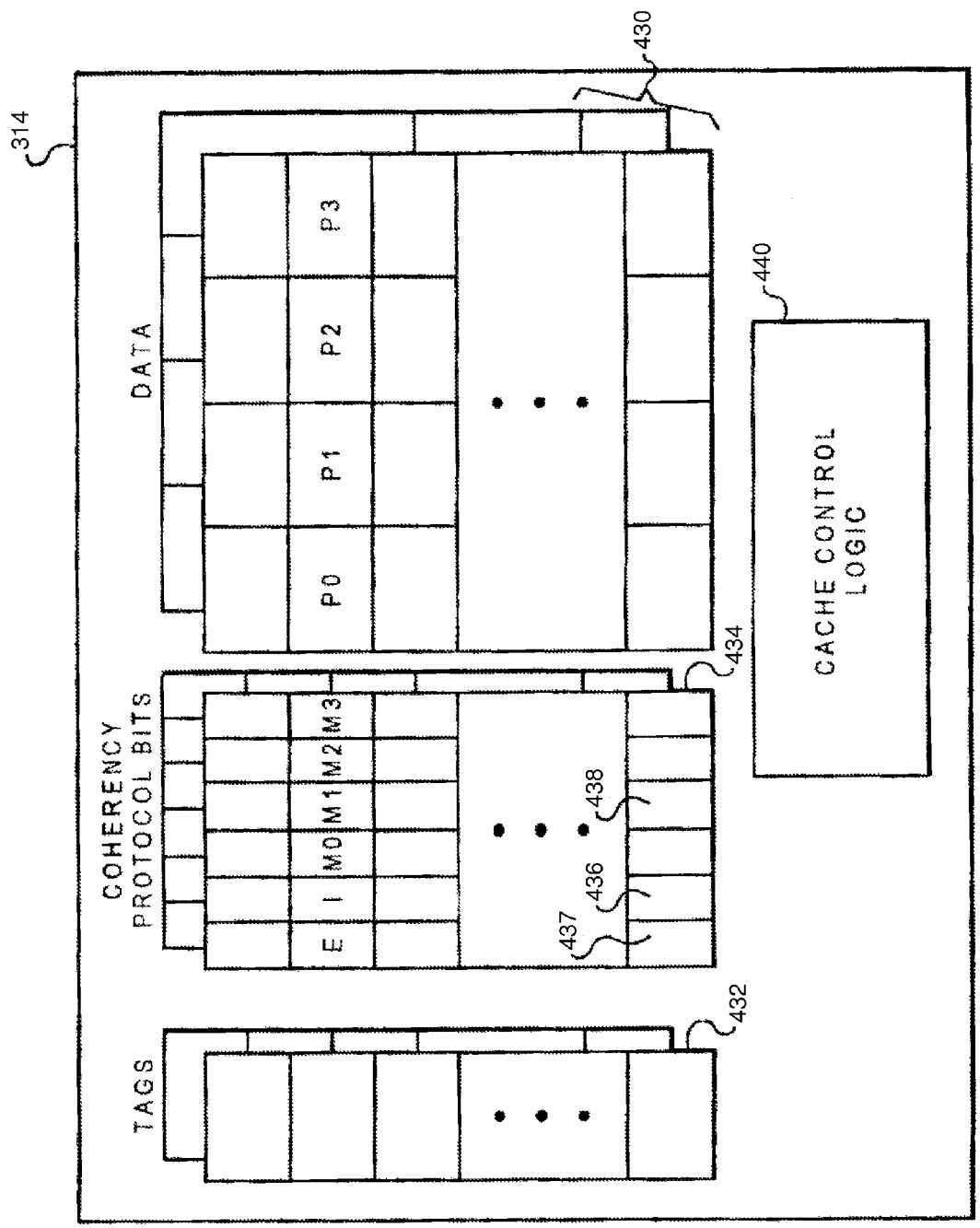
FIG. 4 depicts a pictorial representation of an illustrative write-back cache in a data processing system.

Referring now to FIG. 4, there is illustrated a pictorial representation of a write-back cache in accordance with the illustrative embodiment of a data processing system depicted within FIG. 3. Although the write-back cache illustrated within FIG. 4 is identified as L1 cache 314, it will be understood that the pictorial representation of a write-back cache depicted within FIG. 4 is equally applicable to L2 cache 316. In the depicted illustrative embodiment, L1 cache 314 is a two-way set associative cache comprising a number of cache lines 430, which each include four bus packets P0-P3 in each of two ways. Each bus packet P0-P3 comprises one or more bytes of data and preferably has a packet size equal to the width of processor bus 322 and system bus 320. Thus, for example, if processor bus 322 and system bus 320 are 64-bit busses, each of bus packets P0-P3 preferably includes 8 bytes of data.

As with conventional caches, data is mapped into a particular cache line 430 of L1 cache 314 by an index portion of the memory address which stores the data. When stored within L1 cache 314, data associated with a particular memory address is distinguished from data associated with other addresses having the same index portion by an address tag 432, which preferably comprises the high-order bits of the physical address within memory 318 at which the data is stored.

L1 cache 314 further includes coherency protocol bits 434, which in the depicted embodiment implement the MEI (Modified, Exclusive, Invalid) cache coherency protocol. Those skilled in the art will appreciate that other cache coherency protocols, for example, the MESI (Modified, Exclusive, Shared, Invalid) protocol, could alternatively be implemented within L1 cache 314. Coherency protocol bits 434 comprise one exclusive bit (E) 437, one invalid bit (I) 436, and four modified bits 438 (labeled M0-M3) associated with each way of each cache line 430. When set, the exclusive bit 437 associated with a particular way of a cache line 430 indicates that the data block stored within that way is contained within L1 cache 314 only (not L2 cache 316) and is consistent with memory 318. The invalid bit 436 associated with a particular way of a cache line 430 is set to indicate that the data associated with the corresponding address tag 432 is not resident within L1 cache 314. For example, invalid bit 436 is set when a snoop hit occurs during a cacheable read or write access to the same location within memory 318 by a second bus master within data processing system 310. Each of modified bits (M0-M3) 438 is associated with a particular one of bus packets P0-P3 within the corresponding cache line way. Modified bits M0-M3 are set when the corresponding bus packet P0-P3 is modified with respect to memory 318. Thus, setting one of modified bits M0-M3 indicates that data within the corresponding bus packet is valid only within L1 cache 314 and must eventually be written back to memory 318 to maintain coherency.

Finally, L1 cache 314 includes cache control logic 440. In addition to implementing a cache coherency protocol by setting and clearing coherency protocol bits 434, cache control logic 440 generates address tags from logical addresses and selects cache lines for replacement according to an LRU algorithm.

Figure 5:
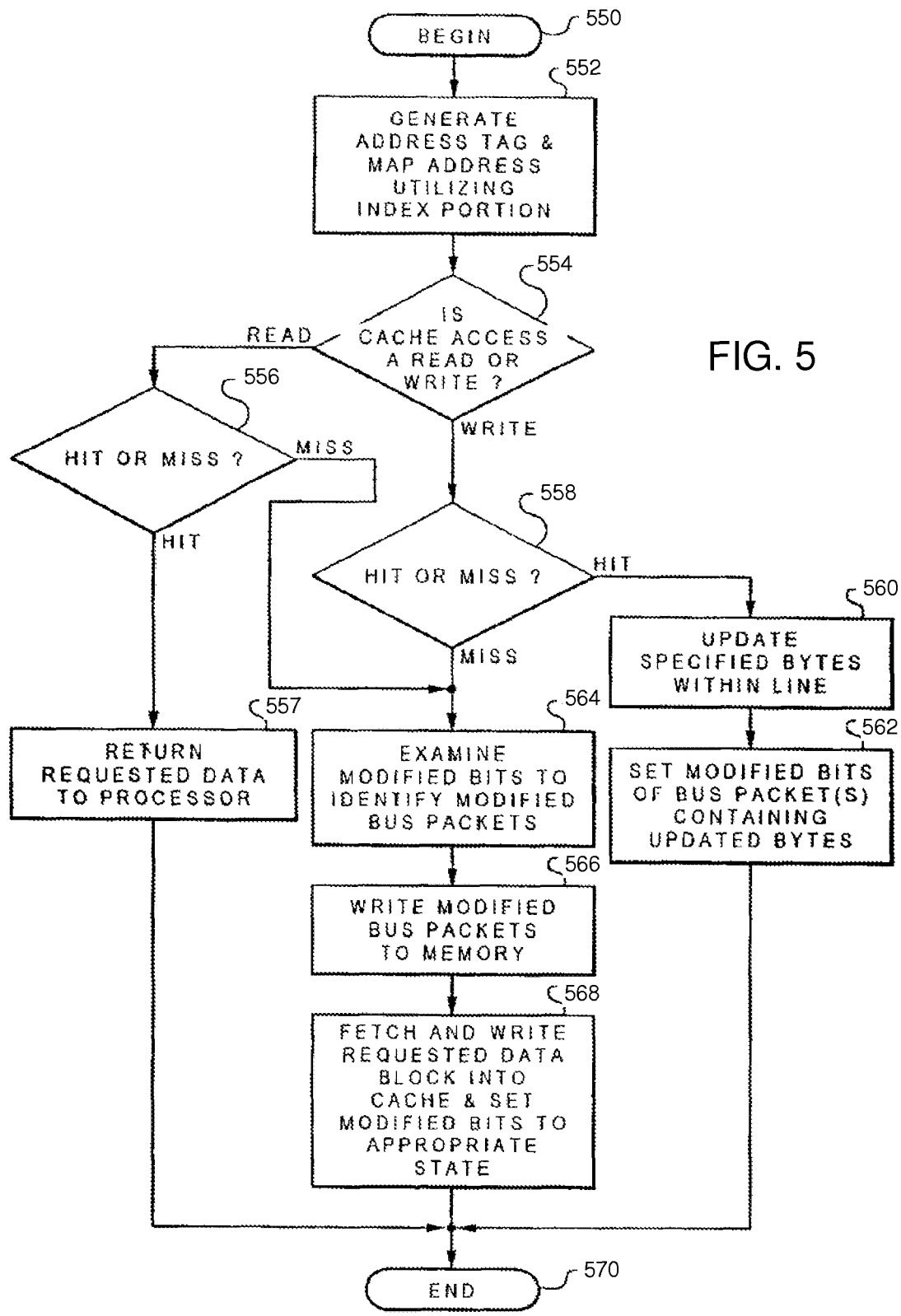
FIG. 5 is a flow diagram illustrating an example method for maintaining cache coherency with a data processing system.

With reference now to FIG. 5, there is illustrated a flowchart of a method which can be utilized to maintain cache coherency within data processing system 310 of FIG. 3. As illustrated, the process begins at block 550 when a cache access request is received from processor 312 by L1 cache 314. The process proceeds from block 550 to block 552, which depicts cache control logic 440 generating an address tag, that is, the high order bits of the physical address of the operand data, based upon the logical (effective) address of the operand data. In addition, cache control logic 440 maps the cache access request to a specified cache line 430 utilizing the index portion of the logical address.

Next, the process proceeds from block 552 to block 554, which illustrates a determination of whether or not the cache access request is a read request or a write request. In response to a determination that the cache access request is a read request, the process proceeds from block 554 to block 556.

Block 556 depicts a determination of whether the read request results in a hit or miss. The determination illustrated at block 556 is made by comparing the address tag generated at block 552 with the address tag 432 associated with each way of the specified cache line 430. If the generated address tag matches one of the address tags 432 associated with a way of the specified cache line 430, a cache hit occurs and the process proceeds to block 557, which illustrates L1 cache 314 returning the requested data to processor 312. Thereafter, the process terminates at block 570. However, if the read request misses L1 cache 314, the process passes to blocks 554-568, which as described below, depict the replacement of one of the ways of the specified cache line 430 to which the memory address of the requested data maps.

Returning to block 554, if a determination is made that the cache access request is a write to the specified cache line 430, the process proceeds from block 554 to block 558, which illustrates a determination of whether the write request results in a hit or a miss. The determination illustrated at block 558 is made by comparing the address tag generated at block 552 with the address tag 432 associated with each way of the specified cache line 430. If the generated address tag matches one of address tags 432, a hit occurs and the process passes to blocks 560 and 562. Blocks 560 and 562 depict updating the appropriate bytes within the specified cache line 430 and setting the modified bits 438 associated with the bus packets containing the updated bytes. Thus, in order to reduce the bus utilization required for write-backs, L1 cache 314 indicates the modification of cached data utilizing a smaller granularity than conventional write-back caches. The process then proceeds from block 562 to block 570, where the process terminates.

Referring again to block 558, if a determination is made that the cache access request results in a miss, that is, that the generated address tag does not match the address tag 432 associated with either way of the specified cache line 430, the process passes to blocks 564-568. As noted above, blocks 564-568 depict the write-back of a selected way of the specified cache line 430. In the illustrated embodiment, the replaced ways are selected according to an LRU algorithm that can be implemented by associating a single LRU bit with each of cache lines 430; however, those skilled in the art will appreciate that other replacement schemes can also be employed.

Still referring to FIG. 5, block 564 illustrates cache control logic 440 examining the modified bits 438 associated with the way selected for replacement within the specified cache line 430 in order to identify which of bus packets P0-P3 have been modified. Next, the process proceeds to block 566, which depicts writing only the bus packets marked as modified to memory 318. In contrast to conventional write-back caches, bus packets which are not marked as modified are simply cast out and are not written back to memory 318, thereby reducing the bus utilization required for a write-back. Next, the process proceeds to block 568, which illustrates fetching a data block containing the requested data from L2 cache 316 or memory 318 and writing the data block into the selected way of the specified cache line 430. In addition, the modified bits 438 associated with the selected way are set or cleared to indicate which bus packets P0-P3 contain modified data. Thus, if the replacement of the selected way was performed in response to a read miss, all of the modified bits 438 associated with the selected way are cleared; however, if the way was replaced due to a write miss, one or more modified bits 438 are set to indicate which of bus packets P0-P3 contain modified data. Thereafter, the process passes to block 570 and terminates.

A paper titled "Dynamically Variable Line-Size Cache Architecture for Merged DRAM/Logic LSIs" by Koji Inoue, Koji Kai, and Kazuaki Murakami, published in IEICE Transactions on Information and Systems, Vol. E83-D, No. 5, pp. 1048-1057, May 2000, incorporated herein by reference in its entirety, proposes a novel cache architecture suitable for merged DRAM/logic LSIs, which is called "dynamically variable line-size cache" (D-VLS cache). The D-VLS cache can optimize its line-size according to the characteristic of programs, and attempts to improve the performance by exploiting the high on-chip memory bandwidth on merged DRAM/logic LSIs appropriately. An average memory-access time improvement achieved by a direct-mapped D-VLS cache may be about 20% compared to a conventional direct-mapped cache with fixed 32-byte lines. This performance improvement may be better than that of a doubled-size conventional direct-mapped cache.

Integrating processors and main memory (DRAM) on the same chip, or merged DRAM/logic LSI, can offer a number of advantages for breaking technological limitations of conventional system design. Especially, the high on-chip memory bandwidth, which may be one of the advantages of the merged DRAM/logic LSIs, may produce significant performance advantages, because it can improve data-transferability between the processors and the main memory dramatically.

For merged DRAM/logic LSIs with a memory hierarchy including cache memory, high on-chip memory bandwidth can be exploited by means of replacing a whole cache line at a time on cache misses. This approach tends to increase the cache line size when attempting to improve the attainable memory bandwidth. In general, large cache lines can benefit some application as the effect of prefetching. Larger cache lines, however, might worsen the system performance if programs do not have enough spatial locality and cache misses frequently take place. These kinds of cache misses (i.e., conflict misses) could be reduced by increasing the cache associativity. But this approach may make the cache access time longer.

To resolve the above-mentioned dilemma, a concept of "variable line-size cache (VLS cache)" is proposed. The VLS cache can alleviate the negative effects of larger cache line size by partitioning the large cache line into multiple small cache lines. The performance of the VLS cache may depend largely on whether or not cache replacements can be performed with adequate line-sizes. There may be at least two approaches to optimizing the cache line sizes: one is a static determination based on compiler analysis; the other is a dynamic determination using some run-time hardware support. It may be possible to adopt the former approach when target programs have regular access patterns within well-structured loops. However, a number of programs have non-regular access patterns. In addition, when a lot of programs run concurrently, the amount of spatial locality will vary both within and among programs.

One of the latter approaches is proposed, which is referred to as "dynamically variable line-size cache (D-VLS cache)" architecture, and evaluates the cost/performance improvements attainable by the D-VLS cache. The D-VLS cache may change its cache line size at run time according to the characteristics of application programs to execute. Line-size determinator selects adequate line-sizes based on recently observed data reference behavior. Since this scheme may not require any modification of instruction set architectures, the full compatibility of existing object codes can be kept. A goal of D-VLS cache is to improve the system performance of merged DRAM/logic LSIs such as PPRAM (Parallel Processing RAM) or IRAM (Intelligent RAM) by making good use of the high on-chip memory bandwidth.

Several studies have proposed coherent caches in order to produce the performance improvement of shared memory multiprocessor systems. In one proposal, the cache can adjust the amount of data stored in a cache line, and aims to produce fewer invalidations of shared data and reduce bus or network transactions. On the other hand, the VLS cache aims at improving the system performance of merged DRAM/logic LSIs by partitioning a large cache line into multiple independently small cache sublines, and adjusting the number of sublines to be enrolled on cache replacements. A fixed and adaptive sequential prefetching proposal allows us to fetch more than one consecutive cache line. This approach may need a counter for indicating the number of lines to be fetched. Regardless of the values of memory reference addresses, the counter may be used for fetching cache lines on read misses. On the other hand, the D-VLS cache may have several flags indicating the cache line size. Which flag should be used depends on memory reference addresses. In other words, the D-VLS cache can change the cache line size not only along the advance of program execution but also across data located in different memory addresses.

Excellent cache architectures exploiting spatial locality have been proposed. Some proposed caches need tables for recording the memory access history of not only cached data but also evicted data from the cache. Similarly, some proposed caches use a table for storing the situations of past load/store operations. In addition, the detection of spatial locality may rely on the memory access behavior derived from constant-stride vector accesses. On the other hand, the D-VLS cache may determine a suitable cache line size based on only the state of the cache line which is currently being accessed by the processor. Consequently, the D-VLS cache may have no large tables for storing the memory access history. Just a single bit may be added to each cache-tag for storing the memory access history.

Furthermore, the D-VLS cache attempts to make good use of the high on-chip memory bandwidth available on merged DRAM/logic LSIs. Since the high on-chip memory bandwidth allows for the transfer of any number of data (up to the width of on-chip memory bus) at a time, the D-VLS cache can utilize very large cache lines, for example 128-byte cache lines, without increasing miss penalty. The cache replacement may always complete in a constant time regardless of the cache line sizes selected.

Variable Line-Size (VLS) Cache

Terminology

Figure 6:
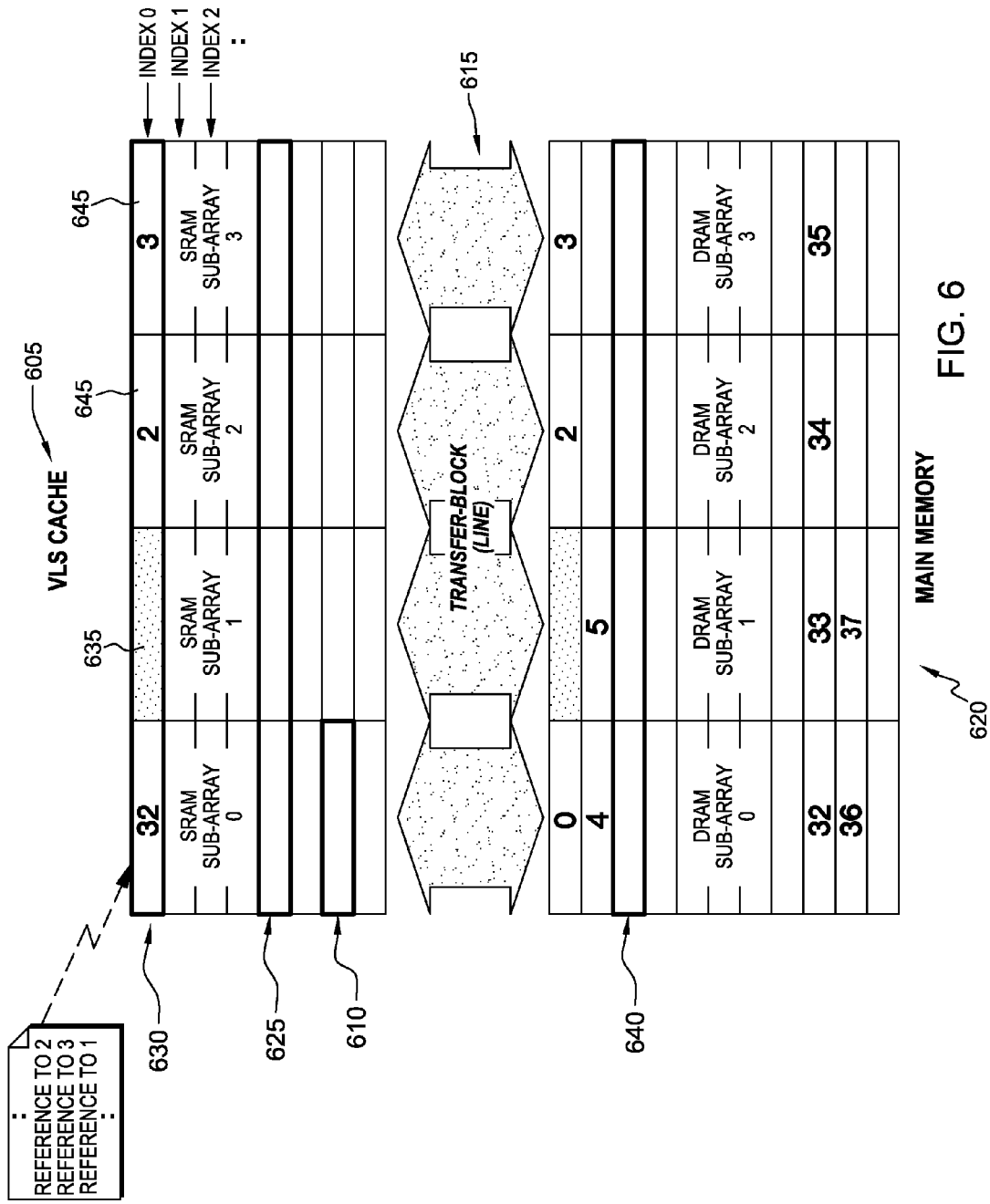
FIG. 6 is a block diagram of an example variable line-size cache.

In the VLS cache, an SRAM (cache) cell array and a DRAM (main memory) cell array may be divided into several subarrays. Data transfer for cache replacements may be performed between corresponding SRAM and DRAM subarrays. FIG. 6 is a block diagram of an example VLS cache 605 and summarizes the definition of terms.

Address-block 610, or subline, is a block of data associated with a single tag in the cache. Transfer-block 615, or line, is a block of data transferred at once between the cache 605 and main memory 620. The address-blocks from every SRAM subarray, which have the same cache-index, form a cache-sector 625. A cache-sector and an address-block which are being accessed during a cache lookup are called a reference-sector 630 and a reference-subline 635, respectively. When a memory reference from the processor has found a cache hit, referenced data resides in the reference-subline. Otherwise, referenced data is not in the reference-subline but only in the main memory 620. A memory-sector 640 is a block of data in the main-memory, and corresponds to the cache-sector. Adjacent-subline 645 is defined as follows.

It resides in the reference-sector, but is not the reference-subline.

Its home location in the main-memory is in the same memory-sector as that of the data which is currently being referenced by the processor.

It has been referenced at least once since it was fetched into the cache.

Concept and Principle of Operations

To make good use of the high on-chip memory bandwidth, the VLS cache adjusts its transfer-block size according to the characteristics of programs. When programs have rich spatial locality, the VLS cache would determine to use larger transfer-blocks, each of which consists of lots of address-blocks. Conversely, the VLS cache would determine to use smaller transfer blocks, each of which consists of a single or a few address-blocks, and could try to avoid cache conflicts.

The construction of the example direct-mapped VLS cache 605 illustrated in FIG. 6 is similar to that of a conventional 4-way set-associative cache. However, the conventional 4-way set-associative cache has four locations where a subline can be placed, while the direct-mapped VLS cache has only one location for a sub-line, just like a conventional direct-mapped cache. Since the VLS cache can avoid cache conflicts without increasing the cache associativity, the access time (i.e., hit time) is shorter than that of conventional caches with higher associativity.

The VLS cache works as follows: (1) When a memory access takes place, the cache tag array is looked up in the same manner as normal caches, except that every SRAM subarray has its own tag memory and the lookup is performed on every tag memory. (2) On cache hit, the hit address-block has the required data, and the memory access performs on this address-block in the same manner as normal caches. (3) On cache miss, a cache refill takes place as follows: (a) according to the designated transfer-block size, one or more address-blocks are written back from the indexed cache-sector to their home locations in the DRAM main memory; and (b) according to the designated transfer-block size, one or more address-blocks (one of which contains the required data) are fetched from the memory-sector to the cache-sector.

Figure 7:
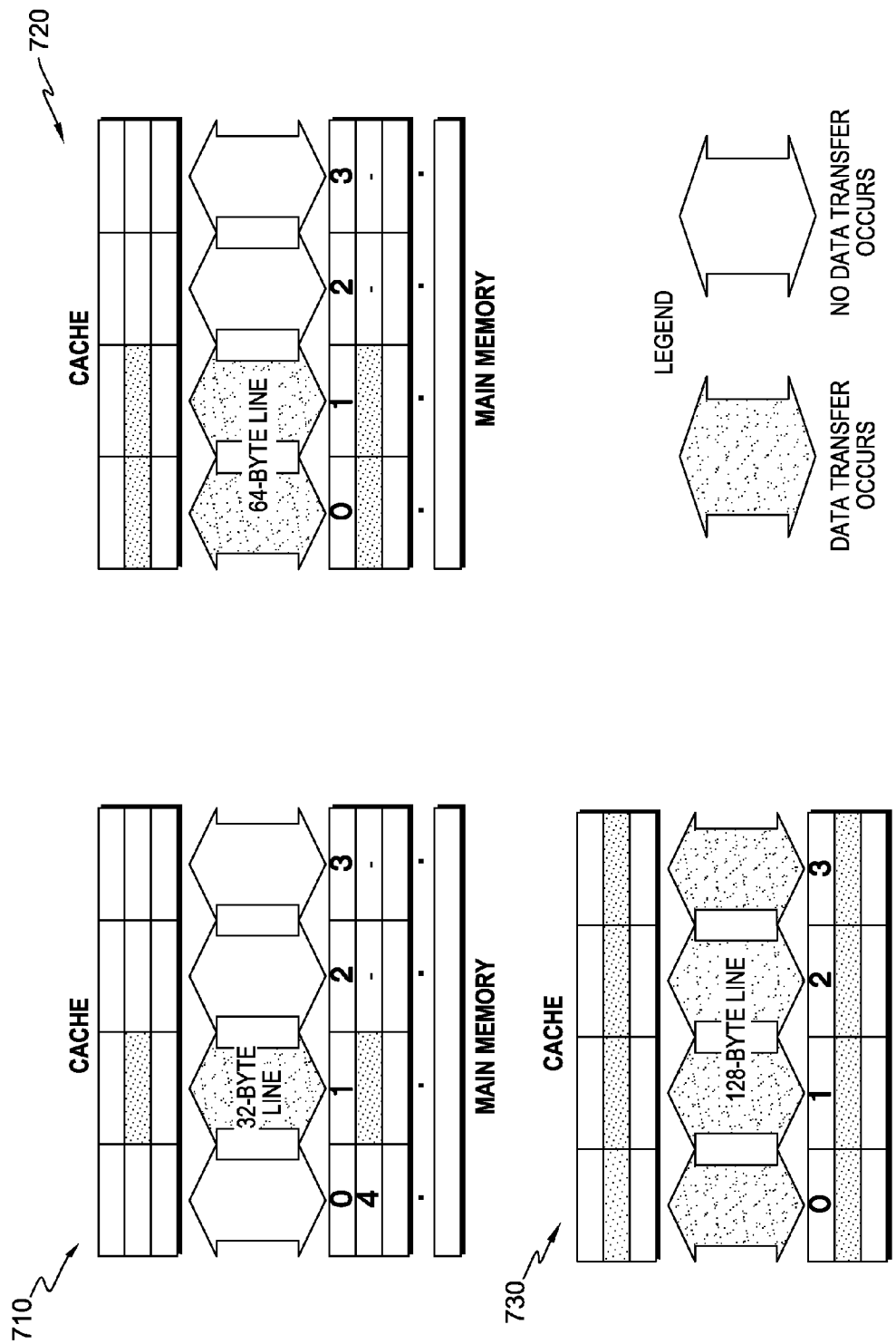
FIG. 7 is a block diagram of an example direct-mapped variable line-size cache.

For the example VLS cache shown in FIG. 7, there are three possible transfer-block sizes as follows:

Minimum transfer-block size 710, where only the designated address-block is involved in cache replacements.

Medium transfer-block size 720, where the designated address-block and one of its neighbors in the corresponding cache-sector are involved.

Maximum transfer-block size 730, where the designated address-block and all of its neighbors in the corresponding cache-sector are involved.

Dynamically VLS (D-VLS) Cache Architecture

The performance of the VLS cache depends heavily on how well the cache replacement is performed with optimal transfer-block size. However, the amount of spatial locality may vary both within and among program executions. The line-size determinator for the D-VLS cache selects adequate line-sizes based on recently observed data reference behavior.

Figure 8:
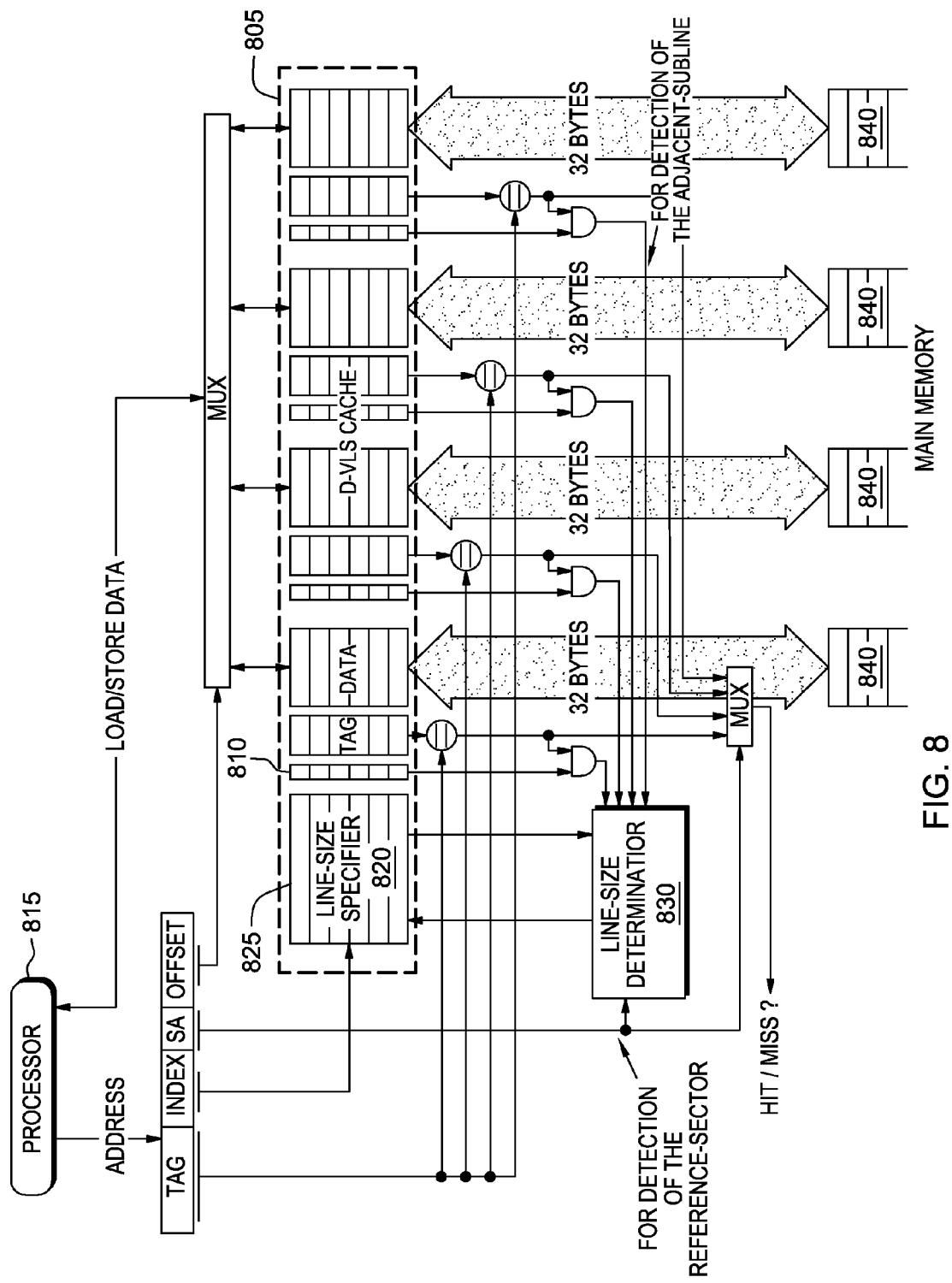
FIG. 8 is a block diagram of an example direct-mapped variable line-size cache with four subarrays.

FIG. 8 illustrates a block diagram of an example direct-mapped D-VLS cache 805 with four subarrays 840. The address-block size is 32 bytes, with the following three transfer-block sizes:

Minimum transfer-block size (=32 bytes) involving just one (=$2^0$) address-block, Medium transfer-block size (=64 bytes) involving two (=$2^1$) address-blocks, and Maximum transfer-block size (=128 bytes) involving four (=$2^2$) address-blocks.

Since it is not allowed that the medium transfer-block misaligns with the 64-byte boundary in the 128-byte cache-sector, the number of possible combinations of address-blocks involved in cache replacements is just seven (four for minimum, two for medium, and one for maximum transfer-block size, respectively) rather than fifteen (=$2^4-1$).

The D-VLS cache provides the following for optimizing the transfer-block sizes at run time:

A reference-flag bit 810 per address-block: This flag bit is reset to 0 when the corresponding address block is fetched into the cache, and is set to 1 when the address-block is accessed by the processor 815. It is used for determining whether the corresponding address block is an adjacent-subline. On cache lookup, if the tag of an address-block which is not the reference-subline matches the tag field of the address and if the reference flag bit is 1, then the address-block is an adjacent subline.

A line-size specifier (LSS) 820 per cache-sector: this specifies the transfer-block size of the corresponding cache-sector. Preferably, each cache-sector is in one of three states: minimum, medium, or maximum transfer-block-size states. To identify these states, every LSS provides a 2-bit state information. This means that the cache replacement is performed according to the transfer-block size which is specified by the LSS corresponding to the reference sector. The LSS is maintained in the LSS-table 825, as shown in FIG. 8.

Line-size determinator (LSD) 830: On every cache lookup, the LSD determines the state of the line-size specifier of the reference-sector. The D-VLS cache works as follows: (1) The address generated by the processor is divided into the byte offset within an address-block, subarray field designating the subarray, index field used for indexing the tag memory, and tag field. (2) Each cache subarray has its own tag memory and comparator, and it can perform the tag-memory lookup using the index and tag fields independently with each other. At the same time, the LSS corresponding to the reference-sector is read using the index field from the LSS-table. (3) One of the tag-comparison results is selected by the subarray field of the address, and then the cache hit or miss is determined. (4) On cache miss, a cache replacement is performed according to the state of the LSS. (5) Regardless of hits or misses, the LSD determines the state of the LSS. After that, the LSD writes back the modified LSS to the LSS-table.

Line-Size Determinator Algorithm

The algorithm for determining adequate transfer-block sizes is very simple. This algorithm is based not on memory-access history but on the current state of the reference-sector. This means that no information of evicted data from the cache needs to be maintained. On every cache lookup, the LSD determines the state of the LSS of the reference-sector, as follows: (1) The LSD investigates how many adjacent-sublines exist in the reference-sector using all the reference flag bits and the tag-comparison results. (2) Based on the above-mentioned investigation result and the current state of the LSS of the reference sector, the LSD determines the next state of the LSS.

If there are many neighboring adjacent-sublines, the reference-sector has good spatial locality. This is because the data currently being accessed by the processor and the adjacent-sublines are fetched from the same memory-sector, and these sublines have been accessed by the processor 815 recently. In this case, the transfer-block size should become larger. Thus the state may transit from the minimum state (32-byte line) to the medium state (64-byte line) or from the medium (64-byte line) state to the maximum state (128-byte line) when the reference-subline and adjacent-sublines construct a larger line-size than the current line-size.

In contrast, if the reference-sector has been accessed sparsely before the current access, there should be few adjacent-sublines in the reference-sector. This means that the reference-sector has poor spatial locality at that time. In this case, the transfer-block size should become smaller. So the state transits from the maximum state (128-byte line) to the medium state (64-byte line) when the reference subline and adjacent-sublines construct equal or smaller line-size than the medium line-size (64-byte or 32-byte line). Similarly, the state transits from the medium state (64-byte line) to the minimum state (32-byte line) when the reference-subline and adjacent-sublines construct minimum line-size (32-byte line).

As previously described, transactional semantics in transactional memory systems may be enforced by tracking the memory locations read and written by each transaction. If multiple transactionally executing logical processors or processor threads access the same memory in a conflicting way, one or more of the competing transactions may be aborted. For example, two accesses from two different transactions of the same memory location may be conflicting if at least one of the accesses is a write.

Transactional memory systems may leverage a cache coherence protocol to enforce transactional semantics, using cache lines as the granularity of memory accesses to detect transaction conflicts. For example, each cache line may be associated with transactional access bits in addition to the valid bit, coherence state bits, and other descriptive bits that may be associated with the cache line for maintaining cache coherence and for other various uses. A transactional read bit (R) may be added to indicate whether any part of a cache line has been read during execution of a transaction. A transactional write bit (W) may be added to indicate whether any part of a cache line has been written during execution of a transaction. If a processor is multithreading capable, all or some of said bits might be kept per thread activities.

When transactional accesses are monitored using cache lines, transaction conflicts may result when multiple transactionally executing processors in the computing environment access any part of the same cache line in a conflicting manner. A false conflict may occur when a first transaction accesses memory address A, a second transaction concurrently accesses memory address B, and addresses A and B reside in the same cache line. Although the transactions are accessing different memory locations, the locations A and B are in close enough proximity to be included in a single cache line. Such false conflicts can lead to performance degradation. Smaller cache line sizes can minimize the occurrence of false conflicts; however, smaller cache line sizes can also adversely affect system performance in other ways.

The frequency of false transaction conflicts may be reduced while retaining the benefits of larger cache line sizes by using a configurable cache line size. With a configurable cache line size, cache lines that are involved in a high number of transaction conflicts may be identified and managed with a finer sub-cache line granularity. The remaining cache lines may continue to be managed with the full cache line granularity and therefore continue to provide the benefits of the larger cache line size. The number of cache lines designated as high-conflict cache lines may be kept below a certain number or below a certain percentage of cache lines in the environment to avoid adversely impacting performance.

Cache control logic enforcing a coherence protocol with a configurable cache line size may manage the data in the caches at the granularity of a full cache line by default. Each cache line in full-line coherency mode is managed as a full cache line, while each cache line in sub-line coherency mode is managed as a plurality of sub-cache line portions of a full cache line. For example, if the normal (default) cache line size is 256 bytes, full cache lines of 256 bytes are accessed, owned, shared, cast-out, invalidated, and otherwise operated and/or managed for cache lines in full-line coherency mode, while sub-cache line portions of less than 256 bytes are accessed, owned, shared, cast-out, invalidated, and otherwise operated and/or managed for cache lines in sub-line coherency mode. A normal, full cache line of 256 bytes may be managed as two sub-lines of 128 bytes each, as four sub-lines of 64 bytes each, or in some other manner when in sub-line coherency mode. A full cache line of 1024 bytes may be managed as two sub-lines of 512 bytes each, as eight sub-lines of 128 bytes each, or in some other manner when in sub-line coherency mode. The number and size of the sub-cache line portions may be fixed or programmable.

Figure 9:
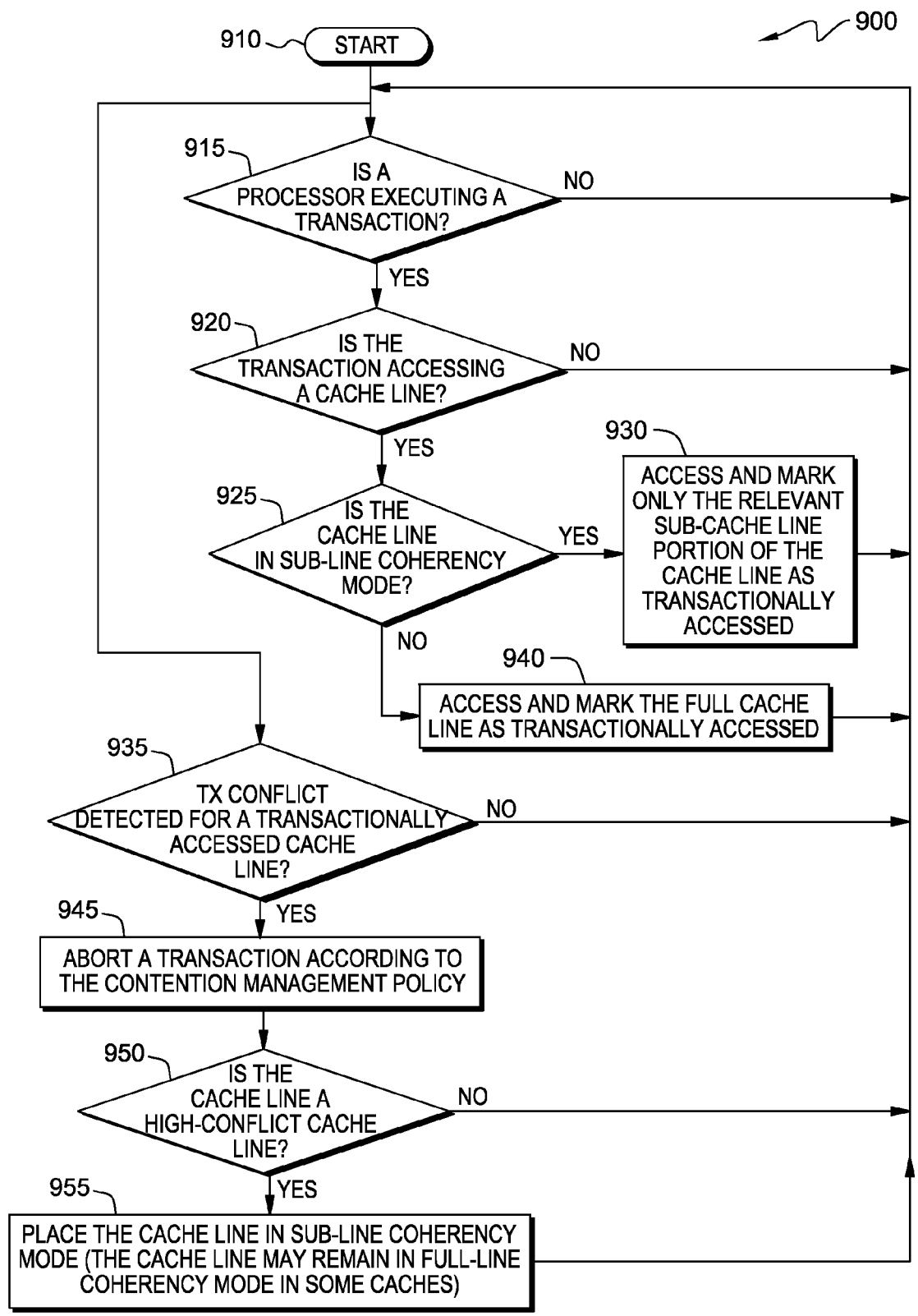
FIG. 9 is a flow diagram illustrating an example method for detecting and reducing transaction conflicts.

FIG. 9 illustrates an example method 900 for detecting and reducing transaction conflicts that may reduce the number of false conflicts. At start 910, if a logical processor in the computing environment is executing a transaction at 915, and if that transaction will be accessing a cache line at 920, then the method determines whether the cache line that will be accessed by the transaction is already in sub-line coherency mode at 925. A cache line may be in sub-line coherency mode for any number of reasons. For example, a cache line may be in sub-line coherency mode because it has been previously determined to be a high-conflict cache line. Determining whether a cache line is in sub-line coherency mode may be accomplished by checking a flag bit for the cache line in a cache, by checking for representation of the cache line in a list or table maintained for a processor or group of processors, or may be accomplished in some other way. In some embodiments, determining whether a cache line is in sub-line coherency mode may be accomplished indirectly, for example by determining that the cache line is a high-conflict cache line.

If the cache line is in sub-line coherency mode at 925, then only the relevant sub-cache line portion of the cache line is accessed and marked as transactionally accessed at 930. The relevant sub-cache line portion is the sub-cache line that includes a copy of the memory address targeted in an operation by the transaction. The remaining non-relevant sub-cache line portions of the cache line are not accessed. As an example, for a cache line in sub-line coherency mode managed as four sub-cache lines, if the transaction writes memory address A, and if memory address A is associated with the third sub-cache line portion of the cache line, then a transactional W bit associated with the third sub-cache line may be set, while the W bits associated with the first, second, and fourth sub-cache lines may remain clear. A concurrent access by another transaction of the third sub-cache line may still result in a conflict, but a concurrent access by another transaction of the first, second, or fourth sub-cache line will not result in a conflict.

If the cache line is not in sub-line coherency mode at 925, even when the cache line is not necessarily accessed in full, the full cache line is marked as transactionally accessed at 940. A transactional R bit, W bit, or other bit associated with the full cache line may be set, depending on the type of access.

Alternatively at start 910, if a transaction conflict is detected for a transactionally accessed cache line at 935, then one or more of the conflicting transactions is aborted at 945. A contention management policy, examples of which are described above, may govern which of the conflicting transactions is aborted. The method then determines whether this cache line is a high-conflict cache line at 950. Methods for determining whether a cache line is a high-conflict cache line are discussed below, and may include, for example, examining a flag or other indicator associated with the cache line, or by examining a counter associated with the cache line in a conflict address detection table.

If the cache line is determined to be a high-conflict cache line at 950, then the cache line is placed in sub-line coherency mode at 955, and subsequently, new transactions will access the cache line at a sub-cache line granularity. Placing the cache line in sub-line coherency mode may or may not include, for example, setting a flag or other external indicator associated with the cache line, or placing an entry representing the cache line in a table or list. The high-conflict cache line may remain in full-line coherency mode in other caches that are not aware of the cache line's high-conflict status.

Placing a high-conflict cache line in sub-line coherency mode at 955 may reduce the occurrence of false conflicts since a smaller range of memory addresses are marked during transactional accesses at 930. However, access patterns for cache lines may change over time, and a cache line that once was a high-conflict cache line may no longer be associated with a high number of conflicts. A similar method used to determine when a cache line qualifies as a high-conflict line may also be used to determine if a high-conflict cache line transitions to a typical, acceptable, or normal number of transactional conflicts. Such a former high-conflict cache line may then be returned to full-line coherency mode. Alternatively, a high-conflict cache line may be reset to normal, full-line coherency mode periodically, for example after a threshold amount of time or a threshold number of processor cycles has elapsed, or after a threshold number of instructions or transactions has completed. A former high-conflict cache line that again meets the high-conflict requirements may be returned to sub-line coherency mode. Accordingly, a cache line may periodically transition between high-conflict and normal status.

A configurable cache line size may also be effective in reducing the amount of false sharing of cache lines in a multi-processor computing environment, with or without transactional memory. False sharing occurs when multiple processors access the same cache line in a conflicting manner, but each processor is targeting a distinct, non-overlapping portion of the cache line. For example, when a first processor writes to a memory location in a copy of a cache line residing in a first cache, cache control logic following a cache coherence protocol may invalidate all other copies of that cache line residing in other caches. A subsequent read of an invalidated copy of the shared cache line from a second cache is termed a coherence miss, and a coherence request must be issued to update the second cache with the most recent version of the cache line. The most recent version may be obtained directly from the first cache, may be obtained from a higher level cache, or may be obtained from main memory depending on the coherence protocol and other factors in the computing environment.

False sharing may occur when a first processor writes to a cache line in a first cache targeting memory address A, invalidating all other cache copies of the cache line and causing a subsequent coherence miss during an access of memory address B in a second cache by a second processor. Although the processors are accessing different memory locations, the locations A and B are in close enough proximity to be included in a single cache line. Such false sharing can lead to performance degradation. Smaller cache line sizes can minimize false sharing; however, smaller cache line sizes can also adversely affect system performance in other ways.

The amount of false sharing may be reduced while retaining the benefits of larger cache line sizes by using a configurable cache line size. With a configurable cache line size, cache lines that are involved in a high number of coherence misses may be identified and managed with a finer sub-cache line granularity. The remaining cache lines may continue to be managed with the full cache line granularity and therefore continue to provide the benefits of the larger cache line size. The number of cache lines designated as high-coherence-miss cache lines may be kept below a certain number or below a certain percentage of cache lines in the environment to avoid adversely impacting performance.

Figure 10:
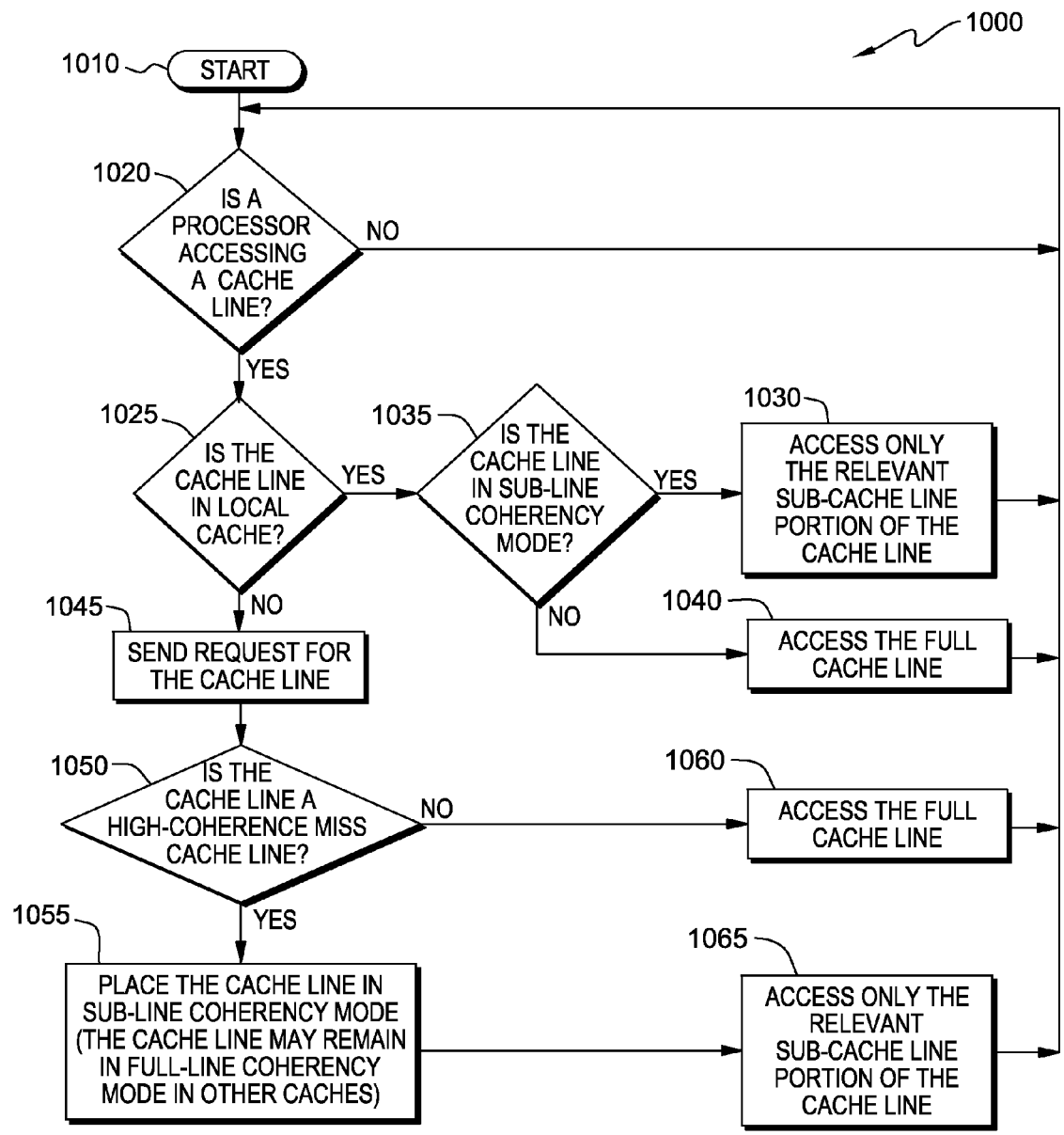
FIG. 10 is a flow diagram illustrating an example method for cache management.

FIG. 10 illustrates an example method 1000 for cache management that may reduce the incidence of false sharing. At start 1010, if a logical processor in the computing environment will be accessing a cache line at 1020, and if the logical processor has a valid copy of the cache line in its local cache at 1025, then the method determines whether the cache line that will be accessed is already in sub-line coherency mode at 1035. A cache line may be in sub-line coherency mode for any number of reasons. For example, a cache line may be in sub-line coherency mode because it has been previously determined to be a high-conflict cache line or a high-coherence-miss cache line. Determining whether a cache line is in sub-line coherency mode may be accomplished by checking a flag bit for the cache line in a cache, by checking for representation of the cache line in a list or table maintained for a processor or group of processors, or may be accomplished in some other way. In some embodiments, determining whether a cache line is in sub-line coherency mode may be accomplished indirectly, for example by determining that the cache line is a high-coherence-miss cache line.

If the cache line is in sub-line coherency mode at 1035, then only the relevant sub-cache line portion of the cache line is accessed at 1030. The relevant sub-cache line portion is the sub-cache line that includes a copy of the memory address targeted in an operation by the processor. The remaining non-relevant sub-cache line portions of the cache line are not accessed. As an example, for a cache line in sub-line coherency mode managed as four sub-cache lines, if the processor accesses memory address A, and if memory address A is associated with the second sub-cache line portion of the cache line, then only the coherence state of the second sub-cache line is relevant. If the second sub-cache line has been invalidated and the access requires a clean copy, then a coherence miss will result. Whether the first, third, and fourth sub-cache lines are invalidated is irrelevant. If the cache line is not in sub-line coherency mode at 1035, then the full cache line is considered to be accessed at 1040. If the processor is performing a write operation, then all copies of the cache line in other caches may be invalidated.

If the logical processor does not have a valid copy of the cache line in its local cache at 1025, then a request is issued for the cache line at 1045. In some cases, the cache line was previously invalidated from the local cache due to a coherence event; such a cache miss may be called a coherency miss. The method then determines whether this cache line is a high-coherence-miss cache line at 1050. Methods for determining whether a cache line is a high-coherence-miss cache line are discussed below, and may include, for example, examining a flag or other indicator associated with the cache line, or by examining a counter associated with the cache line in a coherence miss detection table.

If the cache line is not a high-coherence-miss cache line at 1050, then the cache line remains in full-line coherency mode, the full cache line is accessed at 1060. But if the cache line is determined to be a high-coherence-miss cache line at 1050, then the cache line is placed in sub-line coherency mode at 1055, and a relevant sub-cache line portion of the cache line is accessed at 1065. Placing the cache line in sub-line coherency mode may or may not include, for example, setting a flag or other external indicator associated with the cache line, or placing an entry representing the cache line in a table or list. The high-coherence-miss cache line may remain in full-line coherency mode in other caches that are not aware of the cache line's high-coherence-miss status.

Placing a high-coherence-miss cache line in sub-line coherency mode at 1055 may reduce the occurrence of false sharing since a smaller range of memory addresses are invalidated in conjunction with a write operation. However, access patterns for cache lines may change over time, and a cache line that once was a high-coherence-miss cache line may no longer be associated with a high number of coherence misses. A similar method used to determine when a cache line qualifies as a high-coherence-miss line may also be used to determine if a high-coherence-miss cache line transitions to a typical, acceptable, or normal number of coherence misses. Such a former high-coherence-miss cache line may then be returned to full-line coherency mode. Alternatively, a high-coherence-miss cache line may be reset to normal, full-line coherency mode periodically, for example after a threshold amount of time or a threshold number of processor cycles has elapsed, or after a threshold number of instructions or cache misses has completed. A former high-coherence-miss cache line that again meets the high-coherence-miss requirements may be returned to sub-line coherency mode. Accordingly, a cache line may periodically transition between high-coherence-miss and normal status.

Figure 11:
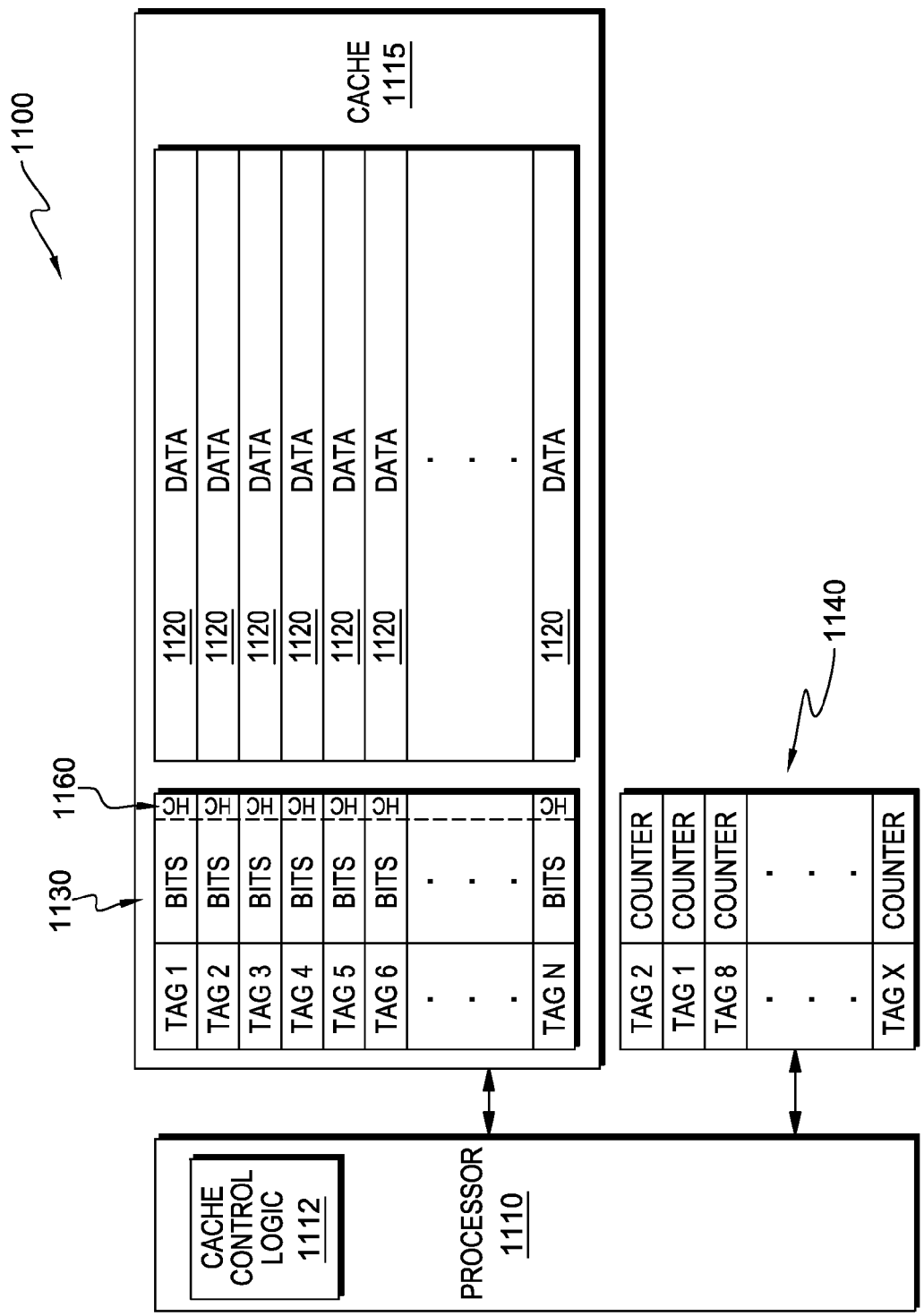
FIG. 11 is a block diagram representing an example system for identifying high-contention cache lines.

FIG. 11 is a block diagram representing an example system 1100 for identifying high-contention cache lines such as high-conflict cache lines and high-coherence-miss cache lines, and other problematic cache lines. Processor 1110 contains cache control logic 1112 and is associated with a cache 1115 holding a number of cache lines 1120. The cache 1115 may include a cache directory 1130 with an entry for each cache line 1120. For each cache line, the directory may include a tag that identifies the locations in main memory represented in the cache line. Although system 1100 shows a simplified cache structure with a simple identifying tag associated with a single line of contiguous memory, any cache configuration that associates an identifier with a portion of memory is contemplated. Cache directory 1130 may also include a set of descriptive bits that provides information about the cache line. The set of descriptive bits may include a valid bit, a set of coherence state bits (for example, MESI bits), transactional access bits, and other bits describing attributes of the cache line.

Detection table 1140 is a table of counters that may be used to track the number of times any particular cache line 1120 is contended in a particular manner. For example, detection table 1140 may be a conflict address detection table for tracking the number of transaction conflicts associated with a particular cache line, or may be a coherence miss detection table for tracking the number of coherence misses associated with a particular cache line. In some embodiments, detection table 1140 may be a combination table that can track multiple types of qualifying contentions of the cache line. Detection table 1140 may be part of the same cache structure that includes directory 1130 and cache lines 1120 or may be independent of that cache structure.

Each entry in detection table 1140 corresponds to an individual cache line 1120, and may be identified using the same tag used to identify the cache line in the cache directory. Each entry may include one or more counters associated with each cache line. A counter may be incremented, for example by detection logic in processor 1110, with each qualifying contention of the cache line. The counters may be saturating counters to avoid rolling over to zero if the counters' maximum values are reached. Detection table 1140 may be preconfigured to hold a fixed number of entries or may be of variable or programmable size. In some embodiments, a hash of the tag used in the directory may be used for identification in the detection table 1140 to reduce the amount of address bits used. In some embodiments, an entry in the detection table 1140 may represent multiple adjacent cache lines.

Ideally, detection table 1140 may be small compared to the cache size and may have fewer entries than the number of cache lines 1120 in the cache 1115; therefore not every cache line in the cache may be tracked in detection table 1140. In example system 1100, the first two cache lines in the cache, identified in cache directory 1130 by TAG 1 and TAG 2, have corresponding entries in detection table 1140 and therefore have counters that are tracking the qualifying contentions of those cache lines. The third cache line, identified in cache directory 1130 by TAG 3, does not have an entry in detection table 1140, indicating that the third cache line has not experienced a qualifying contention since the last time that detection table 1140 was cleared, or since the last time that the third cache line's entry was invalidated or removed from the detection table, for example to make room for a new entry. Qualifying contentions may be one or more of transaction conflicts, coherence misses, or other types of contentions where reducing the cache line size can reduce false positives and improve performance. Since replacements of the cache can be managed differently than replacements in the detection table, an entry, such as TAG X, in the detection table, may not exist concurrently in the cache directory 1130. In some embodiments, when a cache line ages out of the cache 1115, any corresponding entries in detection table 1140 may be invalidated.

Detection table 1140 may track a single type of qualifying contention or multiple types. For example, detection table 1140 may be a conflict address detection table for identifying high-conflict cache lines, or may be a coherence miss detection table for identifying high-coherence-miss cache lines. In some embodiments, detection table 1140 may track more than one type of qualifying contention either individually or combined. For example, detection table 1140 may have a single entry for a cache line with separate counters for transaction conflicts and coherence misses. Alternatively, detection table 1140 may have a single entry for a cache line with a single counter for both transaction conflicts and coherence misses.

Figure 12:
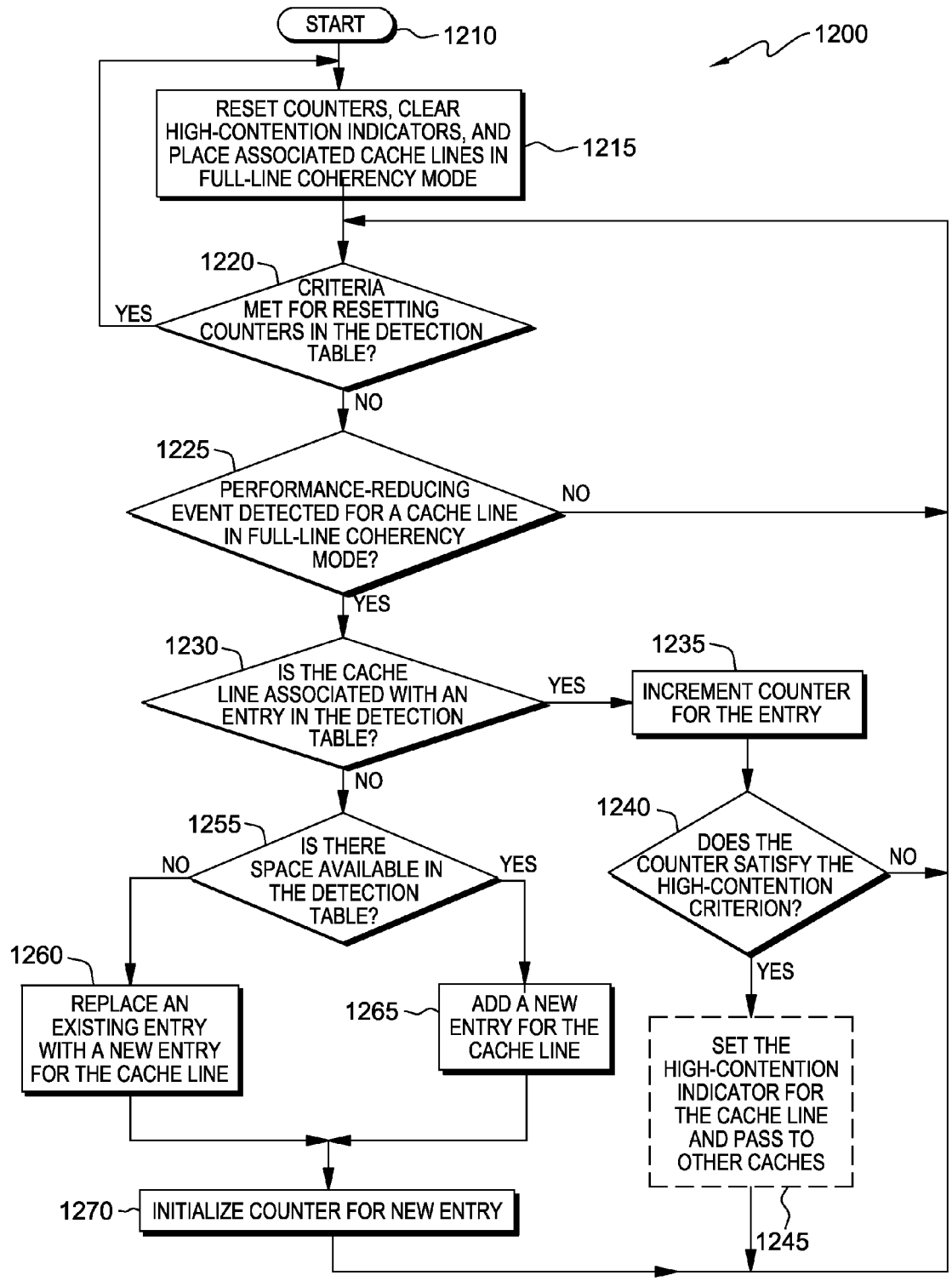
FIG. 12 is a flow diagram illustrating an example method for identifying problematic cache lines.

FIG. 12 illustrates an example method 1200 for identifying problematic cache lines, such as high-conflict cache lines and high-coherence-miss cache lines. Method 1200 may be used in conjunction with example system 1100 of FIG. 11 or with any other system configured with a detection table suitable for tracking cache line contentions. Method 1200 may also be used in conjunction with method 900 of FIG. 9 and/or method 1000 of FIG. 10 to identify problematic cache lines. In some embodiments, cache lines identified as problematic will be placed in sub-line coherency mode.

At start 1210, one or more counters in a detection table are cleared, reset, or otherwise initialized at 1215. The counters may be reinitialized periodically if criteria is met that indicates that it is time to reset the counters at 1220. Although method 1200 describes a specific action taken at 1220 to determine whether it is time to reset the counters after detecting and processing performance-reducing events, such as a cache line contention, this function may be a timer or other separate process running concurrently with the detection logic. Any suitable protocol for periodically clearing the counters can be utilized, for example, after every billion processing cycles, or every millisecond. Associated cache lines in sub-line coherency mode may revert to full-line coherency mode when the counters are cleared. Some embodiments may not periodically clear the entire detection table, and may rely on other mechanisms to ensure that no individual entry remains in the table past its usefulness. Each counter in the table may be associated with one or more reset criteria, and the counter may be reset when an associated reset criterion is satisfied. Reset criteria may include, for example, a period of time has elapsed, a number of instructions have completed, or a cache line associated with the counter is cast out of a cache. Because application behavior changes over time, cache lines that were previously problematic may later be non-problematic, and detection mechanisms preferably are designed to allow formerly problematic cache lines to revert to full-line coherency mode.

If it is not time to reset the counters at 1220, then the method determines at 1225 whether a qualifying performance-reducing event has occurred associated with a cache line in full-line coherency mode, such as detection of a transaction conflict or of a coherence miss. If such an event has occurred at 1225, the method checks whether the cache line has an associated entry in the detection table at 1230. If the detection table already has an entry for the cache line at 1230, then a counter associated with that entry is incremented at 1235.

If the incremented counter satisfies a high-contention criterion at 1240, such as a high-conflict criterion or a high-coherence-miss criterion, then the cache line is a problematic cache line. The high-contention criterion may be predetermined for the computing environment or may be configurable, user-selectable, or dynamically determined at program run-time. In some embodiments, the criterion may be satisfied when the incremented counter reaches a threshold value. In some embodiments, the criterion may be satisfied when the incremented counter reaches a threshold percentage of the total number of conflicts, coherence misses, or other performance-impacting events in the computing environment. For example, a cache line could be problematic if it is responsible for 1% of all conflicts.

In some embodiments, if the incremented counter satisfies the high-contention criterion at 1240, an indicator may be set at 1245 to define the cache line as a high-contention cache line, and the indicator may be subsequently passed to other caches according to a cache coherence protocol. For example, returning briefly to FIG. 11, descriptive bits in directory 1130 may include a high-conflict indicator 1160. A cache line determined to be a high-conflict cache line may have its high-conflict indicator set at 1245, so that logic subsequently accessing the cache line can examine the indicator to determine whether the cache line is a high-conflict cache line. In some embodiments, no indicator is set. When no indicator is set, logic subsequently accessing the cache line may examine the detection table and the counters associated with the cache line to determine whether the cache line is a problematic cache line.

If the detection table has no entry for the cache line at 1230, then a new entry for the cache line may be placed in the detection table. If the detection table has unused entries available at 1255, then the new entry may be added to the table at 1265. If the detection table has no unused entries available at 1255, then an existing entry may be replaced at 1260. The counters associated with the new entry may then be initialized at 1270 to show that a first performance-reducing event associated with the cache line has been detected. If the new entry is replacing an existing entry, any suitable protocol for selecting a candidate entry for replacement may be followed. For example, the least recently used or updated entry may be replaced, or the entry with the smallest counter value may be replaced.

Figure 13:
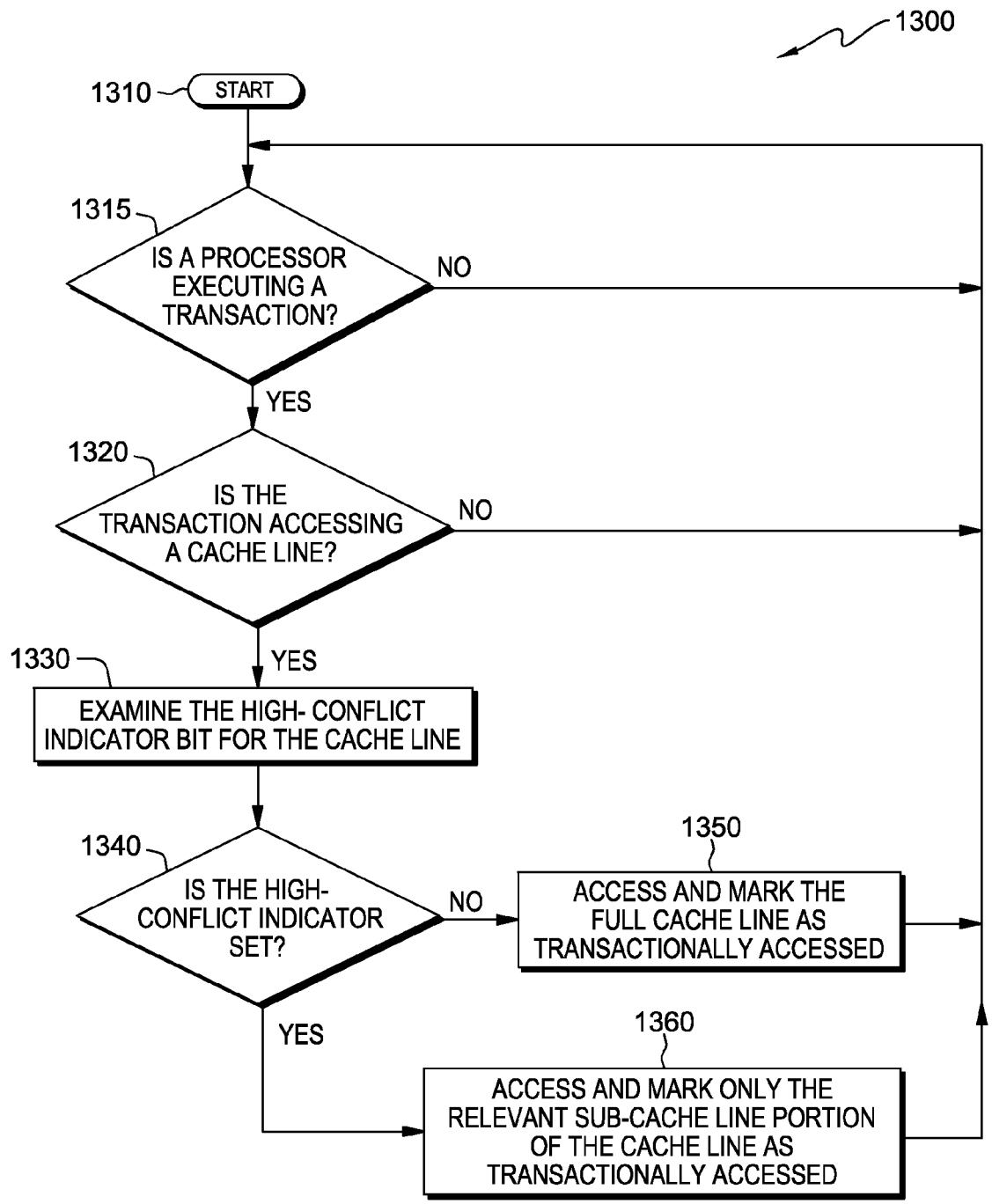
FIG. 13 is a flow diagram illustrating an example method for cache management.

For embodiments that set an indicator at 1245, an example method 1300 for cache management that may reduce the incidence of transaction conflicts is illustrated in FIG. 13. Although method 1300 is specifically for transaction conflicts, a similar method could be used for coherence misses and other events that may reduce the incidence of false sharing and other performance-impacting events. At start 1310, if a logical processor in the computing environment is executing a transaction at 1315, and if that transaction will be accessing a cache line at 1320, then the method examines a high-conflict indicator associated with the cache line at 1330.

If the high-conflict indicator is set at 1340, then the cache line is in sub-line coherency mode and only the relevant sub-cache line portion of the cache line is accessed and marked as transactionally accessed at 1360. The relevant sub-cache line portion is the sub-cache line that includes a copy of the memory address targeted in an operation by the transaction. The remaining non-relevant sub-cache line portions of the cache line are not accessed. If the high-conflict indicator is not set at 1340, then the cache line is in full-line coherency mode. Even when the cache line is not necessarily accessed in full, the entire cache line is marked as transactionally accessed at 1350 when in full-line coherency mode.

In some embodiments, the high-conflict indicator is one of the descriptive bits associated with the cache line; therefore a copy of the high-conflict indicator resides in each cache that has a copy of the cache line. Detection logic associated with a first cache may determine that the cache line is a high-conflict cache line and set the high-conflict bit for that line in the first cache. Even if detection logic associated with a second cache has not determined that the cache line is a high-conflict cache line, if that second cache obtains an updated copy of the cache line, directly or indirectly from first cache, the high-conflict bit may be set.

A high-conflict indicator may be associated with one or more reset criteria, and the indicator may be reset when an associated reset criterion is satisfied. Reset criteria may include, for example, a period of time has elapsed, a number of instructions have completed, or a cache line associated with the counter is cast out of a cache.

Figure 14:
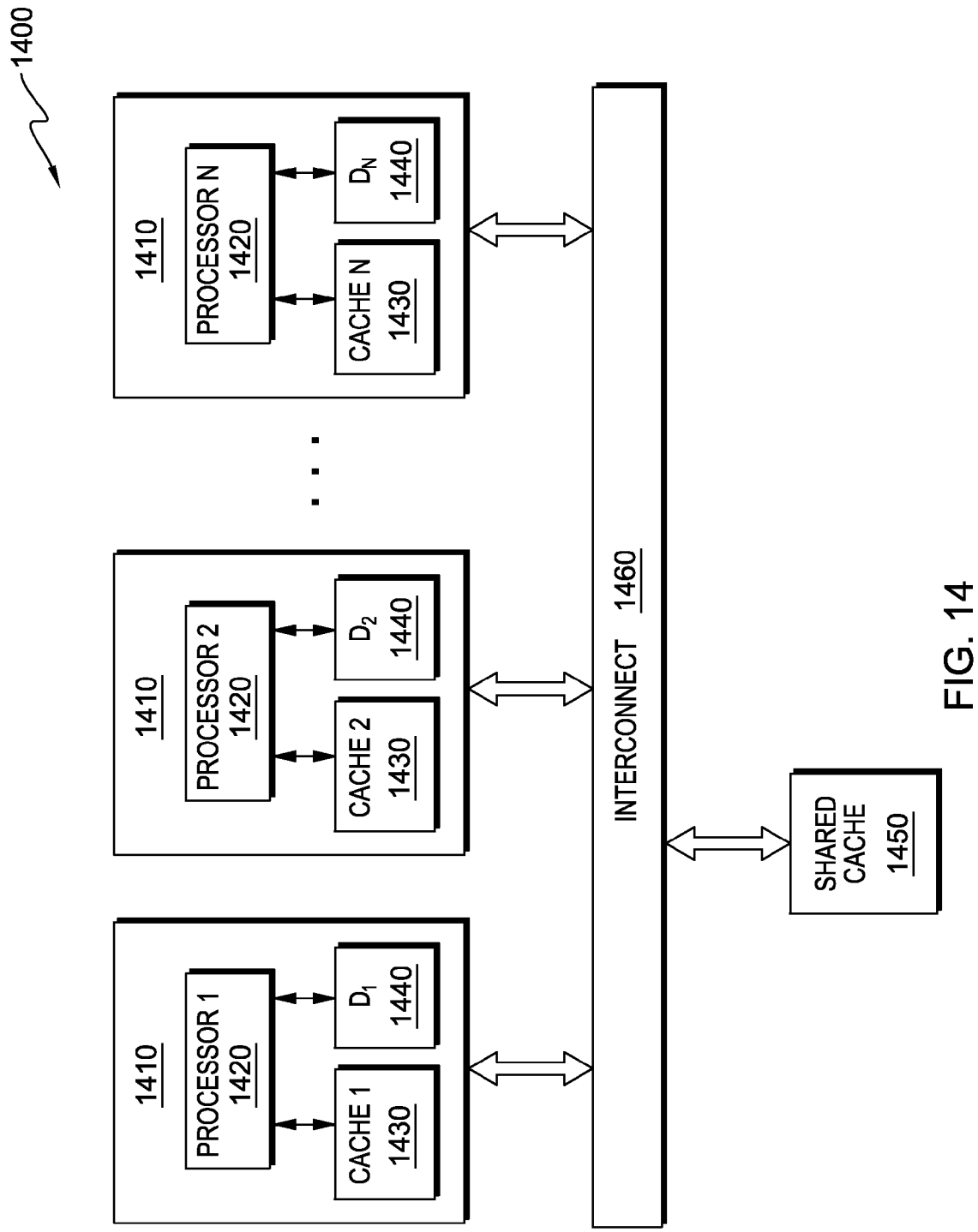
FIG. 14 is a block diagram representing an example computing environment for identifying high-contention cache lines.

FIG. 14 illustrates a high-level view of an example computing environment 1400 for identifying high-conflict cache lines, high-coherence-miss cache lines, and other types of problematic cache lines. Computing environment 1400 includes N processor systems 1410 communicating over interconnect 1460. Each processor 1420 is associated with a low level local cache 1430 and a detection table 1440, making each processor system 1410 analogous to system 1100 from FIG. 11 in some embodiments. The N processors 1420 may also be associated with one or more high level shared caches 1450 connected in a predetermined topology.

Each processor 1420 has detection logic for identifying problematic cache lines in its associated cache 1430. This detection logic may track conflicts, coherence misses, and/or other performance-reducing events in its associated detection table 1440. For example, Processor 1 manages detection table D1, whose entries correspond to entries in Cache 1, while Processor 2 manages detection table D2, whose entries correspond to entries in Cache 2.

Any or all caches 1430 may have a copy of a particular cache line at any given time. Consequently, multiple detection tables 1440 may be tracking conflicts, coherence misses, and/or other events for the same cache line. For example, Cache 1 may have a copy of Cache Line A, and detection table D1 may have an entry showing that Cache Line A is a high-conflict cache line. Cache 2 may have a copy of Cache Line A, but detection table D2 may have no entry showing that Cache Line A is a high-conflict cache line. Detection table D2 may have either no entry at all for Cache Line A, or may have an entry with a counter that has not satisfied the high-conflict criterion. Both Cache N and detection table DN may have no entry at all for Cache Line A. In this example, only Processor 1 has determined that Cache Line A is a high-conflict cache line, and therefore only Processor 1 may be realizing increased performance by detecting conflicts for Cache Line A with sub-line granularity rather than with full-line granularity.

Expanding the example to an embodiment including a high-conflict cache line indicator for each cache line, such as indicator 1160 in FIG. 11, Processor 1 can set this indicator for Cache Line A after determining that Cache Line A is a high-conflict cache line. Detection logic in Processor 1 may subsequently invalidate the entry for Cache Line A in detection table D1 to make room for another entry. The next time Cache Line A is refreshed in Cache 2, the indicator will be copied and Processor 2 can determine that Cache Line A is a high-conflict cache line by examining the indicator. In this example, Processor 2 can determine that Cache Line A is a high-conflict cache line without ever tracking Cache Line A in its detection table.

Cache Line A may be refreshed in any number of ways depending on the cache coherence protocol followed by cache control logic in the computing environment. For example, Cache 2 logic may request Cache Line A from Cache 1. For another example, Cache Line A may be cast-out from Cache 1 to shared cache 1450, and Cache 2 logic may request Cache Line A from shared cache 1450. Consequently, in embodiments supporting a high-conflict indicator associated with each cache line, transactionally executing processors may benefit from high-conflict cache line determinations made by other transactionally executing processors in the computing environment.

Rather than each processor having separate detection logic for identifying problematic cache lines in its associated local cache, detection of problematic cache lines may be performed by a centralized detector. Embodiments with centralized detection may conserve chip area and power, and may also avoid design complexities associated with some processors managing a cache line in sub-line coherency mode while other processors in the environment manage the same cache line in full-line coherency mode.

In some embodiments with centralized detection of problematic cache lines, a detection table may be maintained at each coherence point in the environment. For example, in a computing environment with a home-node-based cache coherence protocol, one centralized detection unit may be associated with each home node. In a computing environment with a snooping-based cache coherence protocol, sometimes referred to as a snoopy protocol, there may be one centralized detection unit in the system.

Figure 15:
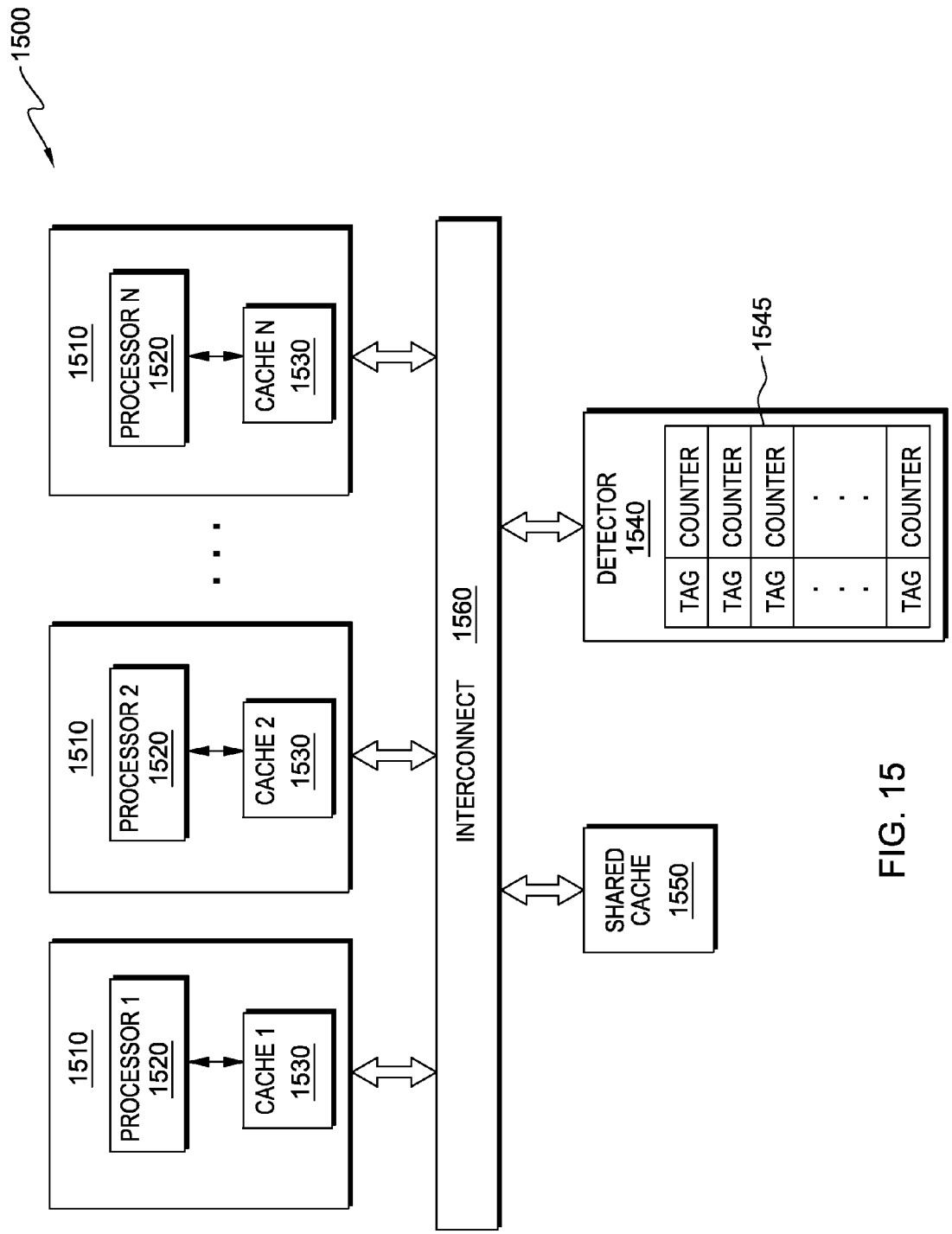
FIG. 15 is a block diagram representing an example computing environment for centralized detection of problematic cache lines.

FIG. 15 illustrates a high-level view of an example computing environment 1500 for centralized detection of high-conflict cache lines, high-coherence-miss cache lines, and other types of problematic cache lines. Computing environment 1500 includes N processor systems 1510 communicating over interconnect 1560. Each processor 1520 is associated with a low level local cache 1530. The N processors 1520 may also be associated with one or more high level shared caches 1550 connected in a predetermined topology.

Rather than each processor 1520 having separate detection logic for identifying problematic cache lines in its associated cache 1530, centralized detector 1540 may track conflicts, coherence misses, and/or other performance-reducing events in centralized detection table 1545. Detector 1540 may monitor communications on interconnect 1560 for indications that a performance-reducing event has occurred, and track such occurrences in detection table 1545. For example, when a processor detects a coherence miss associated with a cache line, it may send a request for the cache line over interconnect 1560. Detector 1540 may then detect the request and determine whether the cache line is a high-coherence-miss cache line. If detector 1540 determines that the cache line associated with the coherence miss is a high-coherence-miss cache line, then the detector will place the cache line in sub-line coherency mode and notify users of the cache line, for example by asserting a signal or modifying the request with a marker. The signal or marker may notify the recipient or targets of the message that any response should conform to sub-line coherency mode.

Detection table 1545 is a table of counters that may be used to track the number of times any particular cache line is accessed in a particular manner by any processor associated with the coherence point. For example, detection table 1545 may be a conflict address detection table for tracking the number of transaction conflicts associated with a particular cache line, or may be a coherence miss detection table for tracking the number of coherence misses associated with a particular cache line. In some embodiments, detection table 1545 may be a combination table that can track multiple types of qualifying contentions of the cache line. A method similar to example method 1200 in FIG. 12 may be used with detection table 1545 to identify problematic cache lines.

Each entry in detection table 1545 corresponds to an individual cache line in the environment, and may be identified using the same tag used to identify the cache line in the caches 1530. Each entry may include one or more counters associated with each cache line. A counter may be incremented by detector 1540 with each qualifying contention of the cache line. The counters may be saturating counters to avoid rolling over to zero if the counters' maximum values are reached. Detection table 1545 may be preconfigured to hold a fixed number of entries or may be of variable or programmable size. In some embodiments, a hash of the tag used in the directory may be used for identification in the detection table 1545 to reduce the amount of address bits used. In some embodiments, an entry in the detection table 1545 may represent multiple adjacent cache lines.

Ideally, detection table 1545 may be small compared to the cache size; therefore not every cache line in the various caches 1530 or 1550 may be tracked in detection table 1545. Qualifying contentions may be one or more of transaction conflicts, coherence misses, or other types of contentions where reducing the cache line size can reduce false positives and improve performance. In some embodiments, when a cache line ages out of all caches 1530 or 1550, any corresponding entries in detection table 1545 may be invalidated.

Detector 1540 may track a single type of qualifying contention or multiple types. For example, detection table 1545 may be a conflict address detection table for identifying high-conflict cache lines, or may be a coherence miss detection table for identifying high-coherence-miss cache lines. In some embodiments, detector 1540 may track more than one type of qualifying contention either individually or combined. For example, detection table 1545 may have a single entry for a cache line with separate counters for transaction conflicts and coherence misses. Alternatively, detection table 1545 may have a single entry for a cache line with a single counter for both transaction conflicts and coherence misses.

Figure 16:
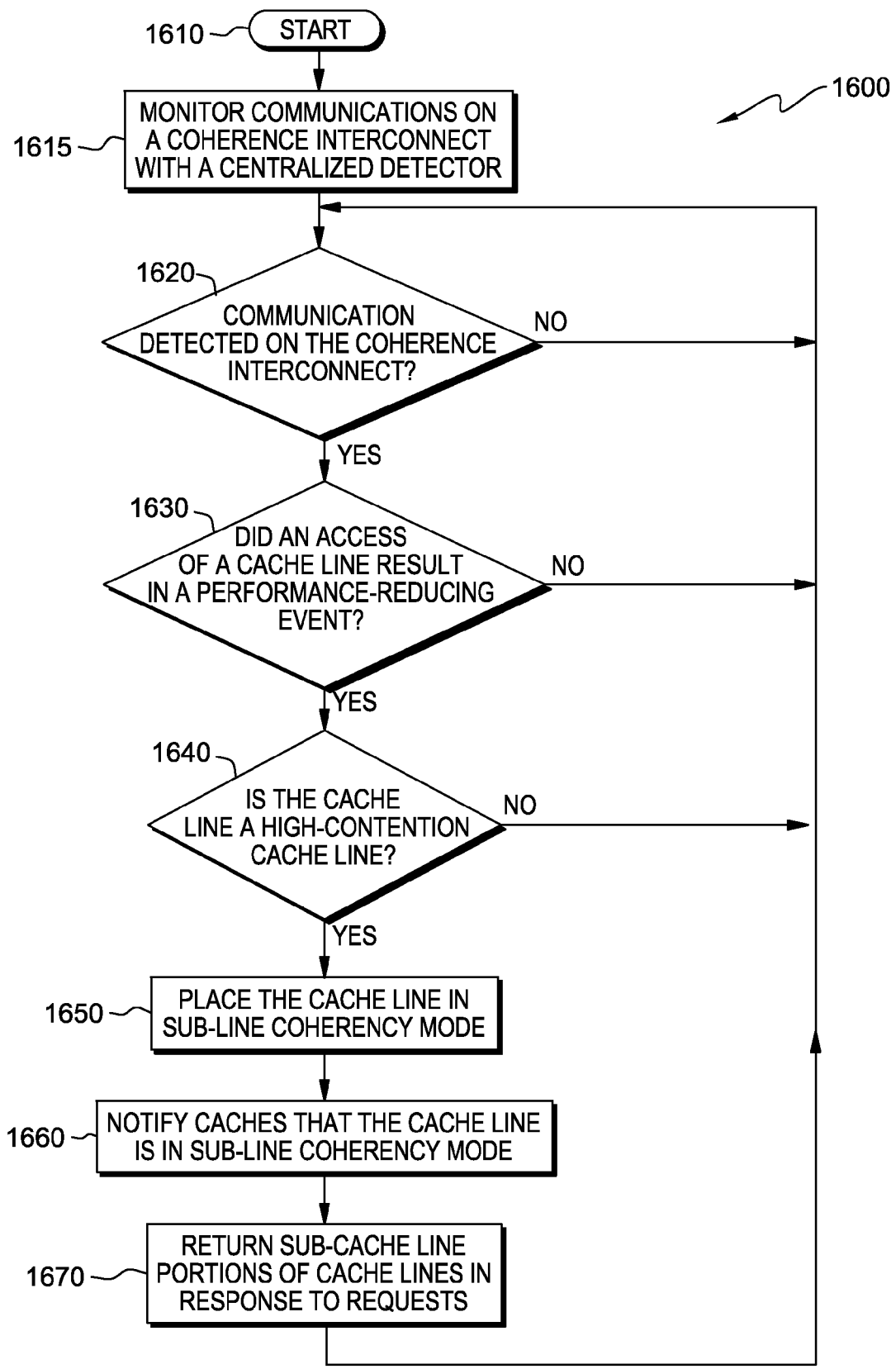
FIG. 16 is a flow diagram illustrating an example method for centralized detection of problematic cache lines.

FIG. 16 illustrates an example method 1600 for centralized detection of problematic cache lines in a computing environment. At start 1610, if a centralized detector monitoring communications on a coherence interconnect at 1615 detects a communication at 1620, and if the communication indicates that a processor's access of a cache line resulted in a performance-reducing event at 1630, then the detector determines whether the cache line is a highly contended cache line at 1640. For example, in environments implementing a snoopy coherence protocol, a first processor detecting a transaction conflict of a cache line may raise a signal on the coherence interconnect to indicate the occurrence of the transaction conflict. The centralized detector observing the signal and/or a response to the signal may then check the centralized detection table, update a counter in the table, and determine whether this particular cache line that is the source of the transaction conflict is a high-conflict cache line. If the cache line is not a high-conflict cache line at 1640, for example because a counter in the detection table associated with the cache line does not satisfy a high-conflict criterion, then the detector continues monitoring the interconnect for the next communication at 1620.

Continuing the example, a second processor detecting a transaction conflict of the same cache line may raise a signal on the coherence interconnect to indicate the occurrence of the transaction conflict. The centralized detector observing the signal and/or a response to the signal may then check the centralized detection table and update the same counter in the table. In embodiments with centralized detection, a single detector and table can monitor conflicts from multiple processors. If the cache line is still not a high-conflict cache line at 1640, then the detector continues monitoring the interconnect for the next communication at 1620.

If the detector determines that the cache line is a high-conflict, high-coherence-miss, or other type of highly contended cache line at 1640, then the cache line is placed in sub-line coherency mode at 1650, the detector notifies caches that are requesting or otherwise accessing the cache line that the cache line is in sub-line coherency mode at 1660, and subsequent requests for the cache line will result in sub-cache line portions of the cache line being returned at 1670. Placing the cache line in sub-line coherency mode may or may not include, for example, setting a flag or other external indicator associated with the cache line, or placing an entry representing the cache line in a table or list. Continuing the example above, when the centralized detector observes a subsequent request for the high-conflict cache line, it may assert a signal indicating that this cache line should be placed in sub-line coherency mode. All processors in the environment may then observe this signal, and those actively caching the high-conflict line will therefore be notified that this cache line is in sub-line coherency mode.

For another example, in environments implementing a home-node-based coherence protocol, a first processor detecting a transaction conflict of a cache line may send a notice to the home node for the cache line indicating the occurrence of the transaction conflict. The centralized detector at the home node observing the notice may then check the centralized detection table, update a counter in the table, and determine whether this particular cache line that is the source of the transaction conflict is a high-conflict cache line at 1640. If the cache line is not a high-conflict cache line, then the detector continues monitoring the interconnect for the next communication at 1620.

Continuing the example, a second processor detecting a transaction conflict of the same cache line may send a notice to the home node for the cache line indicating the occurrence of the transaction conflict. The centralized detector at the home node observing the notice may then check the centralized detection table and update the same counter in the table. If the cache line then satisfies the criterion for a high-conflict cache line at 1640, then the cache line is placed in sub-line coherency mode at 1650. When the home node receives a subsequent request for the high-conflict cache line, the centralized detector may then modify the request to indicate that the cache line is in sub-line coherency mode before the request is forwarded to all active sharers of the cache line.

Although specific examples are given above for how a centralized detector may monitor inter-processor communications to detect the occurrence of qualifying performance-impacting events such as transaction conflicts and coherence misses, and although specific examples are given of how a centralized detector may notify cache users that a particular cache line should be managed in sub-line coherency mode, these are only examples and are not limiting. A computing environment's cache coherence protocol will influence the implementation details of any suitable process for monitoring communications and for notifying cache users.

Computing environments supporting a configurable cache line size may have caches organized such that all lines in the cache may be simultaneously managed in sub-line coherency mode. Since sub-line cache management requires, at a minimum, a set of descriptive bits that provides information about each sub-cache line portion of a cache line, a cache designed to provide for simultaneously managing all lines in the cache in sub-line coherency mode can be wasteful of chip resources when some cache lines remain in full-line coherency mode. Embodiments disclosed herein for identifying problematic cache lines and subsequently placing those lines in sub-line coherency mode may perform optimally when the majority of cache lines remain in full-line coherency mode.

Figure 17:
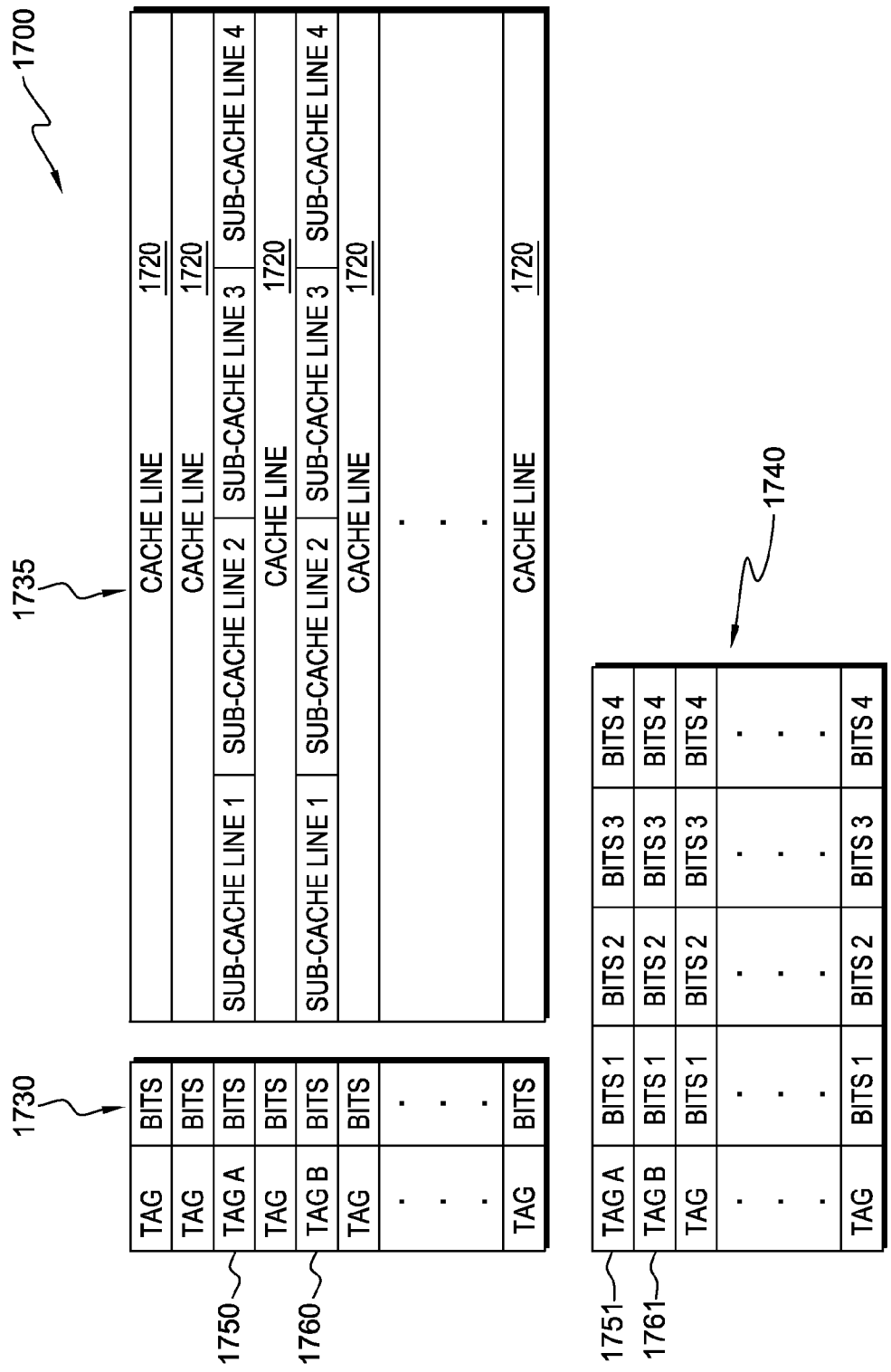
FIG. 17 is a block diagram representing an example cache structure for providing sub-line cache management.

FIG. 17 illustrates an example cache structure 1700 that may conserve chip resources by providing sub-line cache management for less than all lines in an entire cache. The ideal number of cache lines to manage in sub-line coherency mode may be determined, for example, through pre-silicon performance modeling.

Cache 1700 holds a number of cache lines 1720 in a data array component 1735, and may include a cache directory 1730 with an entry for each cache line 1720. For each cache line, the directory may include a tag that identifies the locations in main memory represented in the cache line. Although cache 1700 shows a simplified structure with a simple identifying tag associated with a single cache line of contiguous memory, any cache configuration that associates an identifier with a portion of memory is contemplated. Cache directory 1730 may also include a set of full-line descriptive bits that provides information about the cache line when the cache line is in full-line coherency mode. The set of full-line descriptive bits may include a valid bit, a set of coherence state bits (for example, MESI bits), transactional access bits, and other bits describing attributes of the cache line.

In addition, cache structure 1700 may include a side table 1740 for managing cache lines in sub-line coherency mode while data array component 1735 remains unchanged. The number of entries in side table 1740 may provide an upper limit to the number of cache lines in cache structure 1700 that may be simultaneously managed in sub-line coherency mode. Side table 1740 may have fewer entries than cache directory 1730, and the ideal number of entries for side table 1740 may be fixed or may be configurable. Each valid entry in side table 1740 may include a tag and at least one set of sub-line descriptive bits that provides information about the sub-cache line portions of a cache line when the cache line is in sub-line coherency mode. The number of sets of sub-line descriptive bits may depend on the number of sub-cache line portions into which a cache line is divided when placed in sub-line coherency mode. Each set of sub-line descriptive bits may be similar or identical to the set of full-line descriptive bits for the cache line in directory 1730, and may include a valid bit, a set of coherence state bits (for example, MESI bits), transactional access bits, and other bits describing attributes of each sub-cache line portion.

To illustrate, cache line 1750 may be associated with Tag A. When cache line 1750 is in full-line coherency mode, the set of full-line descriptive bits in cache directory 1730 provide information about the full cache line. But if Tag A is also represented in an entry 1751 in side table 1740, then cache line 1750 is in sub-line coherency mode, and the four sets of sub-line descriptive bits in entry 1751 provide information about each sub-cache line portion of cache line 1750. In this example, sub-line coherency mode is configured to manage full cache lines as four sub-cache line portions: Bits 1 provide information about Sub-cache Line 1, Bits 2 provide information about Sub-cache Line 2, Bits 3 provide information about Sub-cache Line 3, and Bits 4 provide information about Sub-cache Line 4. In some embodiments, side table 1740 may provide one less set of descriptive bits than the number of sub-cache line portions, and the set of bits from directory 1730 may describe one of the sub-cache line portions when the cache line is in sub-line coherency mode. If cache line 1750 is later returned to full-line coherency mode, then entry 1751 in side table 1740 may be invalidated, and the set of descriptive bits in cache directory 1730 may once again be configured to provide information about the full cache line.

In some embodiments, the determination whether a specific cache line is in sub-line coherency mode is made by inspecting the side table 1740. If the tag associated with a cache line is present in side table 1740, then the cache control logic manages the line as a plurality of sub-cache line portions of the full cache line. If the tag associated with a cache line is not present in side table 1740, then the cache control logic manages the line as a full cache line. In such embodiments, the presence of entries 1751 and 1761 in side table 1740 indicates that cache lines 1750 and 1760 are in sub-line coherency mode. In some embodiments, the determination whether a specific cache line is in sub-line coherency mode is made by examining an indicator such as indicator 1160 in FIG. 11 or in some other manner. Cache control logic inspecting such an indicator or otherwise determining that a specific cache line is in sub-line coherency mode would then find the relevant entry in side table 1740.

Figure 18:
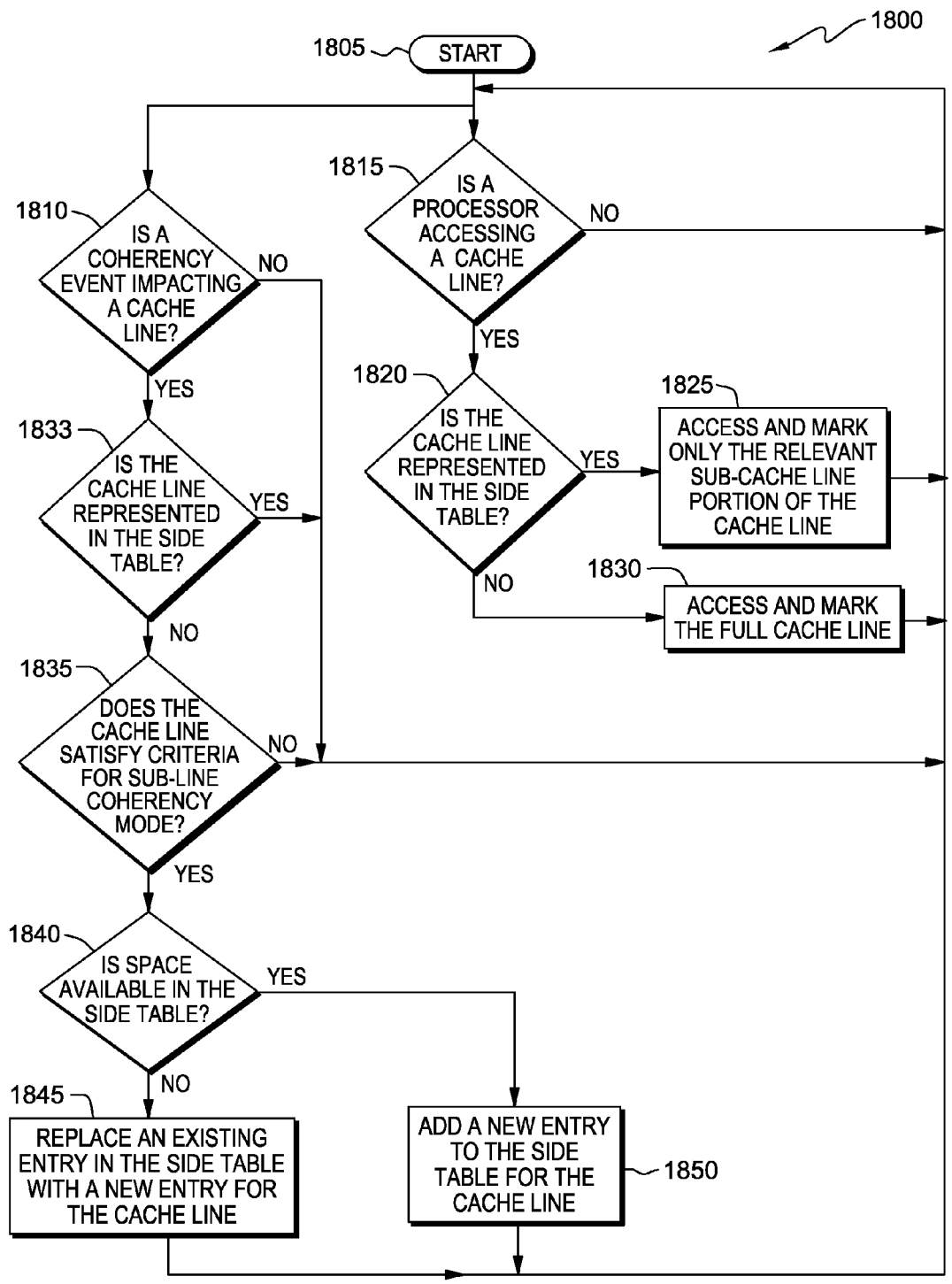
FIG. 18 is a flow diagram illustrating an example method for providing sub-line cache management.

FIG. 18 illustrates an example method 1800 for placing problematic cache lines in sub-line coherency mode using cache structure 1700 from FIG. 17. At start 1805, if a logical processor in the computing environment is performing an operation that will be accessing a cache line at 1815, then the method determines whether the cache line that will be accessed is already in sub-line coherency mode by determining whether the cache line is represented in the side table at 1820. A cache line may be in sub-line coherency mode for any number of reasons. For example, a cache line may be in sub-line coherency mode because it has been previously determined to be a high-conflict cache line or a high-coherence-miss cache line. In some embodiments, the side table and the conventional cache directory may be accessed in parallel, and information from an entry found in the side table supersedes information from the conventional cache directory.

If the cache line is represented in the side table at 1820, then only the relevant sub-cache line portion of the cache line is accessed at 1825. The relevant sub-cache line portion is the sub-cache line that includes a copy of the memory address targeted in the operation. The remaining non-relevant sub-cache line portions of the cache line are not accessed. As an example, for a cache line in sub-line coherency mode managed as two sub-cache lines, if the processor accesses memory address A, and if memory address A is associated with the second sub-cache line portion of the cache line, then only the state of the second sub-cache line as described by the set of sub-line descriptive bits in the side table associated with the second sub-cache line is relevant. The set of descriptive bits in the side table associated with the first sub-cache line is irrelevant. If the cache line is not represented in the side table at 1820, then the full cache line is accessed at 1830.

Alternatively at start 1805, if a coherency event is impacting a cache line at 1810, then the method checks if the cache line has an entry in the side table at 1833. If an entry already exists, it will be left as is; otherwise, the method determines whether the cache line satisfies criteria for sub-line coherency mode at 1835. Methods for determining whether a cache line satisfies criteria for sub-line coherency mode are discussed above, and may include, for example, examining a counter associated with the cache line in a coherence miss detection table or a conflict address detection table.

If the cache line does not satisfy criteria for sub-line coherency mode at 1835, then the cache line remains in full-line coherency mode, and subsequent operations targeting memory addresses within the cache line will access the full line. But if the cache line is determined to satisfy criteria for sub-line coherency mode at 1835, then an entry is added for the cache line in the side table to place the cache line in sub-line coherency mode, and subsequent operations will access sub-cache line portions of the cache line. If the side table has unused entries available at 1840, then the new entry may be added to the table at 1850. If the side table has no unused entries available at 1840, then an existing entry may be replaced at 1845. If the new entry is replacing an existing entry, any suitable protocol for selecting a candidate entry for replacement may be followed. For example, the least recently used or updated entry may be replaced, or the entry with the smallest counter value may be replaced.

In some embodiments, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) may be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a system (e.g., computer system) or sold separately.

Figure 19:
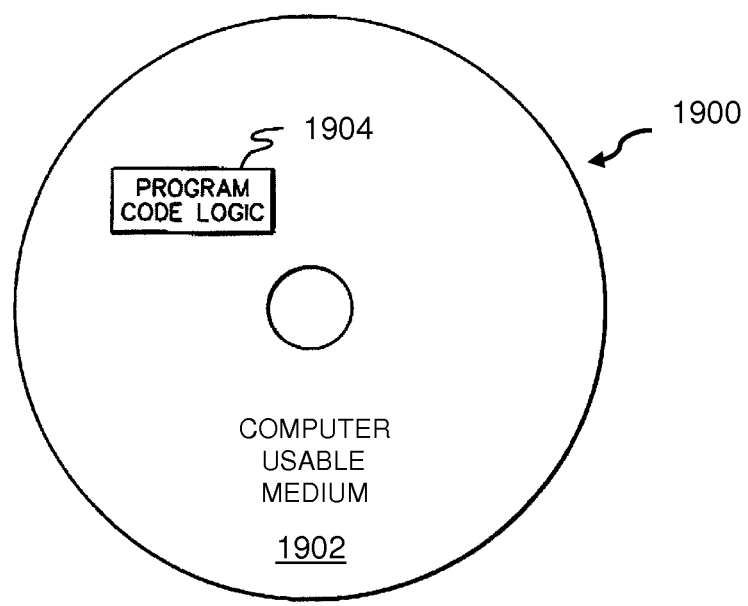
FIG. 19 is a block diagram of an example computer program product.

One example of an article of manufacture or a computer program product incorporating one or more aspects of the present invention is described with reference to FIG. 19. A computer program product 1900 includes, for instance, one or more computer usable media 1902 to store computer readable program code means or logic 1904 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Although one or more examples have been provided herein, these are only examples. Many variations are possible without departing from the spirit of the present invention. For instance, processing environments other than the examples provided herein may include and/or benefit from one or more aspects of the present invention. Further, the environment need not be based on the z/Architecture®, but instead can be based on other architectures offered by, for instance, IBM®, Intel®, Sun Microsystems, as well as others. Yet further, the environment can include multiple processors, be partitioned, and/or be coupled to other systems, as examples.

As used herein, the term "obtaining" includes, but is not limited to, fetching, receiving, having, providing, being provided, creating, developing, etc.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of embodiments of the claimed invention.

Although preferred embodiments have been depicted and described in detail herein, it will be apparent to those skilled in the relevant art that various modifications, additions, substitutions and the like can be made without departing from the spirit of the embodiments, and these are, therefore, considered to be within the scope of the embodiments, as defined in the following claims.

What is claimed is:

1. A method for cache management in a multi-processor computing environment, the computing environment including a plurality of caches configured to hold a plurality of cache lines, each cache line configurable with a coherency mode, the plurality of caches associated with a coherence interconnect, the method comprising:
    monitoring, with a centralized detector, communications on the coherence interconnect;
    detecting a first communication associated with a first cache line in the monitored communications, the first communication indicating an access of the first cache line resulting in a first performance-reducing event, the first cache line in a full-line coherency mode, wherein cache control logic associated with the first cache line is configured to operate or manage the first cache line in the full-line coherency mode with a full-line granularity;
    based on the detecting, determining that the first cache line is a high-contention cache line;
    based on the determining, placing the first cache line in a sub-line coherency mode, wherein the cache control logic is configured to operate or manage a plurality of sub-cache line portions of the first cache line in the sub-line coherency mode; and
    notifying caches accessing the first cache line that the first cache line is in the sub-line coherency mode.

2. The method of claim 1, wherein the first communication is a signal on the coherence interconnect, the signal raised in response to detecting a conflicting access of the first cache line while executing a transaction in the computing environment, wherein the performance-reducing event is a transactional abort.

3. The method of claim 1, wherein the first communication is a message on the coherence interconnect, the message sent in response to detecting an access of the first cache line, the first cache line previously invalidated by a coherence event, and wherein the performance-reducing event is a coherence request.

4. The method of claim 1, wherein the notifying comprises:
    observing a request for the first cache line on the coherence interconnect; and
    raising a signal on the coherence interconnect in response to the observing, the signal indicating that the first cache line is in the sub-line coherency mode.

5. The method of claim 1, wherein the notifying comprises:
    observing a request for the first cache line on the coherence interconnect; and
    modifying the request for the first cache line to indicate that the first cache line is in the sub-line coherency mode.

6. The method of claim 1, wherein the determining that the first cache line is the high-contention cache line comprises:
    incrementing a counter in an entry in a detection table, the entry associating the counter with the first cache line; and
    determining that the incremented counter satisfies a high-contention criterion.

7. A computer system for cache management in a multi-processor computing environment, the computing environment including a plurality of caches configured to hold a plurality of cache lines, each cache line configurable with a coherency mode, the plurality of caches associated with a coherence interconnect, the computer system comprising:
    a memory; and
    a processor in communication with the memory, wherein the computer system is configured to perform a method, the method comprising:
        monitoring, with a centralized detector, communications on the coherence interconnect;
        detecting a first communication associated with a first cache line in the monitored communications, the first communication indicating an access of the first cache line resulting in a first performance-reducing event, the first cache line in a full-line coherency mode, wherein cache control logic associated with the first cache line is configured to operate or manage the first cache line in the full-line coherency mode with a full-line granularity;
        based on the detecting, determining that the first cache line is a high-contention cache line;
        based on the determining, placing the first cache line in a sub-line coherency mode, wherein the cache control logic is configured to operate or manage a plurality of sub-cache line portions of the first cache line in the sub-line coherency mode; and
        notifying caches accessing the first cache line that the first cache line is in the sub-line coherency mode.

8. The computer system of claim 7, wherein the determining that the first cache line is the high-contention cache line comprises:
    incrementing a counter in an entry in a detection table, the entry associating the counter with the first cache line; and
    determining that the incremented counter satisfies a high-contention criterion.

9. The computer system of claim 8, wherein the determining that the incremented counter satisfies the high-contention criterion comprises:
    determining that the incremented counter has reached a threshold value.

10. The computer system of claim 8, wherein the determining that the incremented counter satisfies the high-contention criterion comprises:
    calculating a percentage, the percentage based on the incremented counter and a total number of accesses of cache lines resulting in performance-reducing events in the computing environment; and
    determining that the percentage has reached a threshold value.

11. The computer system of claim 8, wherein the method further comprises:
    determining that a reset criterion associated with the counter is satisfied;
    resetting the counter based on the determining that the reset criterion is satisfied; and
    placing the first cache line in the full-line coherency mode based on the determining that the reset criterion is satisfied.

12. The computer system of claim 11, wherein the reset criterion is selected from the group consisting of:
a period of time elapses;
a number of transactions complete;
a number of instructions complete; and
a cache line associated with the counter is cast out of the cache.

13. The computer system of claim 8, wherein the entry further associates the counter with at least one cache line adjacent to the first cache line.

14. The computer system of claim 8, wherein the entry further associates the counter with a hash value of a memory address associated with the first cache line.

15. A computer program product for cache management in a multi-processor computing environment, the computing environment including a plurality of caches configured to hold a plurality of cache lines, each cache line configurable with a coherency mode, the plurality of caches associated with a coherence interconnect, the computer program product comprising:
a non-transitory computer readable storage medium readable by a processing circuit and storing instructions for execution by the processing circuit for performing a method, the method comprising:
monitoring, with a centralized detector, communications on the coherence interconnect;
detecting a first communication associated with a first cache line in the monitored communications, the first communication indicating an access of the first cache line resulting in a first performance-reducing event, the first cache line in a full-line coherency mode, wherein cache control logic associated with the first cache line is configured to operate or manage the first cache line in the full-line coherency mode with a full-line granularity;
based on the detecting, determining that the first cache line is a high-contention cache line;
based on the determining, placing the first cache line in a sub-line coherency mode, wherein the cache control logic is configured to operate or manage a plurality of sub-cache line portions of the first cache line in the sub-line coherency mode; and
notifying caches accessing the first cache line that the first cache line is in the sub-line coherency mode.

16. The computer program product of claim 15, wherein the first communication is a signal on the coherence interconnect, the signal raised in response to detecting a conflicting access of the first cache line while executing a transaction in the computing environment, wherein the performance-reducing event is a transactional abort.

17. The computer program product of claim 15, wherein the first communication is a message on the coherence interconnect, the message sent in response to detecting an access of the first cache line, the first cache line previously invalidated by a coherence event, and wherein the performance-reducing event is a coherence request.

18. The computer program product of claim 15, wherein the determining that the first cache line is the high-contention cache line comprises:
incrementing a counter in an entry in a detection table, the entry associating the counter with the first cache line; and
determining that the incremented counter satisfies a high-contention criterion.

19. The computer program product of claim 18, wherein the entry further associates the counter with at least one cache line adjacent to the first cache line.

20. The computer program product of claim 18, wherein the entry further associates the counter with a hash value of a memory address associated with the first cache line.

* * * * *